(12) United States Patent
Yomdin et al.

(10) Patent No.: US 9,070,207 B2
(45) Date of Patent: Jun. 30, 2015

(54) MODELIZATION OF OBJECTS IN IMAGES

(75) Inventors: Yosef Yomdin, Rehovot (IL); Gregory Dinkin, Qiriat Ekron (IL); Niv Sarig, Kfar Saba (IL); Avital Yomdin, Tel-Aviv (IL)

(73) Assignee: Yeda Research & Development Co., Ltd., Rehovot (IL)

( * ) Notice: Subject to any disclaimer, the term of this patent is extended or adjusted under 35 U.S.C. 154(b) by 939 days.

(21) Appl. No.: 12/676,363

(22) PCT Filed: Sep. 7, 2008

(86) PCT No.: PCT/IL2008/001205
§ 371 (c)(1),
(2), (4) Date: Jun. 22, 2010

(87) PCT Pub. No.: WO2009/031155
PCT Pub. Date: Mar. 12, 2009

(65) Prior Publication Data
US 2010/0259546 A1    Oct. 14, 2010

Related U.S. Application Data

(60) Provisional application No. 60/970,404, filed on Sep. 6, 2007.

(51) Int. Cl.
G06T 13/00 (2011.01)
G06T 7/00 (2006.01)

(52) U.S. Cl.
CPC ............... G06T 13/00 (2013.01); G06T 7/0083 (2013.01); G06T 7/0089 (2013.01); G06T 2207/10016 (2013.01); G06T 2207/30196 (2013.01)

(58) Field of Classification Search
CPC ...... G06K 9/6204; G06T 12/40; G06T 13/80; G06T 13/40
See application file for complete search history.

(56) References Cited

U.S. PATENT DOCUMENTS

| 6,384,819 | B1 * | 5/2002 | Hunter | 345/418 |
|---|---|---|---|---|
| 6,650,778 | B1 * | 11/2003 | Matsugu et al. | 382/209 |
| 2002/0172433 | A1 * | 11/2002 | Edwards | 382/294 |
| 2003/0164829 | A1 * | 9/2003 | Bregler et al. | 345/474 |
| 2003/0222888 | A1 * | 12/2003 | Epshteyn | 345/619 |
| 2004/0264806 | A1 * | 12/2004 | Herley | 382/284 |
| 2005/0063596 | A1 * | 3/2005 | Yomdin et al. | 382/232 |
| 2005/0128197 | A1 | 6/2005 | Thrun et al. | |
| 2006/0083418 | A1 | 4/2006 | Watson | |
| 2007/0147700 | A1 * | 6/2007 | Jeong et al. | 382/266 |

OTHER PUBLICATIONS

Blinn, Jim. "Jim Blinn's Corner Notation, Notation, Notation". 2003, Elsevier Inc. Chapter 16, p. 219-229.*
Cootes, et al., Active Shape Models—Their Training and Application, Computer Vision and Image Understanding, Jan. 1995, pp. 38-59, vol. 61, No. 1.
Andrew Blake, et al., Active Contours: The Application of Techniques from Graphics, Vision, Control Theory and Statistics to Visual Tracking of Shapes in Motion, 1998, Springer-Verlag London Ltd.

* cited by examiner

Primary Examiner — Kee M Tung
Assistant Examiner — Nicholas R Wilson
(74) Attorney, Agent, or Firm — Eitan, Mehulal & Sadot

(57) ABSTRACT

A system includes an aligner to align an initial position of a partially kinematically, parameterized model with an object in an image, and a modelizer to adjust parameters of the model to match the model to contours of the object, given the initial alignment. An animation system includes a modelizer to hierarchically match a hierarchically rigid model to an object in an image, and a cutter to cut the object from the image and to associate it with the model. A method for animation includes hierarchically matching a hierarchically rigid model to an object in an image, and cutting the object from the image to associate it with the model.

66 Claims, 42 Drawing Sheets

MODELIZATION OF OBJECTS IN IMAGES

CROSS-REFERENCE TO RELATED APPLICATIONS

This application is a U.S. National Phase Application under 35 U.S.C. 371 of PCT International Application No. PCT/IL2008/001205, which has an international filing date of Sep. 7, 2008, and which claims benefit from U.S. Provisional Patent Application No. 60/970,404, filed Sep. 6, 2007, which is hereby incorporated in its entirety by reference.

FIELD OF THE INVENTION

The present invention relates generally to animation of objects from still images.

BACKGROUND OF THE INVENTION

There are many kinds of animation tools which enable the user, either an experienced animator or a novice, to define an object or objects and to provide motion to that object. An exemplary tool is the Flash tool, commercially available from Adobe of the USA. With this tool, the animator may create an animated character and may generate an animated movie or video sequence using the character.

US patent publication 2005/0063596 describes a method of animation using images of objects. The publication also describes a semi-automatic tool for cutting an object out of an image. The object can then be used in the animation. The tool allows a user to draw a border line around an object to be cut out from a picture. Based on a comparison of a segment of a border line drawn by the user and characteristic lines in the image, the tool suggests one or more possible continuation paths for the line segment. Optionally, in at least some cases, the tool suggests a plurality of paths, so that the user may choose the most suitable path. If one of the suggested paths follows the border line desired by the user, the user may select that path and the tool automatically fills in an additional segment of the border line, responsive to the selection.

The method described in US 2005/0063596 is an example of template matching, which is one term for the fitting of a model (template) to empirical data (signal). In template matching, a template is matched to an object of an image. The book, *Active Contours*, by Andrew Blake, et al., and the article *Active Shape Models—Their Training and Application* (Cootes, etc., Computer Vision and Image Understanding, Vol. 61, No. 1, January, pp. 38-59, 1995) both discuss various other types of template matching.

Template matching, as with other fitting operations, is a minimization, with respect to the model parameters, of the discrepancy between the actual measurements and the model approximation. According to the structure of the model used (linear or non-linear in the parameters), the corresponding optimization problem appears as a linear or a non-linear one.

There are many difficult problems that appear in a practical implementation of template matching. Some of them arise both in linear and non-linear cases, other are specific for the non-linear regression.

1. Noisy Data. One of the main difficulties in any template matching is presented by the noise in the empirical data (signal). In some problems, the noise may be much stronger in amplitude than the original signal, while in others, the noise may corrupt "geometrically significant" parts of the data.

2. Matching efficiency. Application of the standard minimization methods may be computationally problematic. Even in a linear case, in the presence of noise, such methods may run for a long (and unpredictable) amount of time. This is especially true for non-linear problems. In many practical problems (in particular, in image analysis), this makes template matching infeasible.

3. Ill-Posed Matching. Many important problems in template matching lead to a certain degeneracy. In particular, the minimization of the discrepancy between the actual measurements and the model approximation, with respect to the model parameters, may turn out to be highly degenerate. The standard minimization methods usually fail in such situations.

4. "Dimension course": The number of essential control parameters of a typical medium-quality human template is at least 30. A non-linear minimization in this dimension range may be prohibitively inefficient.

SUMMARY OF THE INVENTION

An objective of the present invention is to improve upon the prior art.

There is therefore provided in accordance with a preferred embodiment of the present invention, a system including an aligner to align an initial position of an at least partially kinematically, parameterized model with an object in an image, and a modelizer to adjust parameters of the model to match the model to contours of the object, given the initial alignment.

Further, in accordance with a preferred embodiment of the present invention, the system also includes means to enable a user to operate at least one of the aligner and the modelizer interactively.

Still further, in accordance with a preferred embodiment of the present invention, the system also includes means to perform model guided interactive matching.

Additionally, in accordance with a preferred embodiment of the present invention, the system also includes a cutter to cut the object from the image and to associate it with the model.

Moreover, in accordance with a preferred embodiment of the present invention, the system also includes an animation adapter to animate the cut object according to an animation associated with the model.

Further, in accordance with a preferred embodiment of the present invention, the animation adapter includes means to provide small movement animation.

Still further, in accordance with a preferred embodiment of the present invention, the animation adapter includes an enlarger to enlarge a part of the object, and an animator to animate the enlarged part of the object over a white space area surrounded by a background margin, where the white space area is defined by the original position of the part of the object, and the background margin is defined as the difference in area of the image covered by the enlarged part of the object and the white space area.

Additionally, in accordance with a preferred embodiment of the present invention, the animation adapter includes an extractor to extract the cut object from the image, and an animator to animate the cut object on a background different than that of the image.

Moreover, in accordance with a preferred embodiment of the present invention, the animation adapter includes a reconstructor to perform an approximate reconstruction of occluded parts of the object as per at least one of the following an associated non-occluded part of the object, a matching part of a model matched to the object, and interpolation of non-occluded colors in the object.

Further, in accordance with a preferred embodiment of the present invention, the animation is associated with at least one of the following a greeting card, a game, a game avatar and a digital camera implementation.

Still further, in accordance with a preferred embodiment of the present invention, the model is of a human standing enface, where an appropriate the model is determined based on a matrix of qualifications including at least one of sex, age, body build, athletic skill and pose.

Additionally, in accordance with a preferred embodiment of the present invention, the model is of either an animal or a virtual animated object.

Moreover, in accordance with a preferred embodiment of the present invention, the model includes alignment points and the aligner includes means to receive marking points from a user marking the alignment points on the image.

Further, in accordance with a preferred embodiment of the present invention, the alignment points are control points organized in a hierarchically rigid manner to define a specific multi-scale organization of the control parameters for fitting them to the object.

Still further, in accordance with a preferred embodiment of the present invention, the control points are at least one of anatomic parameters for coarse scale model positioning, geometrically shaped active regions of certain combinations of segments of a contour of a model, and contour control points for finely fitting edges to the contour within a proscribed neighborhood of the model.

Additionally, in accordance with a preferred embodiment of the present invention, the anatomic parameters are at least one of initial and secondary points for performing the coarse scale model positioning in a multi-step process.

Moreover, in accordance with a preferred embodiment of the present invention, the control points are organized into groups, and each group has a set of forbidden values based on anatomic restrictions.

Further, in accordance with a preferred embodiment of the present invention, the system also includes a model distortion calculator to calculate overall model distortion as a sum of penalty functions for each group, a global penalty function, and a stretching function.

Still further, in accordance with a preferred embodiment of the present invention, the system also includes means to stop processing when the overall model distortion exceeds a predefined threshold.

Additionally, in accordance with a preferred embodiment of the present invention, the system also includes a penalty function calculator to calculate the penalty function for each group, where a value of the penalty function approaches infinity as the control points of the group approach the forbidden values.

Moreover, in accordance with a preferred embodiment of the present invention, the system also includes a global penalty calculator to calculate a global penalty function defined by a total distance of the control parameters from a globally anatomically forbidden region.

Further, in accordance with a preferred embodiment of the present invention, the system also includes a stretching function calculator to calculate the stretching function as a measure of total deviation of all the control parameters from their associated reference points.

Still further, in accordance with a preferred embodiment of the present invention, the aligner includes means to adjust the model to align the marking points with the alignment points.

Additionally, in accordance with a preferred embodiment of the present invention, the aligner includes means to enable a user to create the image with the object in generally the same pose as the model.

Moreover, in accordance with a preferred embodiment of the present invention, the aligner includes means to cunningly adjust the model to coarsely align the model with the object in the image.

Further, in accordance with a preferred embodiment of the present invention, the system also includes a video frame provider, to provide the aligner with one frame at a time from a video sequence, and an action generator to generate an action sequence from a collection of models generated by the modelizer in response to the frames of the video sequence.

Still further, in accordance with a preferred embodiment of the present invention, the video sequence is from at least one of a movie, media clip and broadcast.

Additionally, in accordance with a preferred embodiment of the present invention, the video sequence is of movement of a user of a game and the action sequence is provided to an avatar of the user.

Moreover, in accordance with a preferred embodiment of the present invention, the modelizer includes an edge detector to generate an edge image of the image, an anatomic points matcher to adjust anatomic points of the model to coarsely match a portion of a contour of the model to edges of the object that are generally parallel to the contour and are in its vicinity and to mark those selected edges, a contour aligner to adjust the contour of the model to more tightly match edges of the object that are generally parallel to the contour and are in its close vicinity and to mark those selected edges, and a contour refiner to adjust the contour of the model to the selected edges.

Further, in accordance with a preferred embodiment of the present invention, the matcher includes means to calculate a series of matching functions between the edges and the portions of the contours, where an overall contour matching quality may be expressed as a maximum of calculated values for the matching functions over all matching groups.

Still further, in accordance with a preferred embodiment of the present invention, the modelizer includes a geometric combination analyzer to perform a model-guided geometric search by analyzing the edge images and to provide scanning regions for processing to the anatomic points matcher.

Additionally, in accordance with a preferred embodiment of the present invention, the geometric combination analyzer includes means to perform the model-guided geometric search on progressively finer scales with progressively more detailed the models until the results of a the search no longer improve upon the results of a previous iteration of the search.

Moreover, in accordance with a preferred embodiment of the present invention, the geometric combination analyzer includes means to output a set of possible preliminary positions of the model on the image with a likelihood for each the preliminary position, and means to form a scanning region in a Model Parameter Space (MPS) around each of the preliminary model positions.

Further, in accordance with a preferred embodiment of the present invention, the geometric combination analyzer includes a filter to perform model guided geometric filtering to construct chains of edges with a shape approximately corresponding to a shape of pre-specified characteristic regions of a relevant the model, means to form groups of lines corresponding to pre-specified characteristic regions on the model, a validator to validate the groups of lines by comparing each of the groups to other the groups and as per any a priori known restrictions of the model, and a pivot elements detector to identify pivot elements as per known restrictions of the model.

There is also provided, in accordance with a preferred embodiment of the present invention, an animation system including a modelizer to hierarchically match a hierarchically rigid model to an object in an image, and a cutter to cut the object from the image and to associate it with the model.

There is also provided, in accordance with a preferred embodiment of the present invention, a method for animation including hierarchically matching a hierarchically rigid model to an object in an image, and cutting the object from the image to associate it with the model.

Further, in accordance with a preferred embodiment of the present invention, the method also includes enabling a user to perform the matching interactively.

Still further, in accordance with a preferred embodiment of the present invention, the method also includes enabling a user to perform model guided interactive matching.

Additionally, in accordance with a preferred embodiment of the present invention, the method also includes animating the cut object according to an animation associated with the model.

Moreover, in accordance with a preferred embodiment of the present invention, the animating is small movements animation.

Further, in accordance with a preferred embodiment of the present invention, the small movement animation includes enlarging a part of the object, and animating the enlarged part of the object over a white space area surrounded by a background margin, where the white space area is defined by the original position of the part of the object, and the background margin is defined as the difference in area of the image covered by the enlarged part of the object and the white space area.

Still further, in accordance with a preferred embodiment of the present invention, the animating includes extracting the cut object from the image, and animating the cut object on a different background.

Moreover, in accordance with a preferred embodiment of the present invention, the animating also includes performing an approximate reconstruction of occluded parts of the object as per at least one of the following an associated non-occluded part of the object, a matching part of a model matched to the object, and interpolation of non-occluded colors in the object.

Further, in accordance with a preferred embodiment of the present invention, the animating is associated with at least one of a greeting card, game, game avatar and a digital camera implementation.

Still further, in accordance with a preferred embodiment of the present invention, the model is of a human standing enface and determining an appropriate the model based on a matrix of qualifications including at least one of sex, age, body build, athletic skill and pose.

Additionally, in accordance with a preferred embodiment of the present invention, the model is of one of the following an animal and a virtual animated object.

Moreover, in accordance with a preferred embodiment of the present invention, the model includes alignment points.

Further, in accordance with a preferred embodiment of the present invention, the method includes receiving marking points from a user marking the alignment points on the image.

Still further, in accordance with a preferred embodiment of the present invention, the alignment points are control points organized in a hierarchically rigid manner to define a specific multi-scale organization of the control parameters for fitting them to the object.

Additionally, in accordance with a preferred embodiment of the present invention, the control points are at least one of anatomic parameters for coarse scale model positioning, geometrically shaped active regions of certain combinations of segments of a contour of a model, and contour control points for finely fitting edges to the contour within a proscribed neighborhood of the model.

Moreover, in accordance with a preferred embodiment of the present invention, the anatomic parameters are at least one of initial and secondary points for performing the coarse scale model positioning in a multi-step process.

Further, in accordance with a preferred embodiment of the present invention, the method includes organizing the control points into groups, and defining a forbidden set of values based on anatomic restrictions for each group.

Still further, in accordance with a preferred embodiment of the present invention, the method includes calculating overall model distortion as a sum of penalty functions for each group, a global penalty function, and a stretching function.

Additionally, in accordance with a preferred embodiment of the present invention, the method also includes stopping processing when the overall model distortion exceeds a predefined threshold.

Moreover, in accordance with a preferred embodiment of the present invention, the calculating includes calculating the penalty function for each the group, where a value of the penalty function approaches infinity as the control points of the group approach the forbidden set.

Further, in accordance with a preferred embodiment of the present invention, the calculating includes calculating a global penalty function defined as a total distance of the control parameters from a globally anatomically forbidden region.

Still further, in accordance with a preferred embodiment of the present invention, the calculating includes calculating the stretching function as a measure of total deviation of all the control parameters from their associated reference points.

Additionally, in accordance with a preferred embodiment of the present invention, the method includes adjusting the model to align the marking points with the alignment points.

Moreover, in accordance with a preferred embodiment of the present invention, the method includes enabling a user to create the image with the object in a generally same pose as the model.

Further, in accordance with a preferred embodiment of the present invention, the method includes cunningly adjusting the model to coarsely align the model with the object in the image.

Still further, in accordance with a preferred embodiment of the present invention, the method also includes providing one frame at a time from a video sequence for the aligning, and generating an action sequence from a collection of the models in response to the frames of the video sequence.

Additionally, in accordance with a preferred embodiment of the present invention, the video sequence is from at least one of a movie, media clip and broadcast.

Moreover, in accordance with a preferred embodiment of the present invention, the providing also includes providing the action sequence to an avatar of the user, where the video sequence is of the movement of a user of a game.

Further, in accordance with a preferred embodiment of the present invention, the matching includes generating an edge image of the image, adjusting anatomic points of the model to coarsely match a portion of a contour of the model to edges of the object that are generally parallel to the contour and are in its vicinity and to mark those selected edges, adjusting the contour of the model to more tightly match edges of the object that are generally parallel to the contour and are in its close vicinity and to mark those selected edges, and adjusting the contour of the model to the selected edges.

Still further, in accordance with a preferred embodiment of the present invention, the matching also includes calculating a series of matching functions between the edges and the portions of the contours, where an overall contour matching quality may be expressed as a maximum of calculated values for the matching functions over all matching groups.

Additionally, in accordance with a preferred embodiment of the present invention, the method also includes performing a model-guided geometric search by analyzing the edge images, and providing scanning regions for processing to the anatomic points matcher.

Moreover, in accordance with a preferred embodiment of the present invention, the performing includes performing the model-guided geometric search on progressively finer scales with progressively more detailed the models until the results of a search no longer improve upon the results of a previous iteration of the search.

Further, in accordance with a preferred embodiment of the present invention, the performing includes outputting a set of possible preliminary positions of the model on the image with a likelihood for each the preliminary position, and forming a scanning region in a MPS around each of the preliminary model positions.

Still further, in accordance with a preferred embodiment of the present invention, the method also includes performing model guided geometric filtering to construct chains of edges with a shape approximately corresponding to a shape of pre-specified characteristic regions of a relevant the model, forming groups of lines corresponding to pre-specified characteristic regions on the model, validating the groups of lines by comparing each of the groups to other the groups and as per any a priori known restrictions of the model, and identifying pivot elements as per known restrictions of the model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
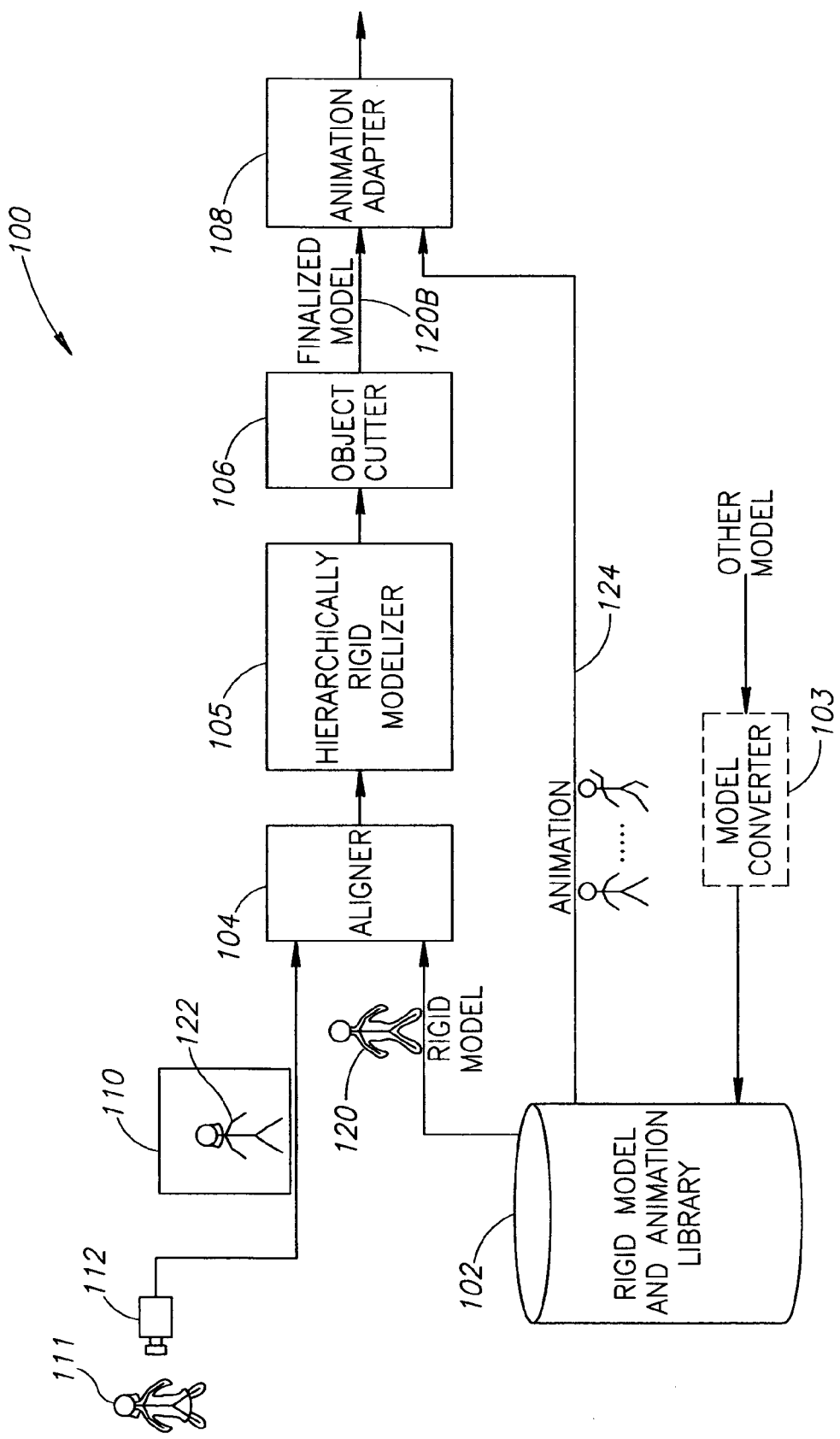
FIG. 1 is a schematic illustration of a modelization system for objects in images, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

The present invention may be a system and method for modelization of an object in an image. Modelization involves matching a manipulatable model, which has texture, anatomy, kinematics, etc., to the object. The shape and anatomy of the model may be matched to that of the object while the kinematics of the model may define the movement of the object. With the modelization of the object, the object (which is taken from the image) may be "animated". Moreover, after modelization of the object, the object may be analyzed, classified, corrected, etc.

For example, the system may be utilized to put a real world object (person or otherwise) into an animation. With such a method, a person may 'play' his favorite animated game, perform as one of the characters of an animated movie, or play any other animated character. In one embodiment of the present invention, the real world object may be put into an animated greeting card. In another embodiment, the real world object may become a character in a "virtual world".

Applicants have realized that modelization may provide a way to reliably cut an object from a noisy image, such that the contour of the cut object is visually indistinguishable from the contour of the character on the original photograph (i.e. the object and little of the background may be taken to form the cut object). Such is not true for template matching methods of the prior art.

The present invention may utilize a concept of "hierarchically rigid models" to match the contour of the object. Rigid models may have a minimal number of free parameters with which to change the shape of the model and its external contour. The result may be that, even though some information may be missing in the image (due to noise, occlusion by other objects or coincidences of similar color in the object and in the background), the contour lines of the object may still be determined. Fitting the rigid model to only a portion of the object's contour may uniquely determine the parameters of the model. With these parameters, the remaining portions of the contour may be determined, even if the information is problematic in some way. The model generally does not have enough free parameters to follow false or noisy parts of the contour. As described hereinbelow, "hierarchical rigidity" may describe the specific multi-scale (and\or multi-group) organization of the control parameters of the model and of the fitting procedure.

Reference is now made to FIG. 1, which illustrates the system 100 and operation of present invention. System 100 may comprise a rigid model and animation library 102, an optional model converter 103, a model-object aligner 104, a hierarchically rigid modelizer 105, an object cutter 106 and an optional animation adapter 108.

Aligner 104 may receive an image 110 of an object 111. FIG. 1 shows object 111 as a girl; it will be appreciated that object 111 may be any, typically real-world, object. For example, it may be a person, an animal, a face to be recognized, a pattern to be analyzed in a medical image, an electronic device layout to be checked, etc. A user may use a camera 112 to create image 110 of object 111 and may transfer image 110 to initial matching block 104. Alternatively, image 110 may be generated from a computer or other device.

The user may also select a rigid model 120, from model animation library 102, to match to object 122 inside of image 110 corresponding to object 111. As described in more detail hereinbelow, aligner 104 may align model 120 with object 122. Aligner 104 may operate automatically or with input from the user.

Modelizer 105 may match model 120 to object 122 using hierarchical rigidity. Hierarchical rigidity may match hierarchically rigid models in stages, where certain, more global, parameters may be determined first, followed by more local parameters. For example, for matching bodies, parameters representing anatomical elements, such as shoulders, hips and knees, may be matched first, followed by the contours of the arms, legs and torso. Fine details of the contours may be matched last.

In the hierarchically rigid model of the present invention, the parameters may be arranged in rigid groups. As a result, in each stage, the noise may be corrected, enabling the matching accuracy to improve from step to step.

Once rigid model 120 may be matched to object 122 of image 110, cutter 106 may cut image 110 along the contour lines indicated by modelizer 105 and may generate a finalized model 120B having cut object 122 as its texture. Animation adapter 108 may change the shape of model 120B according to any selected animation 124 associated with initial rigid model 120.

Figure 2A:
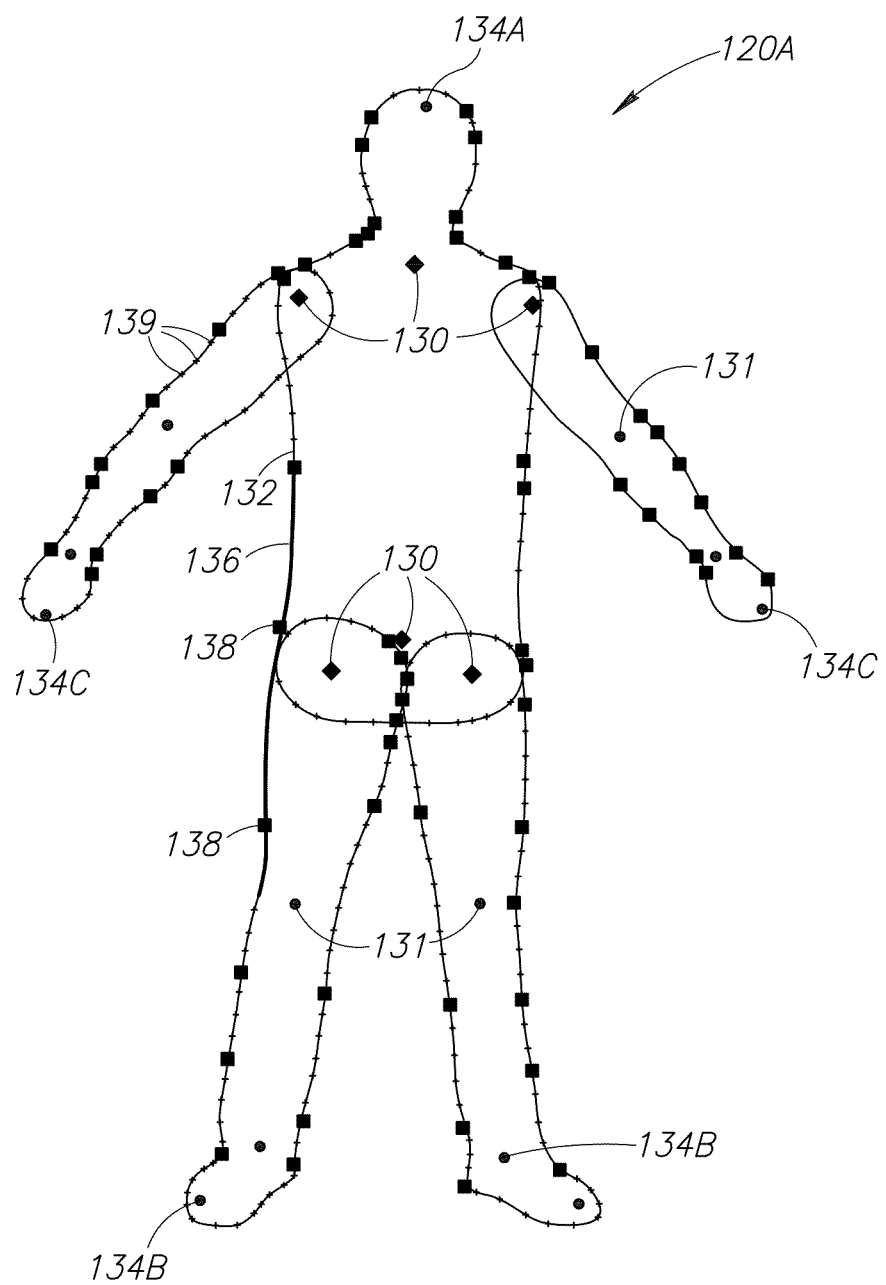
FIG. 2A is a schematic illustration of an exemplary model.

FIG. 2A, to which reference is now made, illustrates an exemplary model 120A of a human being standing enface (i.e. face forward) with arms and legs spread slightly. Model 120A includes dots 130 and contour lines 132. Dots 130 correspond to anatomic points of the body, such as joints, and contour lines 132 mark the outer lines of model 120A. It will be appreciated that other types of objects (such as animals and/or objects) and their positions in space (enface, sideways, backwards, etc.) are also incorporated in the present invention.

Figure 2B:
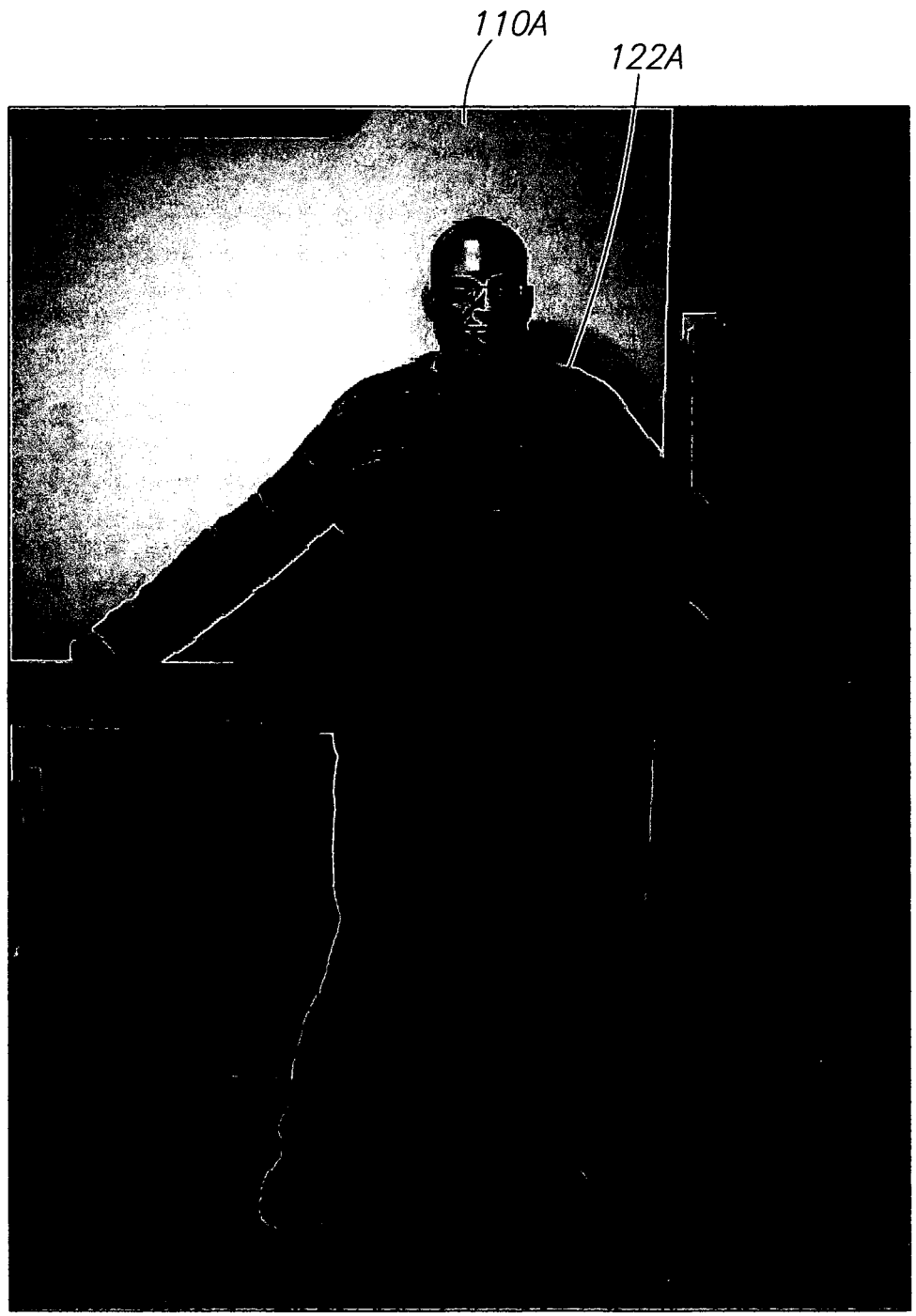
FIG. 2B is a graphical illustration of an exemplary image to which to match the template of FIG. 2A.

FIG. 2B, to which reference is now made, shows an exemplary image 110A of an object (a man) 122A. Man 122A is also standing enface. However, man 122A is shorter and wider than the body of model 120A. Man 122A is also wearing a striped sweater and standing against a white wall with a brown stripe across it. The sweater's colors and the brown stripe on the wall are similar, making it difficult for a computer or other algorithmic device to determine where the sweater ends and the wall stripe begins. Similarly, the left arm of man 122A is against a background of a hallway, also making it difficult to determine the contour of the arm. The goal is to cut the image of man 122A out, using hierarchically rigid model 120A.

Figure 3A:
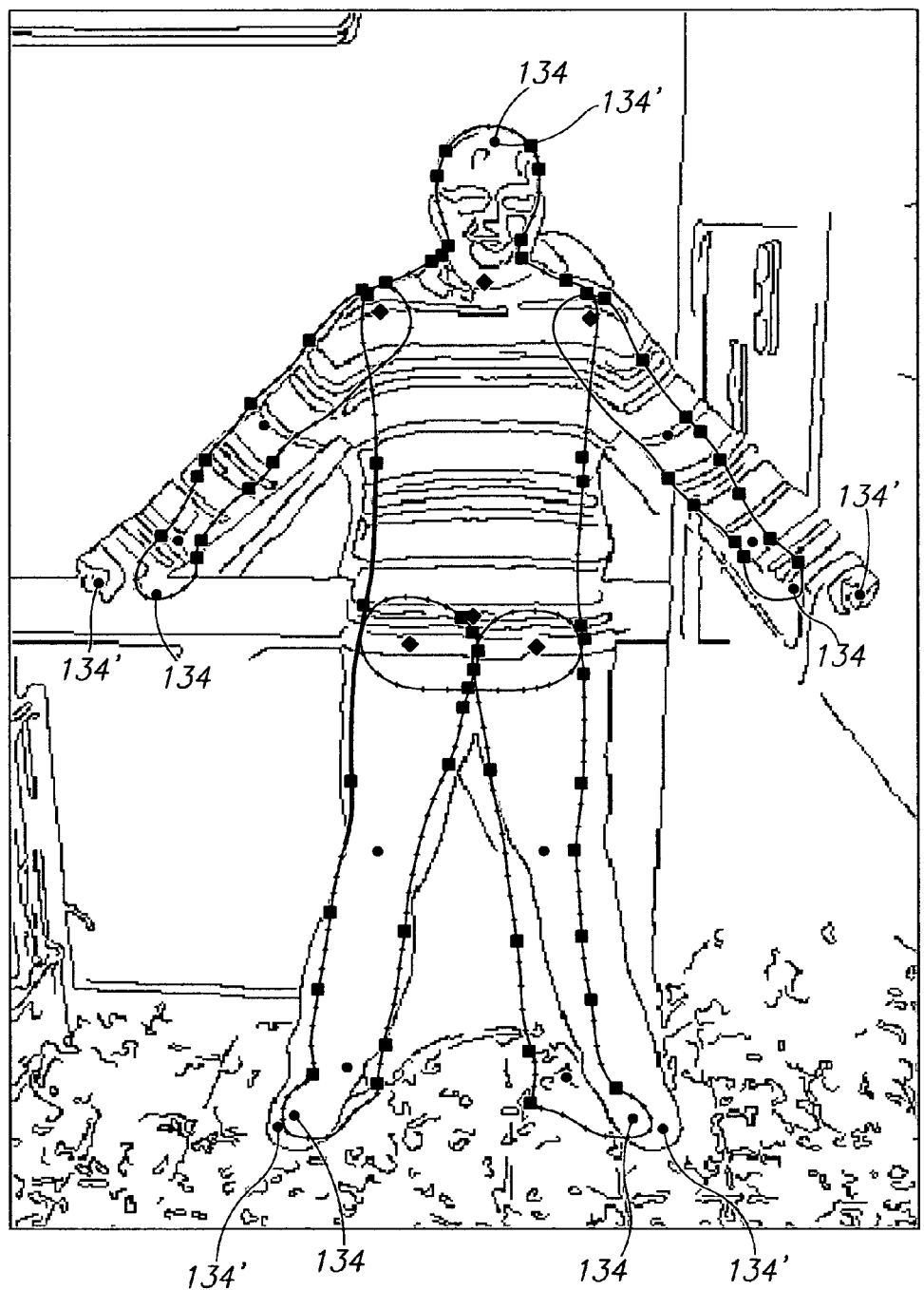
FIGS. 3A, 3B, 3C, 3D and 3E are graphical illustrations useful in understanding the operation of an aligner of the system of FIG. 1.

Model 120A also comprises alignment points 134. In general, points 134 may be notable points on an object that a user may easily see. For the example of model 120A, alignment points 134 may include the uppermost point of the face (just below the hairline), the furthest point of each foot and the furthest point of each hand. Reference is now briefly made to FIG. 3A. FIG. 3A shows model 120A approximately located on man 122A. Marked points 134' are indicated and, in this example, are generally near alignment points 134.

Aligner 104 may automatically find points 134 or the user may mark points 134' on object 122 in image 110A. Aligner 104 may then align model 120A to object 122 by connecting marked points 134' with points 134 of model 120A and by changing the shape of model 120A to match. For instance, aligner 104 may define the height of model 120A as the distance from head alignment point 134A to either foot alignment point 134B, and the hip anatomic points 130 may be about 0.6 of the distance from head 134A to foot 134B. Similarly, the length of the arms may be defined as the distance from head point 134A to either hand point 134C. Accordingly, aligner 104 may recalculate these values when given the locations of marked points 134'. Aligner 104 may also recalculate the locations of the other anatomic points 130 and 131 from these basic calculations.

Figure 3B:
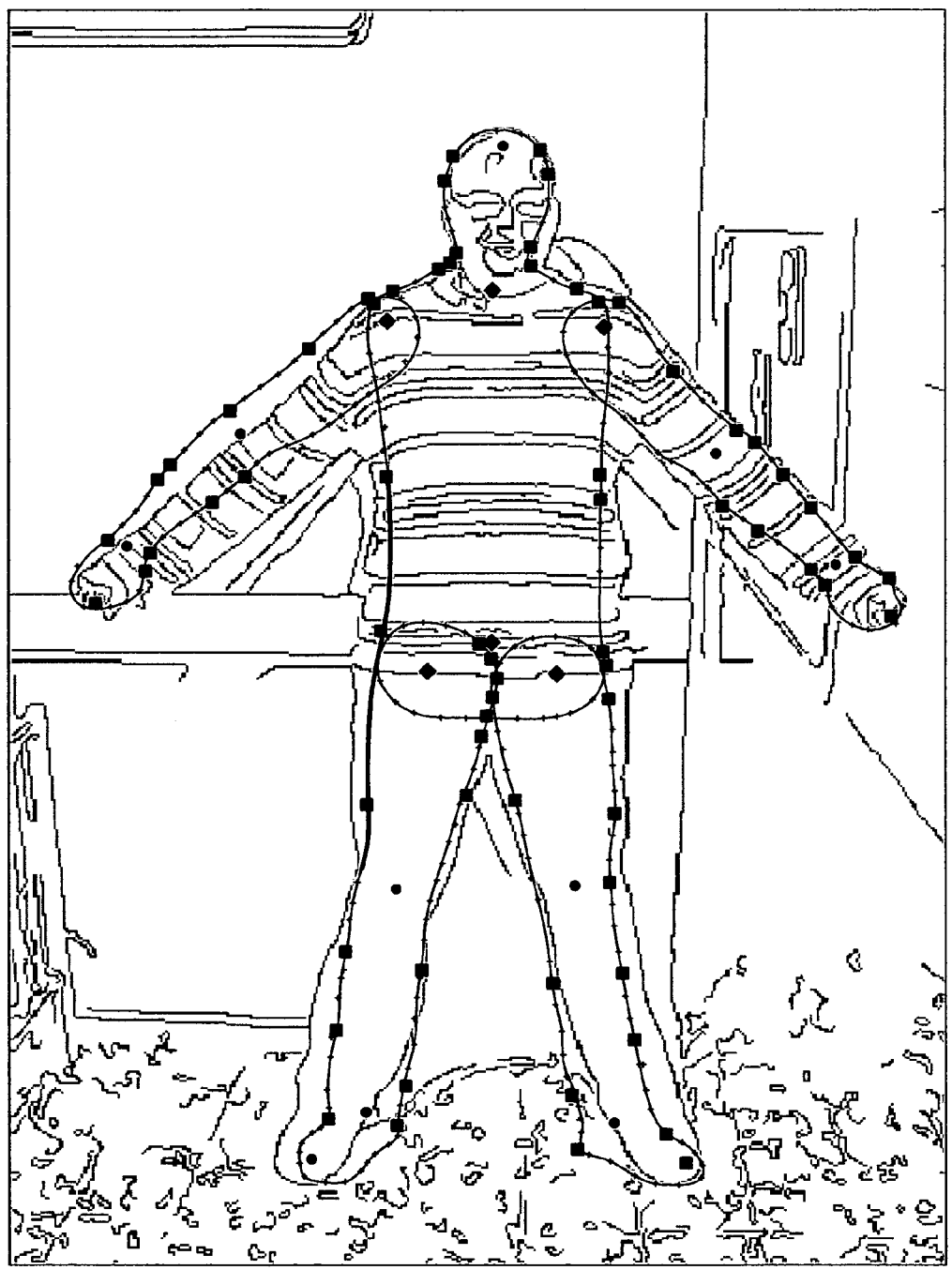

FIG. 3B, to which reference is now briefly made, shows the output of aligner 104, aligned on image 110.

Figure 3C:
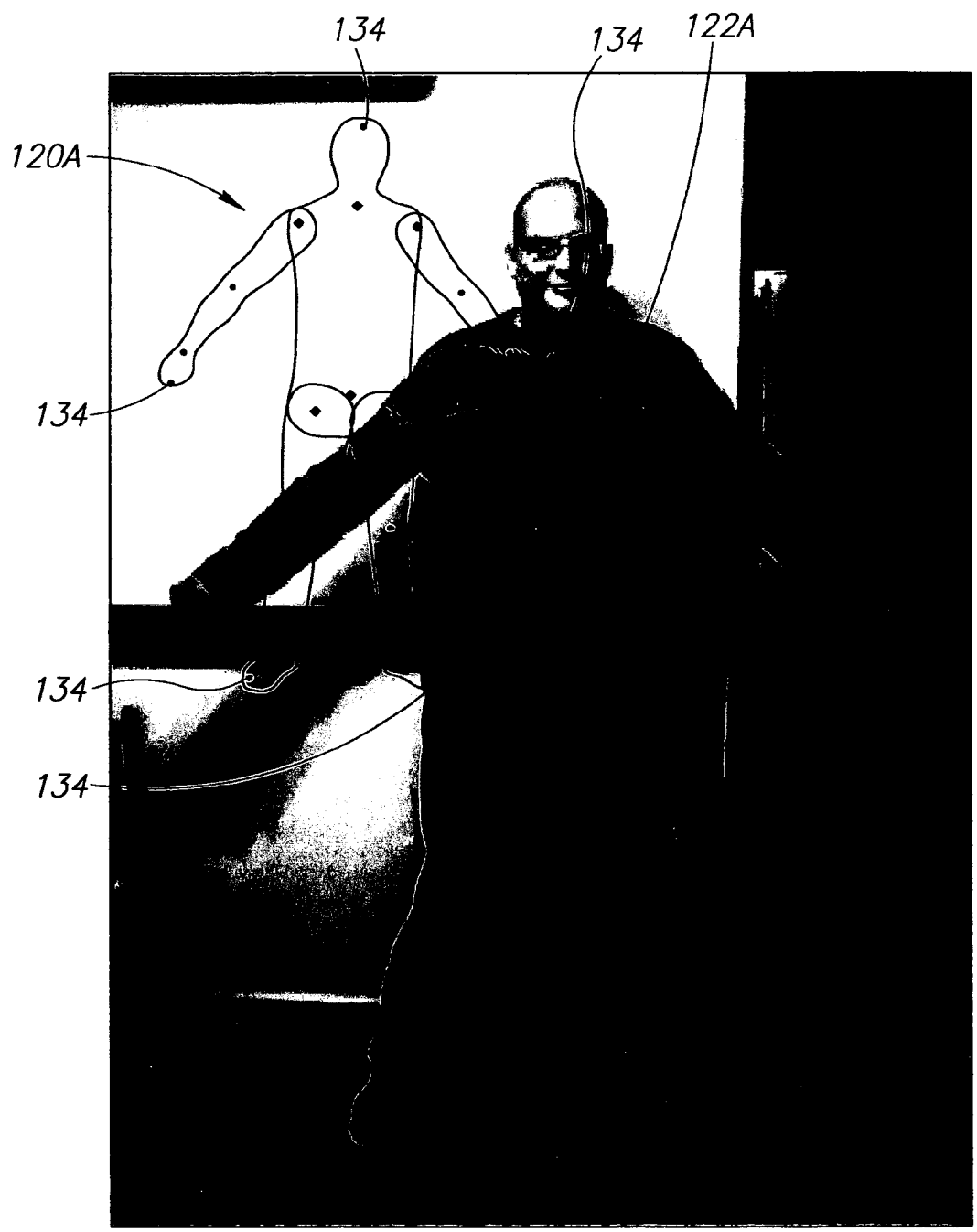
Figure 3D:
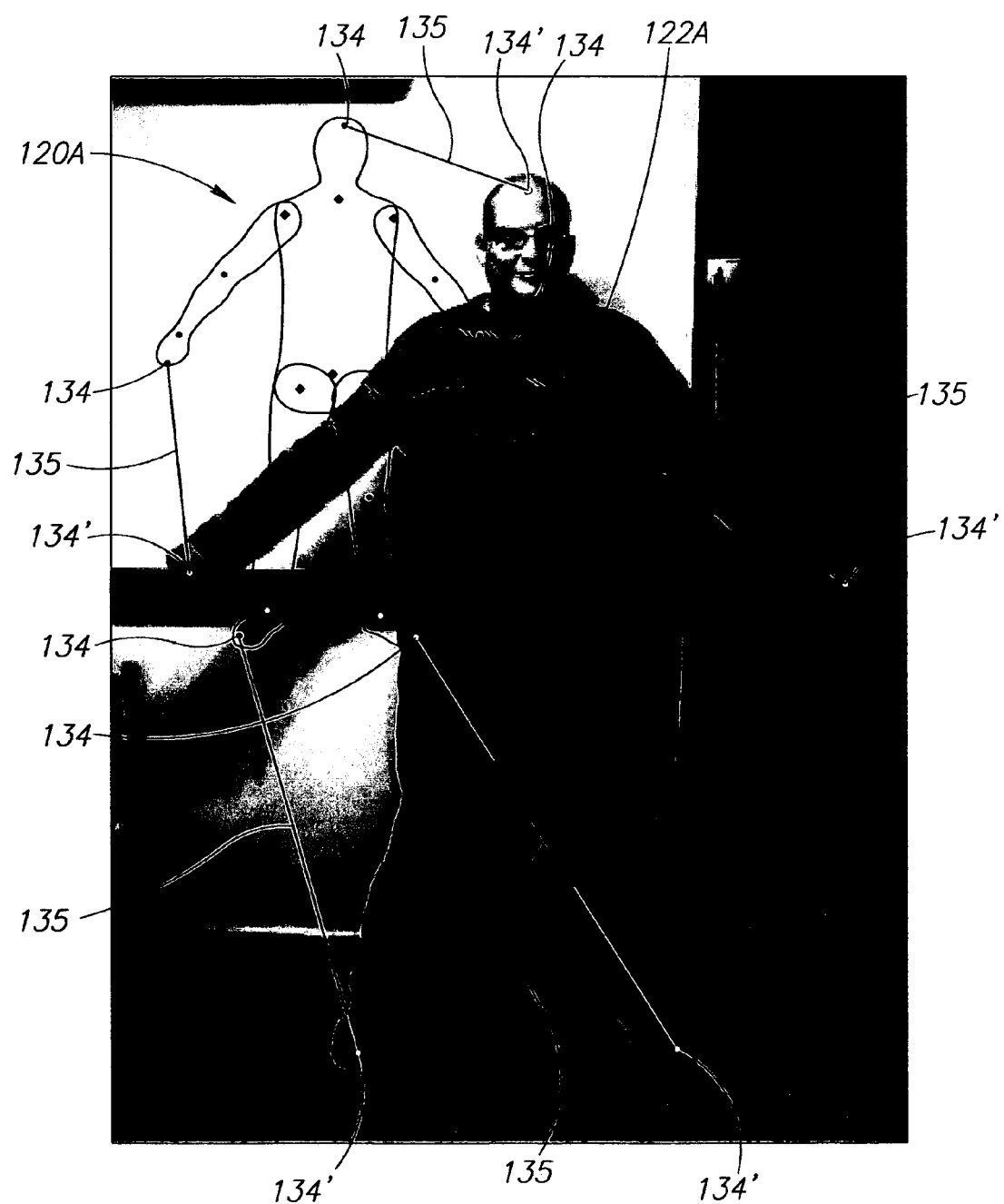
Figure 3E:
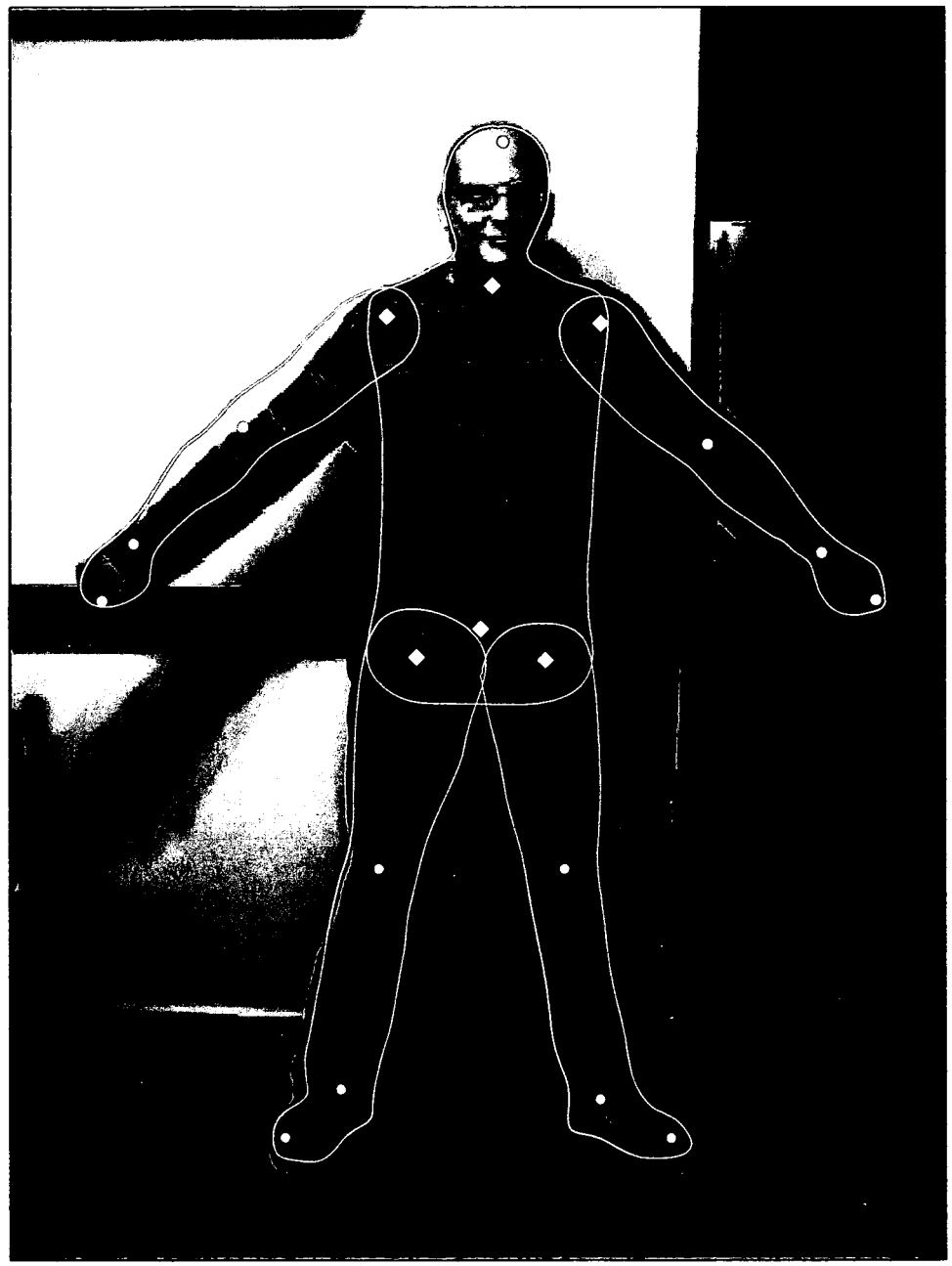

FIGS. 3C, 3D, and 3E, to which reference is now made, illustrate the steps by which a user may use aligner 104 to align model 120A with object 122A. FIG. 3C shows a model 120A with designated alignment points 134. Using a GUI tool, a user may associate an alignment point 134 with a given point in object 122A. For example, the user may use a mouse to click on an alignment point 134 and then "drag" a line to the associated point in object 122A. It will be appreciated that such a "drag and draw" implementation is exemplary. In accordance with another embodiment of the present invention the user may just mark object points.

FIG. 3D shows the results of the user's actions. Lines 135 have been drawn from the extremities (as defined by alignment points 134) of model 120A to the extremities (as defined by the user's selection) of object 122A. After the user finishes drawing lines 135, aligner 104 may then proportionally "stretch" model 120A until it may be generally super-imposed on object 122A, as shown in FIG. 3E.

Modelizer 105 may operate using hierarchical rigidity, where, given a desired fitting accuracy, the rigidity of a single-scale model may be specified by the following three requirements:

1) The number of free parameters (or, degrees of freedom) in each model should be as small as possible to achieve the desired accuracy for any object in the class;

2) Any variation of the free parameters (within the allowed bounds) must preserve the overall structure of the model (i.e. its "anatomy"). For the above example, this may mean that the free parameters of the "enface human model" may be chosen such that they determine the proportions and poses of the body, but do not create either unnatural proportions or unnatural positions; and 3) The model parameters may be identified in a robust way from the requirement that the model provides a fitting, with the specified accuracy, of one of the objects, or a "working part" thereof.

"Hierarchical Rigidity" may describe the specific multi-scale (and\or multi-group) organization of the control parameters of the model and of the fitting procedure. A hierarchically rigid model may be specified as follows:

1) The control parameters of the model may be arranged into m groups $T_1, T_2, \ldots T_m$, where a group Ti may be matched during the ith stage of the multi-scale matching procedure of modelizer 105;

In order to ensure a solution within a reasonably short time, the number of free parameters (degrees of freedom) in the groups Ts before the last group Tm, should be limited to the number necessary to provide a fitting with the required accuracy for the s-th stage. It will be appreciated that successive stages may typically have tighter accuracy requirements. Since the model control parameters are "coupled" (i.e. each parameter usually controls relatively large parts of the model contour which are also affected by other parameters), the parameters of each group Ts may be selected to be "almost uncoupled" (i.e. with the mutual dependence of different groups relatively negligible at the appropriate level of accuracy. For example, for human models (enface and profile), the groups Ts may contain 3-4 parameters.

3) After the model has been fitted to the object with the accuracy required for the s-th scale, the action of the group $T_{s+}$ may be rigid, according to the definition of one-scale rigidity given above. Model converter 103 may generate hierarchically rigid models from anatomically correct and commercially available models. However, the commercially available models, such as those generated by conventional animation tools such as Adobe's Flash, usually do not satisfy the main rigidity requirement as their control parameters are typically highly redundant and are not organized hierarchically. Thus, model converter 103 may organize the model's parameters into small groups of parameters that satisfy the rigidity requirements described hereinabove.

For a two-dimensional model such as model 120A (FIG. 2A), model converter 103 may identify the following parameters from the parameters of an input, anatomically correct, model: alignment points, anatomic parameters, active regions and fine fitting parameters.

Alignment points are points of model 120 which a user may easily identify on object 122 of image 110. For example, points 134 of model 120A are its alignment points. It will be appreciated that the proper positioning of the alignment points of model 120 may determine the position of model 120. In some cases, the model producer may provide alignment points. Otherwise, a designer may chose these points from among the visually distinguishable points on the model.

Anatomic parameters are those parameters, typically available from model providers, which may be responsible for the coarse scale model positioning. In most of the conventional 3D and 2D models of human and animal characters, the anatomic parameters may be the skeleton parameters. In some other models, in particular, in those constructed with Adobe's "Flash" package, or in similar systems which use "sprites", the kinematical parameters (the sprite's translations and rotations) may be equivalent to the skeleton parameters. For example, dots 130 (FIG. 2A), which correspond to the major joints of the human body, may be the anatomic parameters of model 120A. It will be appreciated that the number of anatomic points may not be equal to the number of alignment points. There may, for example, be more anatomic points, such as dots 130, than alignment points, such as points 134

It will be appreciated that, when modelizer 105 may apply the anatomic parameters of model 120 to object 122 of image 110, modelizer 105 may achieve a course scale fitting of the contour of model 120 to object 122.

For some models, especially if the approximate pose of the character is a priori known, anatomic points may be split into "initial" and "secondary" points. The proper positioning on the screen of the initial anatomic points may approximately determine the position of the model. The positioning of the secondary anatomic points may fix the "anatomic" positioning of the model more completely. For model 120A, dots 130 may be the initial anatomic points while dots 131 may be the secondary anatomic points.

The next set of parameters may be "active regions", which may be certain combinations of segments of the contour of the model. As the second level of matching, the required accuracy may be tighter than that for the coarse anatomic parameters.

Active regions are generally geometrically relatively simple. For example, they may have generally square, rectangular, circular, etc. shapes. The contour of each active region may be controlled by its group of parameters and these parameters may not affect other active regions in a significant way. (For example: an active region might be the two sides of the hand in a human model or the contour marked 136 on model 120A.). Together, the active regions control most of the contour of the model.

The main purpose of defining the active regions may be to geometrically "uncouple" the action of control parameters and to exclude from consideration those regions of the model contour where the control parameters act in a redundant and\or degenerate way.

The final set of parameters, with the tightest accuracy requirements, may include the fine fitting parameters, which typically are contour control points. For example, contour points 139, spaced apart by a small number of pixels, such as 10, may form the fine fitting parameters and may be moved perpendicular to the contour when fitting the edges to be matched. Each parameter acts only on its prescribed neighborhood. However, the geometric scale of these neighborhoods may be chosen to make the fine fitting parameters be relatively insensitive to noise. Finally, the range of the fine fitting parameters may be restricted so that they do not affect the global position and/or "anatomy" of the model. Associated with most parameter groups Ts may be contour regions Cs and matching contours Ms, to which a current set of edges may be matched. Each matching region Ms associated may be smaller than the contour region Cs affected by its group Ts. With a smaller region, the action of different parameter groups Ts may be "uncoupled". Furthermore, some portions of the contours of objects in typical images are known to be more noise-affected than other. For example, for a human character enface, the noisy regions may be where the different body parts join. The present invention may select matching regions to avoid these problematic areas.

On the other hand, to make the matching operation relatively robust and noise resistant, the matching regions may be relatively large to attempt to suppress the influence of local noise and false edges. For example, matching regions Ms may cover 60%-70% of the associated contours Cs affected by the associated parameters group Ts.

It will be appreciated that some groups Ts may also comprise the allowed translations, scaling and rotations of the template for the parameters in the group.

It will also be appreciated that relatively small groups Ts of control parameters may be used together with their matching regions Ms independently from one another, within the same hierarchy level. These "groups Ts of control parameters together with their matching regions Ms" may define individual "sub-models" (SMs) of the larger model. As will be described hereinbelow, these SMs are assumed to be rigid. It will be appreciated that the use of such sub-models may facilitate the real time treatment of complicated human templates in a stable manner.

It will be appreciated that the above discussion concerns contour matching for a 2D model. However, a hierarchically rigid parameter organization may be performed for surface matching in three dimensions (a 3D model) as well as for color matching.

Figure 4:
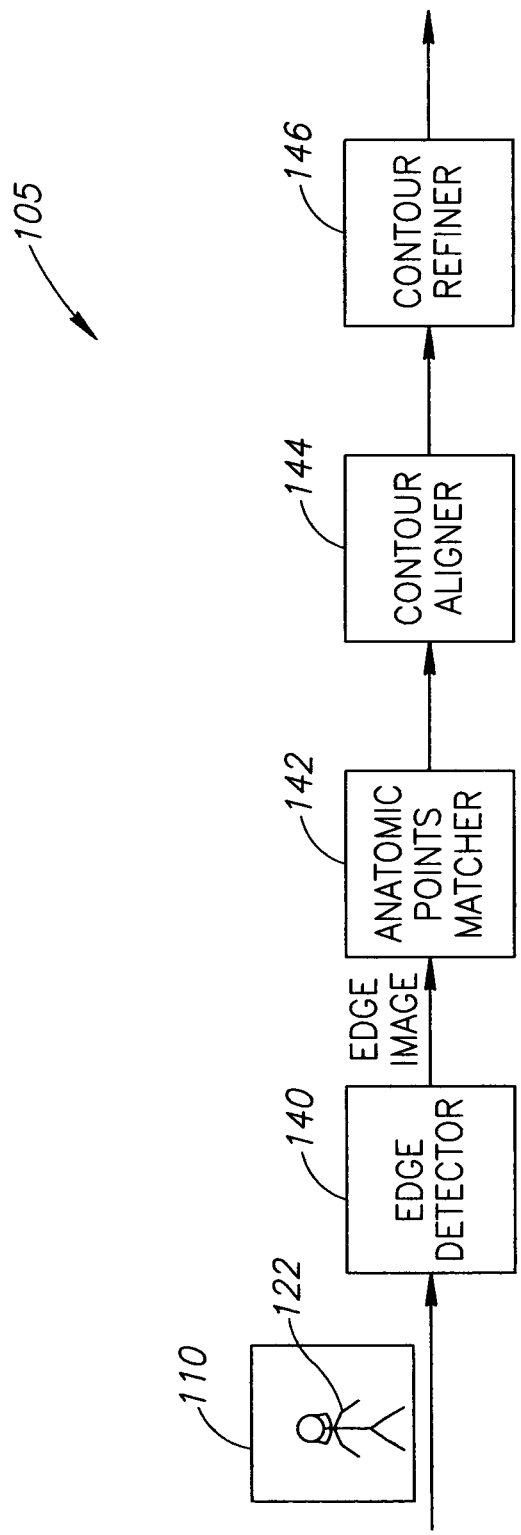
FIG. 4 is a block diagram illustration of a hierarchically rigid modelizer forming part of the system of FIG. 1.

Reference is now made to FIG. 4, which details the elements of modelizer 105. Modelizer 105 may comprise an edge detector 140, an anatomic points matcher 142, a contour aligner 144 and a contour refiner 146.

Figure 5:
FIGS. 5, 6A, 6B and 6C are graphical illustrations useful in understanding the operation of the hierarchically rigid modelizer of FIG. 4.

Edge detector 140 may be any suitable edge detector, such as a Canny edge detector, a Sobel edge detector, etc. such as are known in the art. It may perform edge detection and/or segmentation. Edge detector 140 may find the edges of object 122 as well any other edges in the image. There may be many edges in the image, many of which do not belong to object 122. This may be seen in FIG. 5, to which reference is now briefly made. In the edge image 110' generated from image 110A, there may be edges relating to the patterns on the floor, walls and doors of the room where man 122A is standing. Furthermore, man 122A is wearing a striped sweater and thus, there are many edges marking the pattern of the sweater.

Edge detector 140 may also perform pattern segmentation to generate "weights" $W_j$, indicating the probability that a given edge $C_j$ is a true one (i.e. part of an important object in image 110).

Anatomic points matcher 142 may receive the edge image, such as edge image 110', and may move anatomic points 130, and/or secondary anatomic points 131, and their associated contour sections (described hereinbelow) until the best match of the associated contour sections to the edges is found at a relatively coarse scale. Contour aligner 144 may match edges to the contour of model 120 at a somewhat finer scale and contour refiner 146 may match the edges at the desired, final accuracy.

For each anatomic point 130, matcher 142 may define a scanning space around the current anatomic point 130 and may move it to various scan locations within the scanning space. Moving point 130 may cause its associated contour section to move.

Figure 6A:
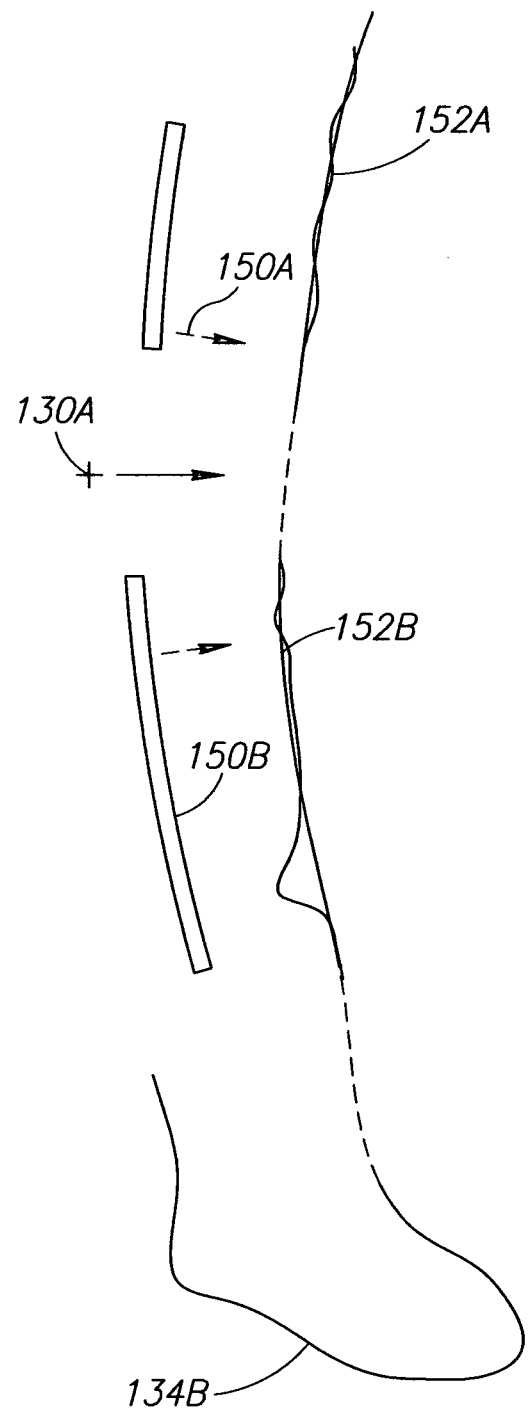

For example, FIG. 6A illustrates left hip anatomic point 130A (representing one group Ts) and its two associated contour sections, 150A and 150B, forming its "matching region" Ms. FIG. 6A also shows exemplary wiggly edges 152A and 152B. Moving hip point 130A to the right may cause associated contour sections 150A and 150B to approach wiggly edges 152A and 152B, respectively. It is also possible that hip point 130A needs to be raised or lowered to cause contour sections 150 to better match wiggly edges 152.

It will be appreciated that, while moving hip point 130, alignment point 134B should not move, as it is a fixed point. Thus, the motion to the right may be a rotation to the right about alignment point 134B. Model 120 may include the association of anatomic points 130 and 131 of a group Ts with their associated contour sections 150 and it may include a definition of how contour sections 150 move when points 130 and 131 move.

Figure 6B:
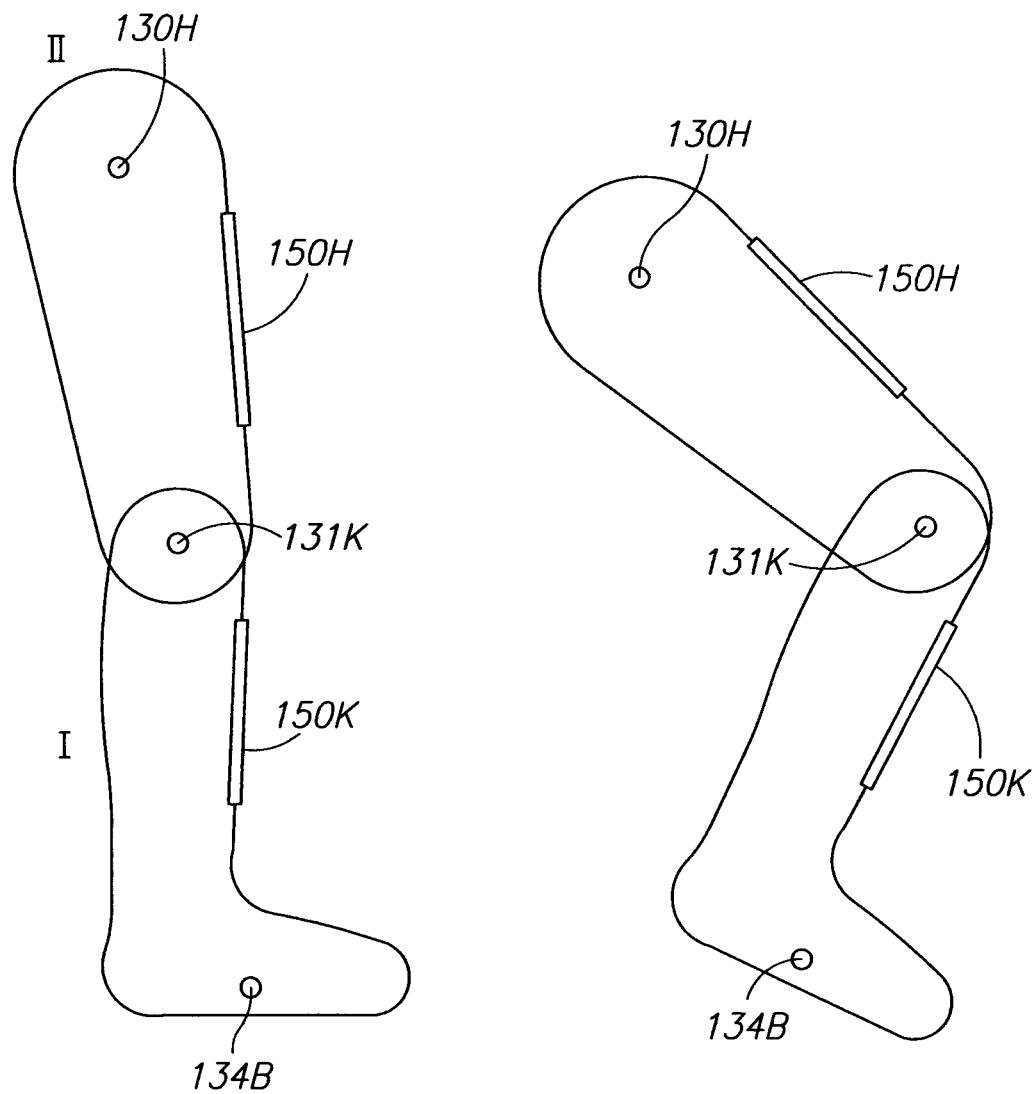

FIG. 6B illustrates the motion about a knee point, labeled 131K. The points of this parameter group are knee point 131K, hip point 130H and foot point 134B, which is fixed, and the group may affect associated contours I and II. Matching contours 150H and 150K, which form only a portion of associated contours I and II, are marked. As mentioned hereinabove, matching contours 150 are located away from joints and other, possibly noisy, areas of the contours.

Figure 6C:
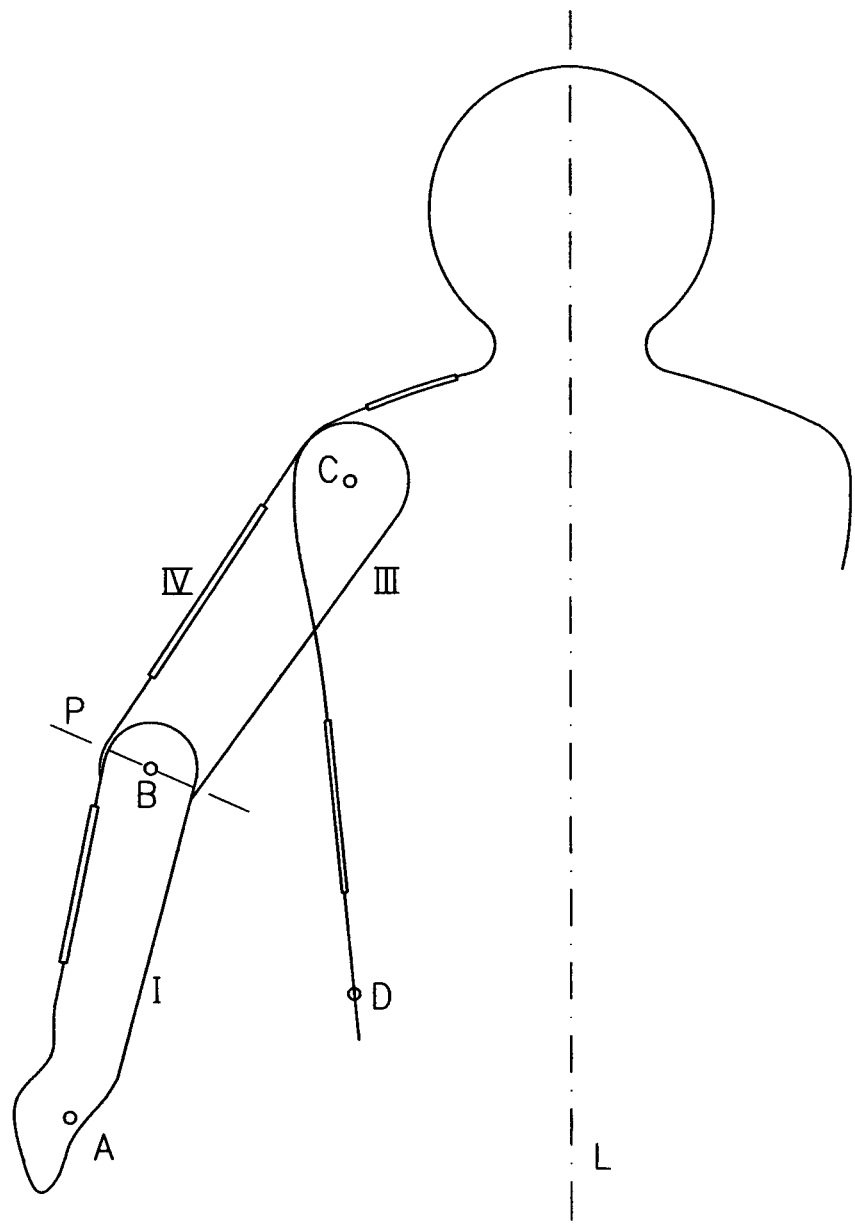

As points 130H and 131K may be moved with respect to each other, and to foot point 134B, in attempt to match contour sections 150 to the current set of edges, associated contours I and II may be proportionally transformed FIG. 6C illustrates a group for the "body-hand-shoulder" region. The points A and D are fixed. The points B and C are free parameters, where the movements of point B are restricted to remain along a line P and perpendicular to the segment [B C]). Associated contours IV and V may be transformed proportionally with the segments [A B] and [B C] while contour lift may be transformed proportionally with the segments [C D]. The matching regions Ms are marked in FIG. 6C by bold segments.

Restriction of the movements of point B to line P, perpendicular to the segment [B C], makes this control group rigid. Indeed, moving B along the segment [B C] almost does not affect the matching region (which is shifted parallel to itself). This restriction also reduces the scanning volume, but almost does not affect the matching quality.

It will be appreciated that SMs may not be completely uncoupled. Typically the action of the groups Ts on the contours may turn out to be coupled. For example, the group on FIG. 6B contains the hip anatomic point 130H as a parameter. Moving this point may affect the bold face line near the point D on FIG. 6C which is a part of the matching contour Ms for the "body-hand-shoulder" group Ts. In some cases the groups Ts themselves may overlap.

As SMs are matched independently, each one may affect parameters of one or more other sub-models. This "feedback" effect is typically restricted and may not compromise the overall accuracy. However, if necessary the matching of these groups may be repeated two-three times, thereby minimizing the effect of coupling and achieving a relatively stable solution.

Figure 7:
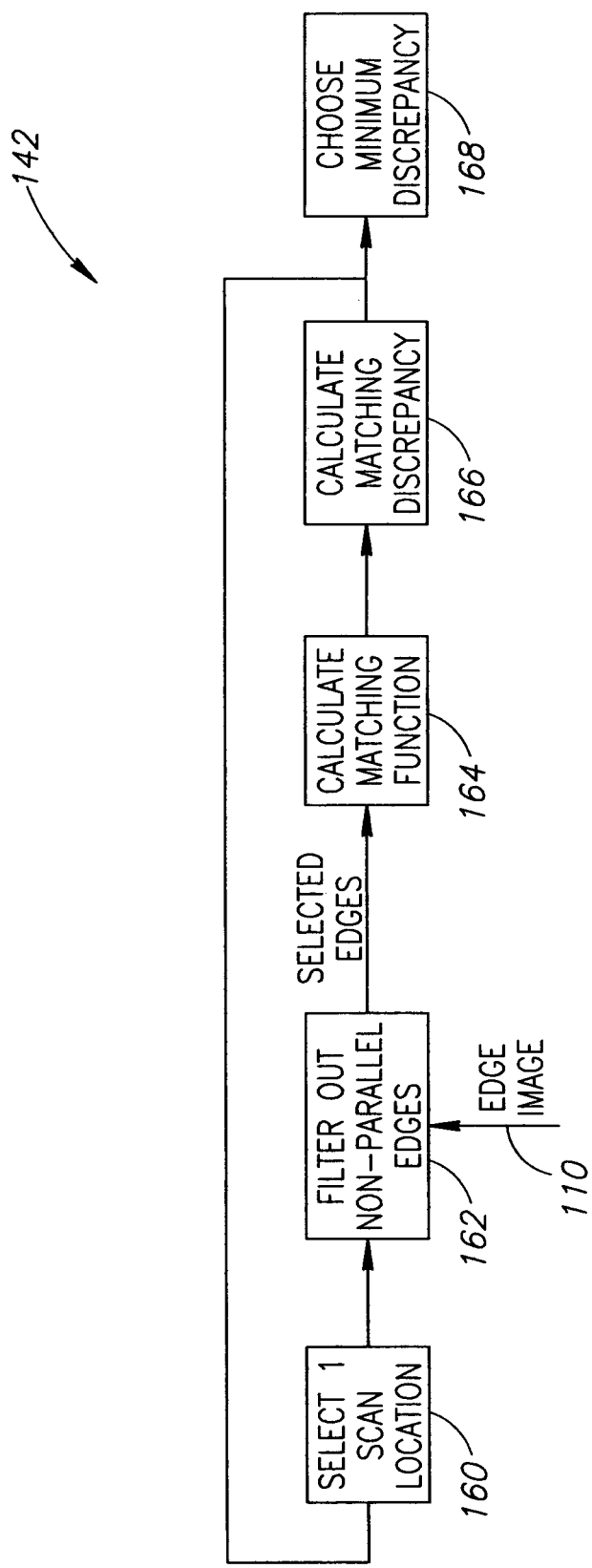
FIG. 7 is a block diagram illustration of a anatomic points matcher forming part of the hierarchically rigid modelizer of FIG. 4.

Reference is now made to FIG. 7, which details the operations of matcher 142. In step 160, matcher 142 may select a current scan location and, in step 162 may filter out those edges of edge image 110' which are not close to parallel to associated matching regions 150 or which are not 'close', in distance, to matching regions 150. Thus, for example, edges that are part of the floor in image 110A (FIG. 2B) will not be included in the edges used to match the matching regions of the current anatomic point 130. In general, edges that are outside of a region of size S1 around matching regions 150 will not be included nor will those inside the region which are at a significant angle to the angle of the corresponding part of sections 150.

In one embodiment, filtering step 162 may comprise the following operations:

1) The edges of edge image 110' may be subdivided into segments Q of length h, h usually being of order of a couple of pixels;

2) For each segment Q, the nearest point z in matching regions 150 may be found;

3) The segment Q may be deleted if either its distance to z exceeds $S'_1$, or its angle with the associated matching region 150 at z exceeds $S''_1$, where exemplary values for $S'_1$ and $S''_1$ may be 20 pixels and 30 degrees, respectively.

The remaining segments may be used in step 164 to calculate the matching function.

If the input edges have weights to them, indicating the probability that the edge may be part of a "true" pattern contour, these weights can be taken into account. In particular, for each segment Q, matcher 142 may multiply the thresholds $S'_1$ and $S''_1$ by the weight of the segment Q.

Matcher 142, in step 164, may calculate a matching function MF between the selected edges and matching regions 150.

In one exemplary embodiment, matching function MF may be defined as the distance along a normal between the associated matching region 150 and segments Q. For each point z in associated region 150, matcher 105 may take a line which is normal (i.e. perpendicular) to the contour of region 150 at point z and may find the point(s) where it first touches one of segments Q. The distance along that line to the intersection with segment Q may be defined as the value of matching function MF. If a point z never intersects any of segments Q, it is not included in matching function MF. Moreover, matching function MF may be computed only for a certain (sufficiently dense) mesh of points on contour 150.

In an alternative embodiment, matching function MF may be defined as the distance to the nearest segment Q. For each point z in associated region 150, matcher 105 may find the nearest point in the segments Q and its distance to point z.

Any suitable calculation of distance, such as a Euclidean distance, L1, L\infty, etc. may be utilized in the present invention. To stress the importance of the fitting with an accuracy of up to a threshold level S2, all distances which are larger than S2 may be set to S2. Alternatively, matcher 142 may throw out such points, with distances larger than threshold level S2. For the latter, matcher 142 may check that the remaining points z cover a sufficiently large part of associated matching region 150. If not, threshold level S2 may be adapted to an appropriate level, for example, 10-20 pixels.

In step 166, matcher 142 may calculate a matching discrepancy MD. In one embodiment, matching discrepancy MD may be defined as the $L^2$ norm of matching function MF over the points z of matching regions 150 that were used to calculate matching function MF. Alternatively, matching discrepancy MD may be a uniform or an intermediate norm of matching function MF. For any of the types of norms, each point z may be weighted by its weight.

Matcher 142 may repeat steps 160-166 for each scan location and may select (in step 168) the scan location which provides the minimum discrepancy. Matcher 105 may then move the current anatomic point 130 to the selected scan location.

It will be appreciated that Matcher 142 may operate on pre-selected groups Ts of anatomic points at one time. Scanning may be performed over all the points in each group Ts simultaneously. After selecting a configuration which provides the minimum discrepancy, modelizer 105 may move all the points in group Ts to their new positions.

Matcher 142 may repeat steps 160-168 for each group Ts of anatomic points 130 and may review the results upon finishing them. It is possible that, as a result of moving anatomic points 130 to their most suitable locations, their complete associated contours Cs may no longer fulfill other model requirements. For example, if the hip points become significantly separated, then the associated contours Cs of the legs may no longer abut, an anatomic requirement. Therefore, matcher 142 may also change the shape of the associated contours to ensure that they fulfill all model requirements.

Matcher 142 may repeat steps 160-168 for each secondary anatomic point 131 and, as for initial anatomic points 130, may change the shape of the associated model contours to ensure that they fulfill all model requirements.

Matcher 142 may operate on a multi-scale form. First, the scanning may be performed with a coarse step, and then a fine-scale sampling may be performed only around the parameters found in the coarse stage.

Finally, matcher 142 may mark those edges of edge image 110', which were used to match the matching regions 150 of anatomic points 130 and 131, with a heavier weight. This indicates that these edges are more likely to be "true" edges. Matcher 142 may also mark that the edges 'belong' to the currently active matching regions 150.

Figure 8:
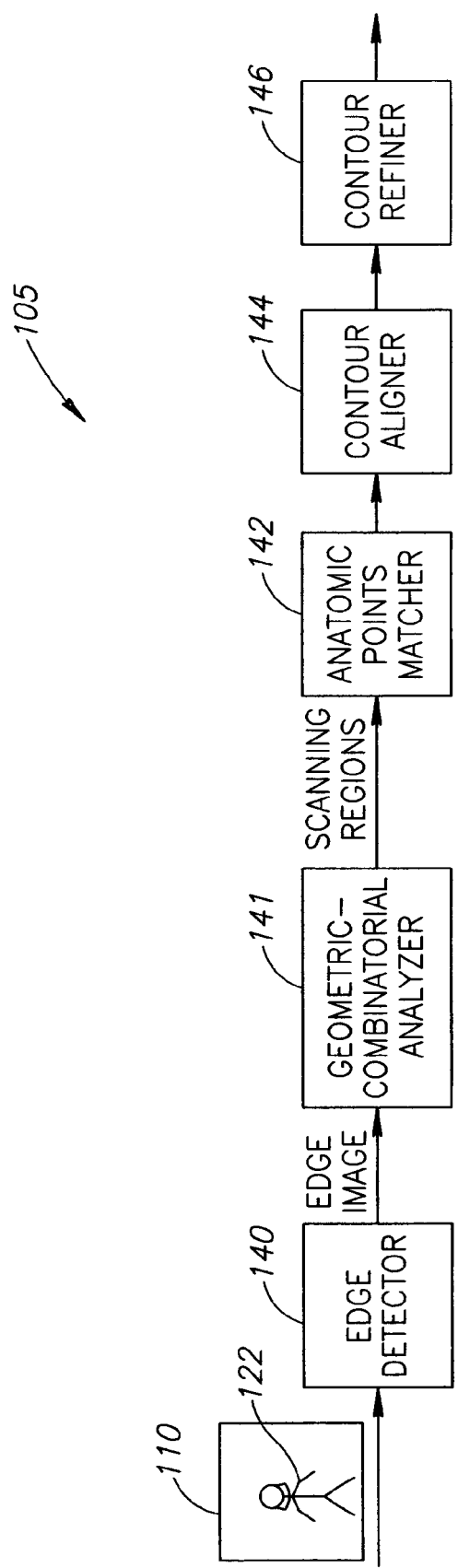
FIG. 8 is a block diagram illustration of a hierarchically rigid modelizer forming part of the system of FIG. 1.

In accordance with an alternative preferred embodiment of the present invention, a model guided geometric search may be used to determine an approximate initial matching position of the model. To implement such a search, hierarchically rigid modelizer 105 may also comprise a geometric-combinatorial analyzer 141 to analyze the edge images that may be received from edge detector 140. As shown in FIG. 8 to which reference is now briefly made, geometric-combinatorial analyzer 141 may receive an edge image from edge detector 140 and forward scanning regions for processing to anatomic points matcher 142.

Figure 9:
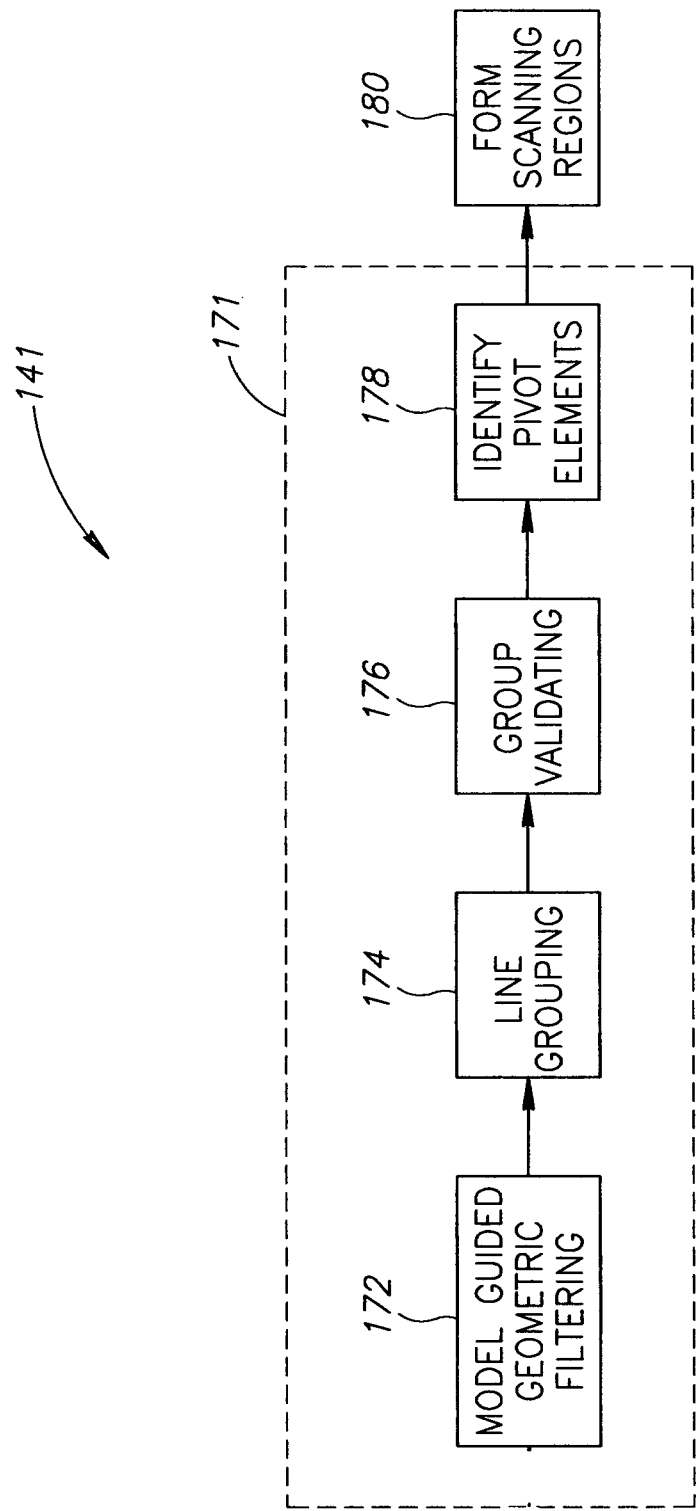
FIG. 9 is a block diagram illustration of a geometric-combination analyzer forming part of the hierarchically rigid modelizer of FIG. 8.

FIG. 9, to which reference is now made, may detail the operation of geometric-combinatorial analyzer 141. Analyzer 141 may analyze the "significance" of the edges that may have been detected by edge detector 140 (i.e. the property of these edges to be the part of the contour of the object under search). Analyzer 141 may also analyze mutual relations between edges, in particular, their property to bound the same piece of the object.

In step 171, geometric-combinatorial analyzer 141 may perform a "geometric-combinatorial" analysis of the edges. An output of this analysis may be a set of possible preliminary positions of the model on the image, together with a likelihood of each position. As shown in FIG. 9, step 171 may comprise sub-steps 172, 174, 176 and 178. The processes of these sub-steps may be detailed further hereinbelow.

In step 172, geometric-combinatorial analyzer 141 may use a filter to perform model-guided geometric filtering. In this step chains of edges may be constructed with a shape approximately corresponding to the shape of pre-specified characteristic regions of the relevant model. Straight lines or parabolas (or higher order curves) may then be defined to approximate these chains.

In step 174, analyzer 141 may use these lines and/or parabolas to form "groups of lines" possibly corresponding to certain pre-specified characteristic regions on the model. In particular, these may be "pairs of lines" that may, for example, possibly correspond to the two sides of the same leg or hand or the upper part of the body. In one specific implementation such a pair may be defined by just two approximately parallel lines.

In step 176, analyzer 141 may use a validator to perform geometric-combinatorial analysis to validate the groups of lines identified in step 174. "Illegal" groups may be discarded. In this step, the relative width of the pairs may be computed, and their relative positions may be checked against the positions of other pairs, and against any a priori known restrictions (the pose of the character, etc.).

The geometric-combinatorial analysis of step 176 may discard most of the initial configurations identified in step 174. However, multiple groups of lines may still remain after step 176. Each of these remaining configurations may be further analyzed in step 178.

In step 178, a pivot elements detector may identify "pivot elements". For the human model in the a priori known pose as shown in FIG. 2A, these may be, for example, hands/palms, feet, and the head. If the pose may be less restrictive (i.e. the arms and legs may be in "bent" positions), the knees and elbows may also be identified.

Analyzer 141 may produce an initial model position in accordance with the identified "pivot elements". The "quality" of this initial position may be computed, based on the contour approximations it provides and model distortion. If the position of the pivot elements contradicts the known anatomic restrictions of the model, or leads to excessive model distortion, the configuration may be discarded. Otherwise, the initial position may be forwarded to step 180.

In step 180, geometric-combinatorial analyzer 141 may form a "scanning region" in a Model Parameter Space (MPS) around each of the preliminary model positions found in step 171. The range of each of the parameters in a scanning region may be predetermined, or it may be defined dynamically according to the results of step 171. These scanning regions may be forwarded to anatomic points matcher 142

Starting at each of the model preliminary positions, anatomic points matcher 142 may perform the matching procedure, as described in the previous embodiments. It may consist of a parameter scanning over the "scanning regions" of the Model Parameter Space (MPS) defined in step 171, and in minimizing the discrepancy of the template fitting. This may be performed according to the hierarchical rigidity structure of the model, as described in the embodiment of FIG. 4.

A successful matching of the model may produce a final output of the search—the identification of the object under the search and the model matched to it. If no successful model matching have been achieved (for all the template preliminary positions), the algorithm may indicate the absence of the object under search on the image.

Figure 10A:
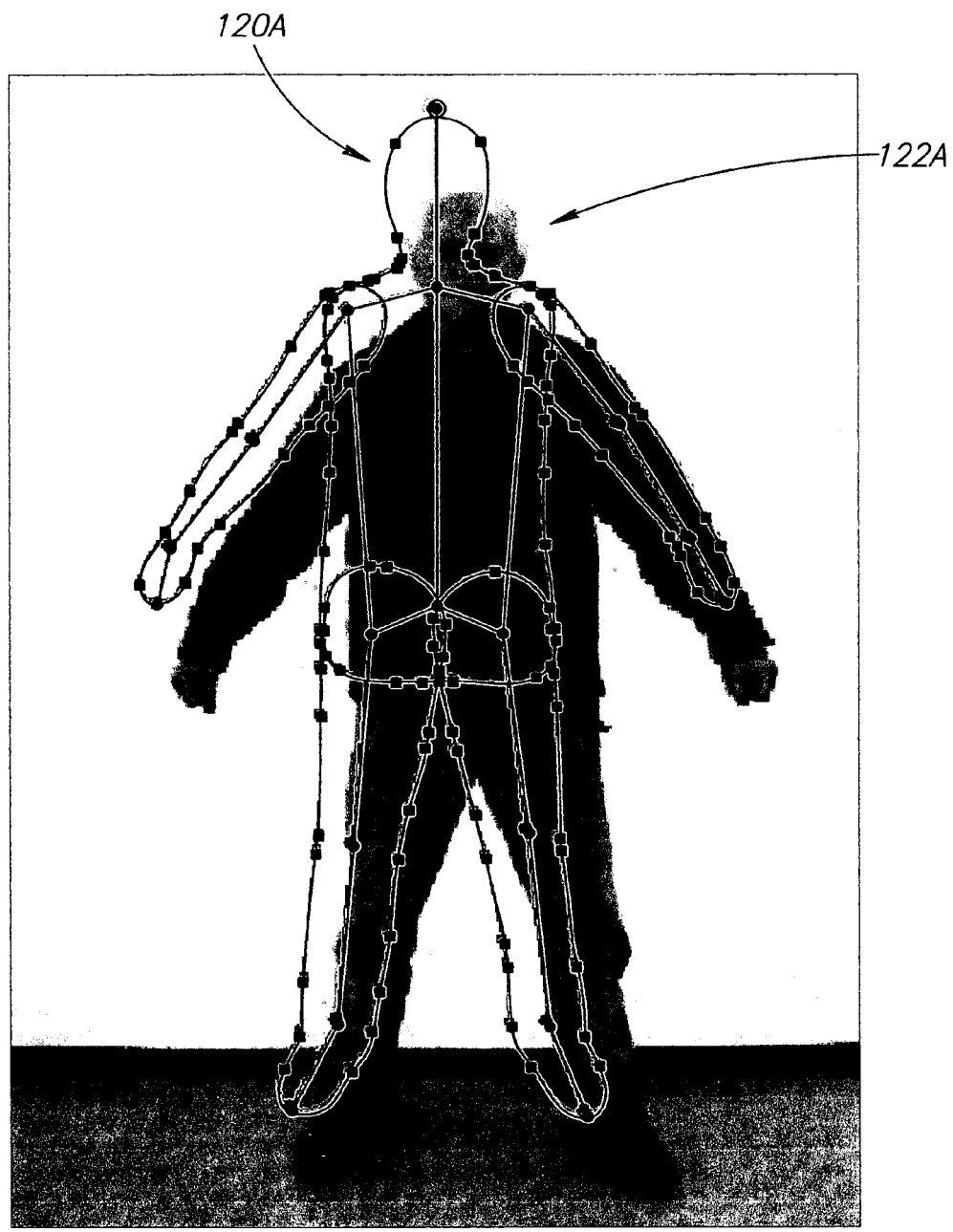
FIGS. 10A, 10B, 10C, 10D, 10E and 10F are graphical illustrations useful in understanding the operation of the geometric-combination analyzer of FIG. 9.
Figure 10B:
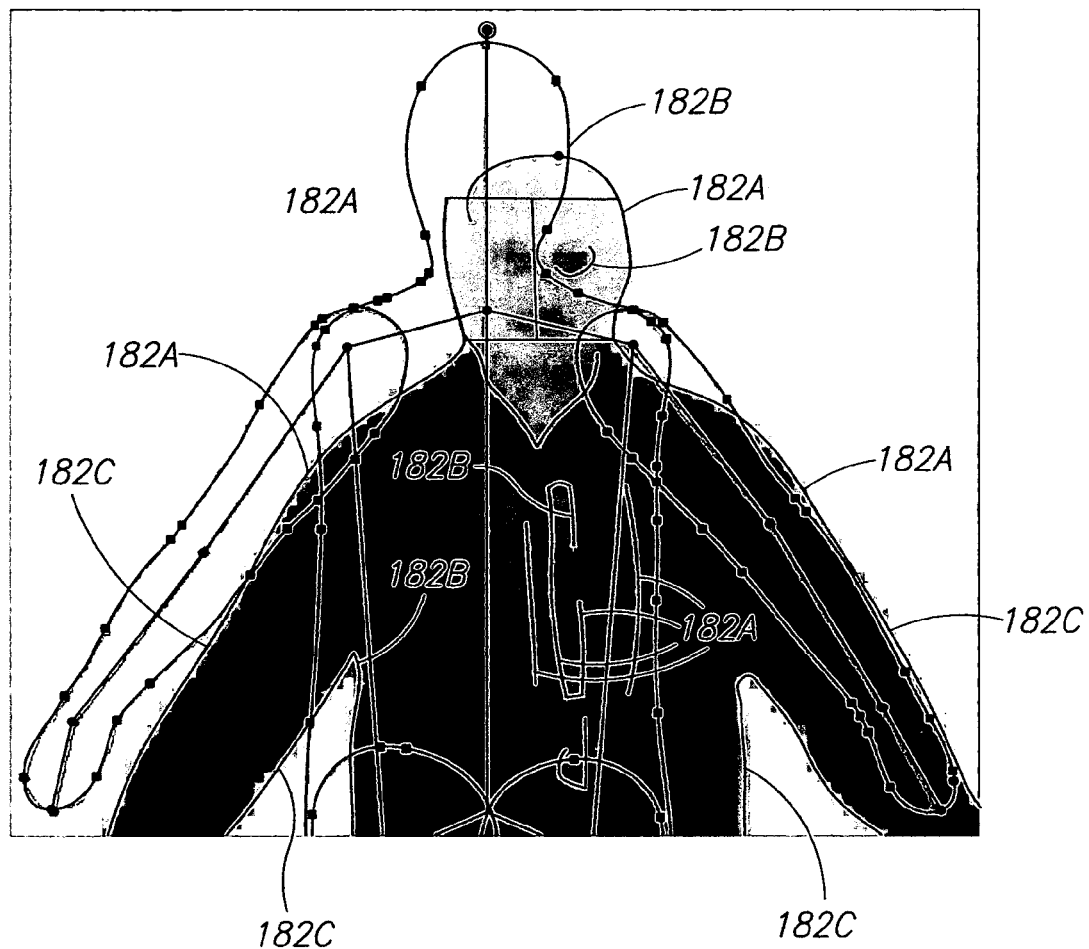

FIGS. 10A-F, to which reference is now made, may illustrate the processes of geometric-combinatorial analyzer 141. FIG. 10A may show an exemplary object 122A to be matched and its corresponding library template 120A. FIG. 10B may show the results of steps 172 for a "head" region associated with object 122A. The initial filtering in step 172 may have been on a comparison of segments direction with the direction of the corresponding guiding part of the contour of model 120A. Lines 182A may represent lines with a high priority for matching; lines 182B may represent lines with lower priority; and lines 182C may represent lines that may not be relevant for the region being analyzed.

Figure 10C:
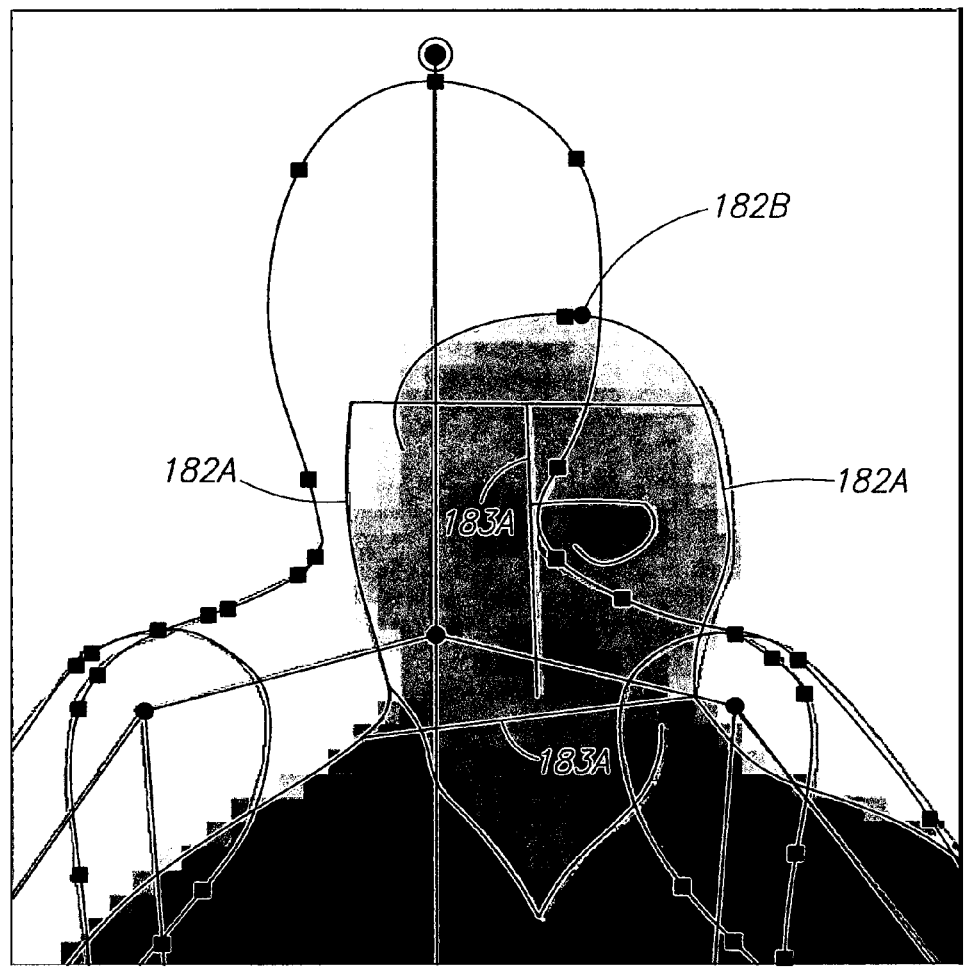

FIG. 10C shows the result of the final filtering and geometric aggregation of the actual contours of the head of object 122 by analyzer 171. Lines 182A may have been grouped together in step 174 and validated in step 176. Lines 183A may show the central line and the support line of the "head configuration" corresponding to the contours defined by lines 182A. Step 178 may have identified point 182B as the upper extreme point of the identified configuration. This may then be used later in the initial template positioning.

Figure 10D:
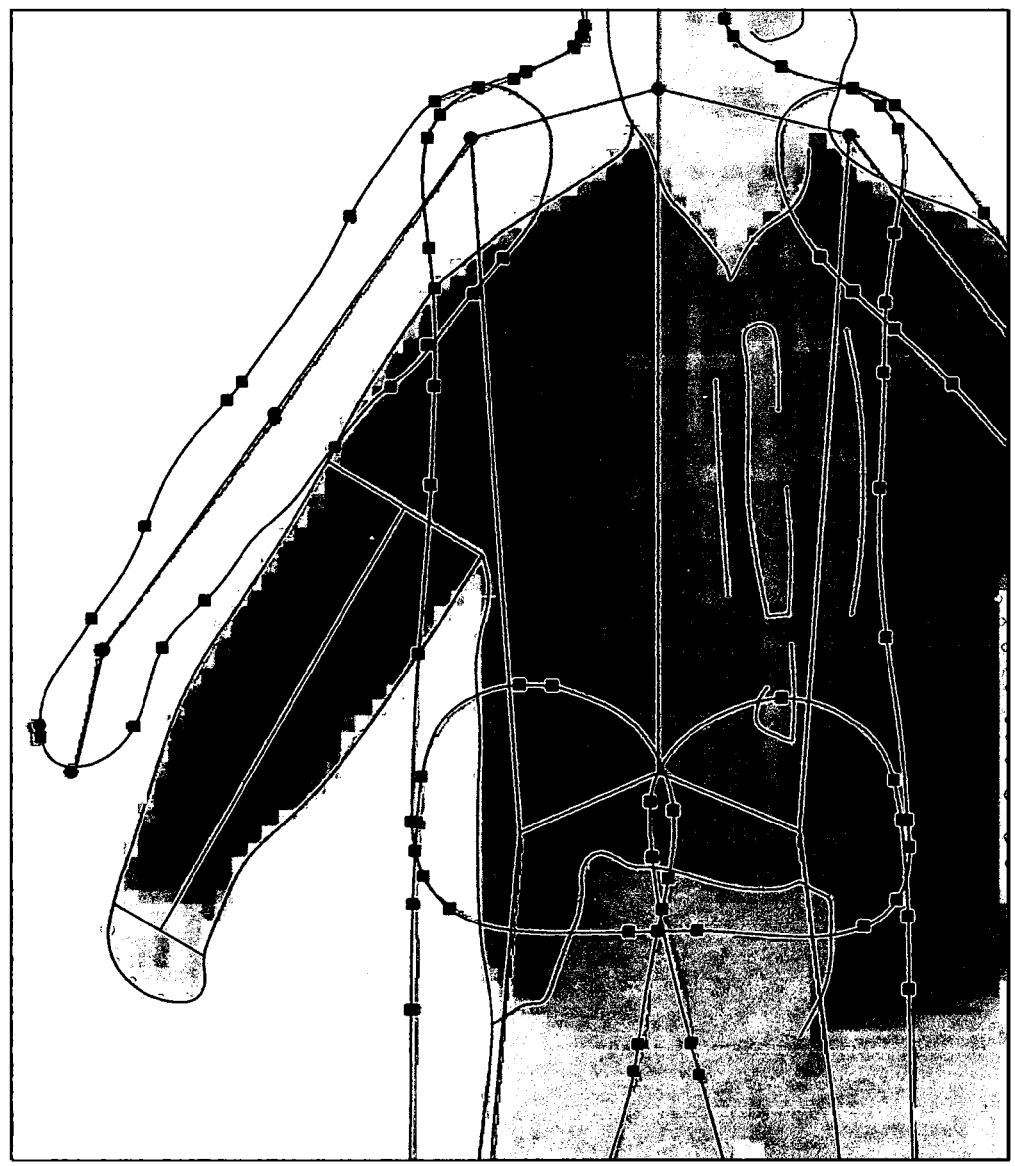
Figure 10E:
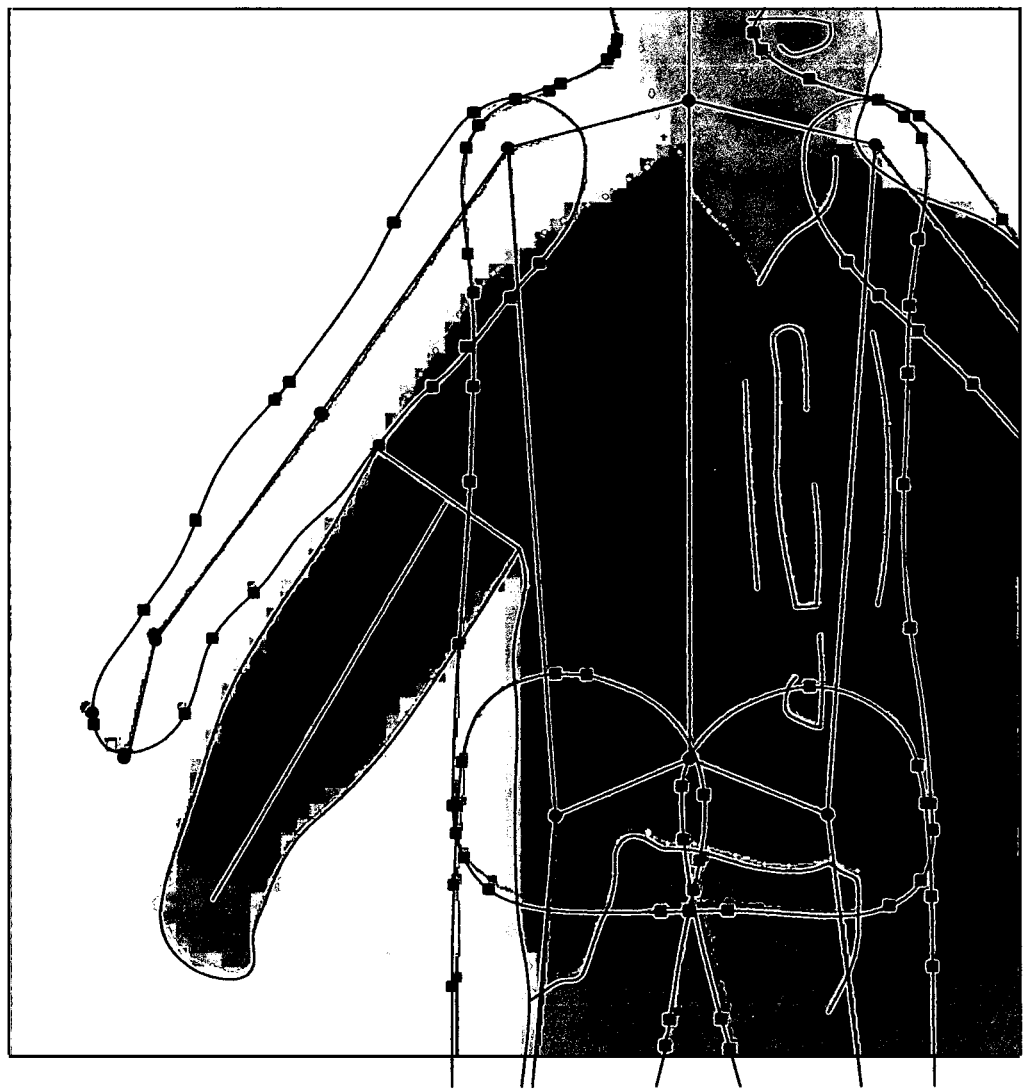

FIGS. 10D-E may show similar processing for an arm region on object 122A. FIG. 10D may show the results of step 172. Lines 182A may represent lines with a high priority for matching; lines 182B may represent lines with lower priority; and lines 182C may represent lines that may not be relevant for the region being analyzed. It will be appreciated that in accordance with the different region being analyzed, some of the lines 182A depicted in FIG. 10B may be depicted as lines 182C in FIG. 10D. FIG. 10E may be analogous to FIG. 10C; showing the result of the final filtering and geometric aggregation of the actual contours of the arm of object 122 by analyzer 171. Control point 182B may have been identified as the intersection of the palm contour with the central line of the arm.

Figure 10F:
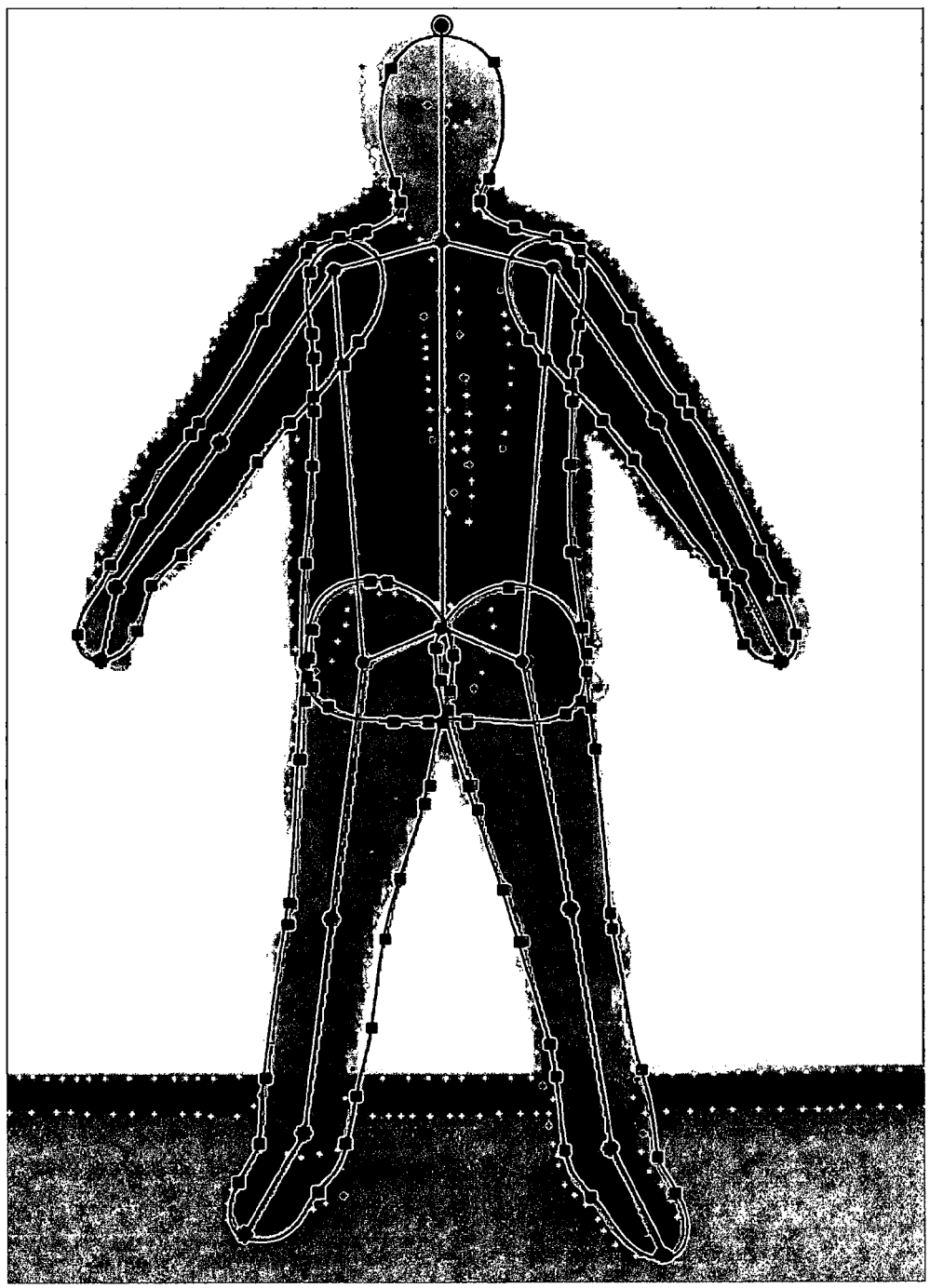

Each region of object 122A may be processed as described hereinabove. FIG. 10F may show an initial template position according to the control points 182B identified by analyzer 141.

In accordance with a preferred alternative embodiment of the present invention, the model-guided geometric search may be implemented using a multi-scale approach. In this implementation, edge detection may be performed in several scales, starting from a coarse representation of object 122A. After edge detection on the coarse scale has been completed, analyzer 141 may attempt to match a model as described hereinabove. If this attempt is unsuccessful, the search task is completed. If successful, the model contours may be "lifted" by a proportional geometric rescaling to the next (finer) scale.

The edge detection and analysis on the next scale may be performed only in a close vicinity of the model contours. This may lead to a drastic reduction in the processing complexity (which may typically be one of the central issues in a visual search).

Successively finer scales may be used with progressively more detailed models until analyzer 141 may no longer improve upon the results of a previous iteration.

It will be appreciated that during the various stages of initial template matching and its various applications it may be important to evaluate (both qualitatively and quantitatively) the quality of the matching achieved. The task of matching quality evaluation may naturally be split into two related sub-problems: assessment of the accuracy of contours (and/or texture) matching, and assessment of model distortion.

Accurate contour matching may not necessarily guarantee a desired level of overall matching quality. Indeed, the matched object may actually be of a different type than the model. Alternatively, it may belong to the same type as the model, but have essentially different parameters. For example, it may be in a different 3D position or in a different pose.

Accordingly, a very accurate contour (and color) matching may be achieved, but at the price of an unacceptable model distortion. Consequently, the "matching quality" must take into account not only the accuracy of the contour and color matching, but also the degree of the model distortion required to achieve such a matching.

It will also be appreciated that automatic animation may require a high level of automatic failure detection. Indeed, inaccurate model matching may often produce undesirable effects in the final animations. Such effects may seriously impact on the user experience and accordingly it may be preferable to avoid presenting them to an end user. An automatic evaluation of the matching quality may solve this problem. Matching results may be considered as successful only when both the contour matching accuracy and the model distortion satisfy preset criteria.

A matching quality control equation may be defined to address the output of anatomic points matcher 142. Matcher 142, in step 164, may also calculate a matching function MF between the selected edges and matching regions 150. The value of the matching function MF achieved in a certain group of the control parameters over the corresponding active region may measure the contour matching quality for this region. The overall contour matching quality may be measured by the maximum of the values of the matching functions MF over all the matching groups.

An equation for model distortion may also be defined within the structure of hierarchically rigid models introduced hereinabove. For each active group of control parameters anatomic restrictions, a "forbidden set" FS of the control parameters may be defined. A "penalty function" PF may also be defined. PF may approach infinity as the control parameters in the group approach the forbidden set FS. The overall model distortion MD may be the sum of the penalty functions PF over all the active regions, and of two additional terms: the "global penalty function" GPF and the stretching function SF.

GPF may measure the distance of the control parameters from the globally anatomically forbidden region. Examples that may demonstrate some global anatomical restrictions which may not be captured inside the active groups may be provided hereinbelow.

SF may measure the total deviation of the control parameters from their associated reference points. The effect of SF may be to assign a better quality to a matching achieved with a smaller stretching of the controls.

Global anatomical restrictions may be relevant for a variety of anatomical parts, including, for example, a foot, leg, shoulder, hip and knee. In the enface model, the hands and the legs must have the same length and approximately the same width. For a child model, the proportions may be different from that of adult models (in particular, the head size). Restrictions may also apply for male-female models, models of thin, normal and large proportions, etc. Restrictions may also apply for the pose; matching an enface model to an object in profile may significantly distort the results.

It will be appreciated that using a single model for all cases, may preclude discrimination according to expected proportions. Accordingly, the present invention may include using several models based on a matrix of qualifications such as sex, age, body build, pose, etc in order to impose a strong penalty for deviation from expected proportion.

The structure of hierarchically rigid models as described hereinabove may allow for a separate matching quality assessment for each hierarchy level and for each active group of control parameters. This may contribute to both automatic quality control, as well as to automatic-interactive problems correction.

Distortion may be evaluated separately at each level of the hierarchy and for each active group of the model's control parameters. Being rigid at each hierarchy level, and for each control parameters group, the model may therefore allow for an accurate evaluation of the distortion as a simple function of the parameters.

Figure 11A:
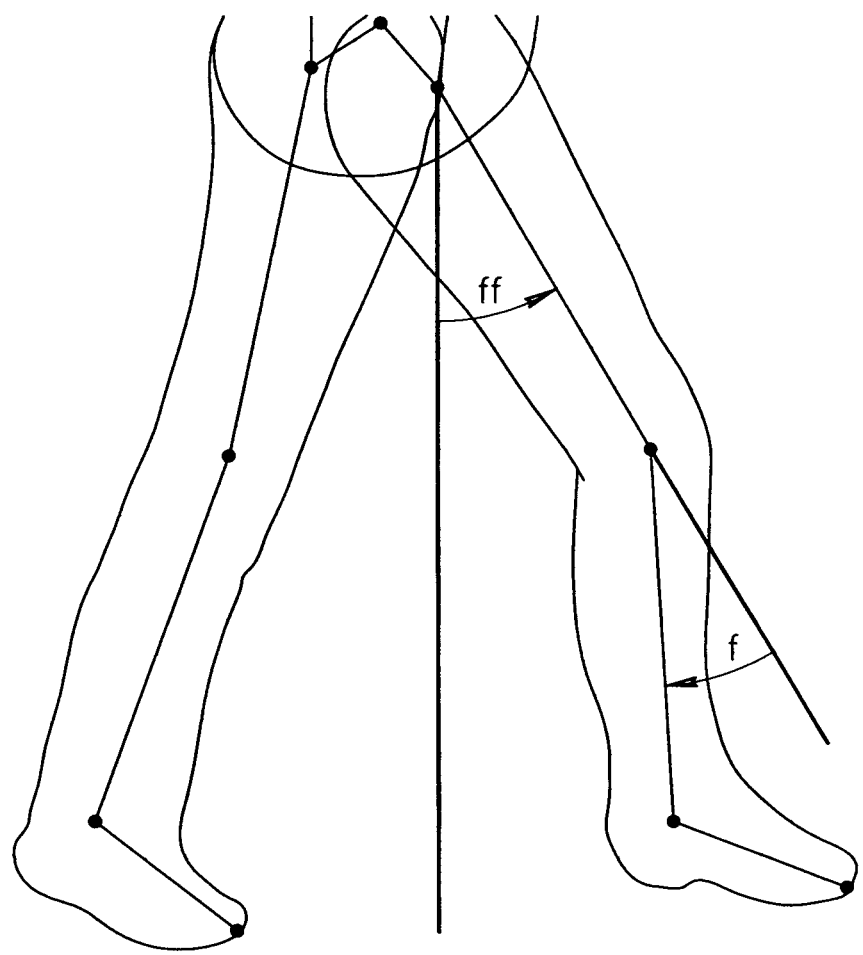
FIGS. 11A, 11B, 11C, and 11D are graphical illustrations useful in understanding the operation of the geometric-combination analyzer of FIG. 9

An example of the highest (anatomical) hierarchy level may be provided by the knee joint as illustrated in FIGS. 11A-D. An angle f between the bones connected to the knee joint may be taken as a group of active control parameters. The forbidden set FS for this group may comprise the negative values of the angle as depicted in FIG. 11A. Angle f may define valid ranges of motion; the leg may not bend in a direction defined as a negative value for f. Distortion here may be measured according to the penalty function PF which may be defined, for example, as 1/f. As PF tends to infinity, the positive angle f tends to zero.

Figure 11B:
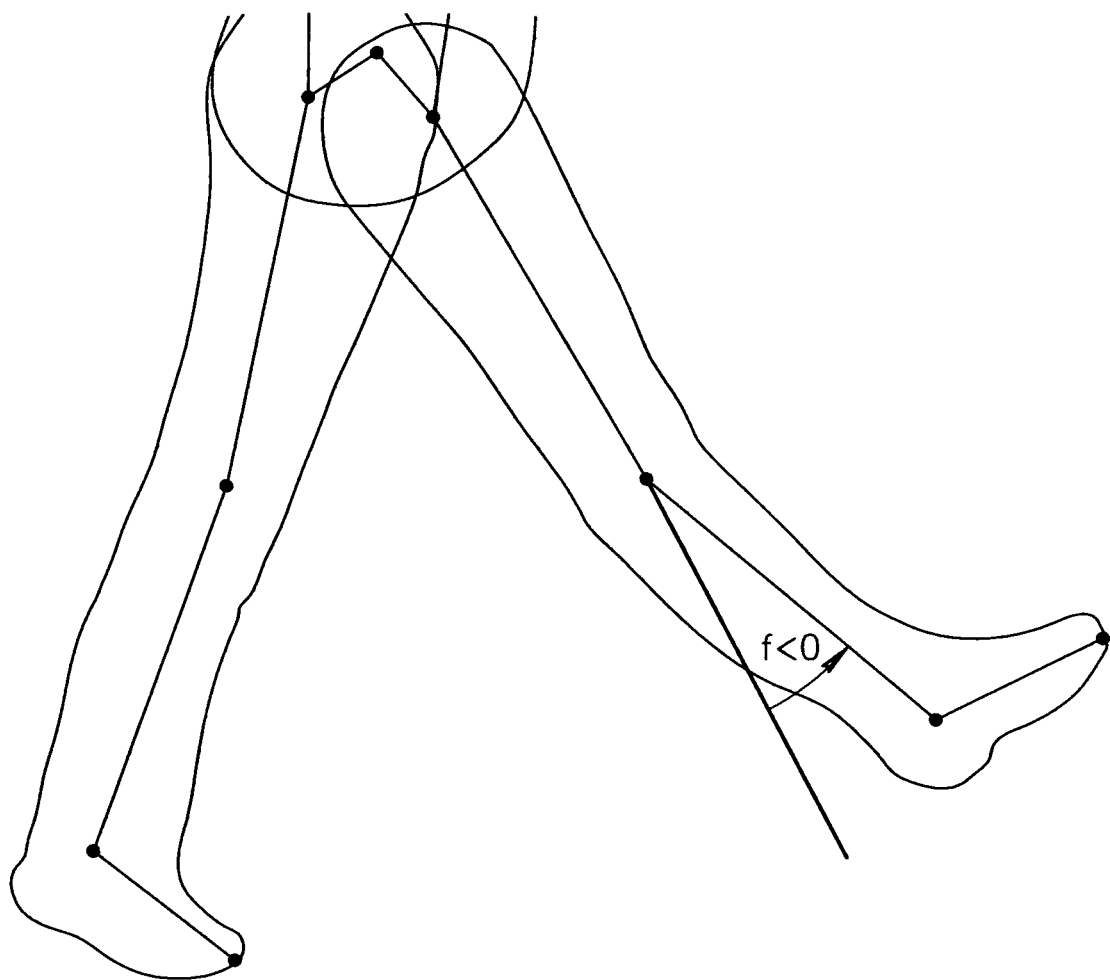
Figure 11C:
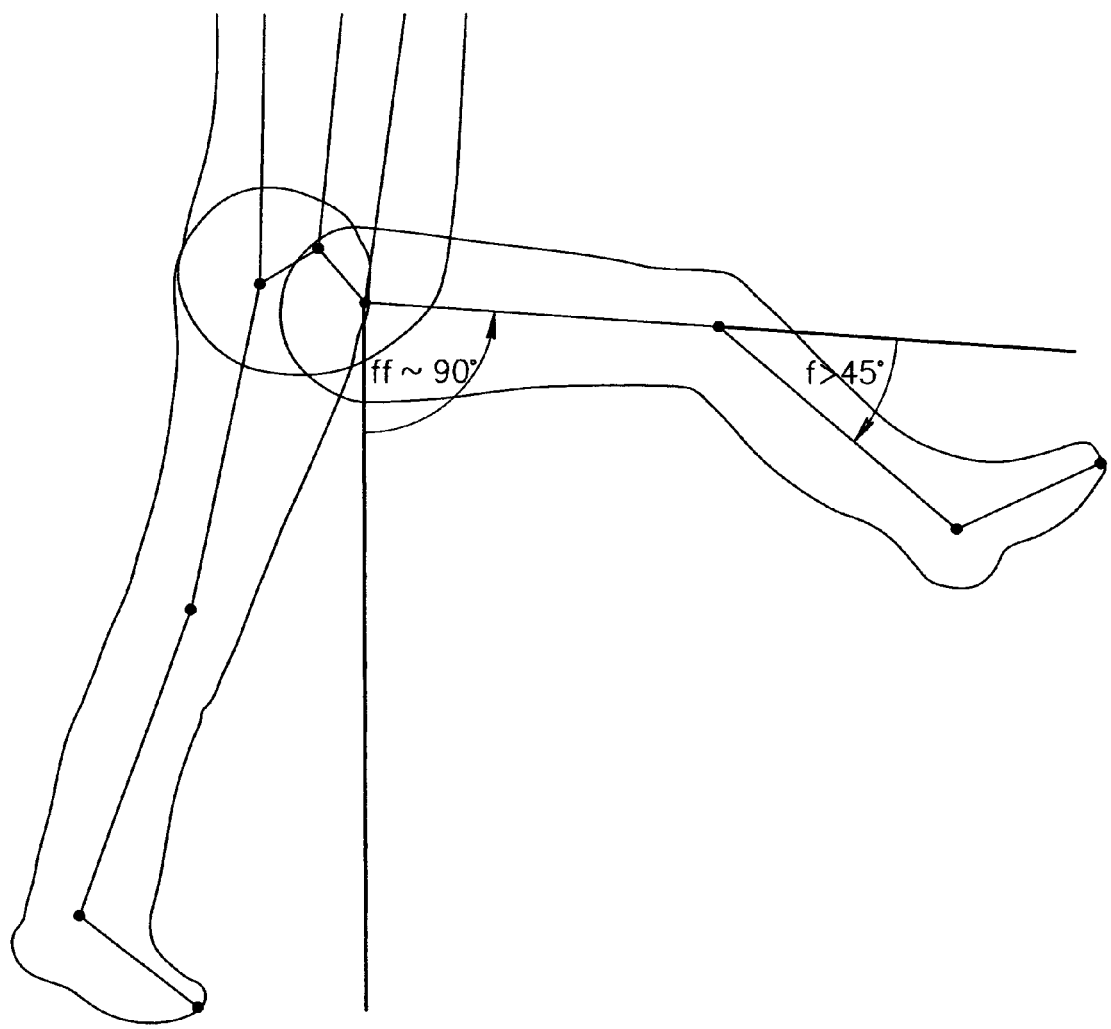

In accordance with a preferred embodiment of the present invention, there may be a global penalty function GPF. Let ff, as shown in FIG. 11A, be the angle between the vertical direction and the upper leg at the hip joint. For small values of ff, the angle f may be almost zero. However, for ff larger than roughly 45 degrees such as shown in FIG. 11B, the minimal value of f that may be achieved by an average person may be roughly 22 degrees. For ff approximately equal to 90 degrees as shown in FIG. 11C, f may not be smaller than roughly 45 degrees.

Accordingly, for a model of an average person a globally forbidden region may consist of a set of combinations of the angles (f, ff) where f is too close to zero while ff is relatively large. The global penalty function may be represented by a linear approximation: GPF(f, ft)=infinity if f>=1\2 ff, and GPF(f, ff)=1\(f−1\2 ff) if f<1\2 ff.

Figure 11D:
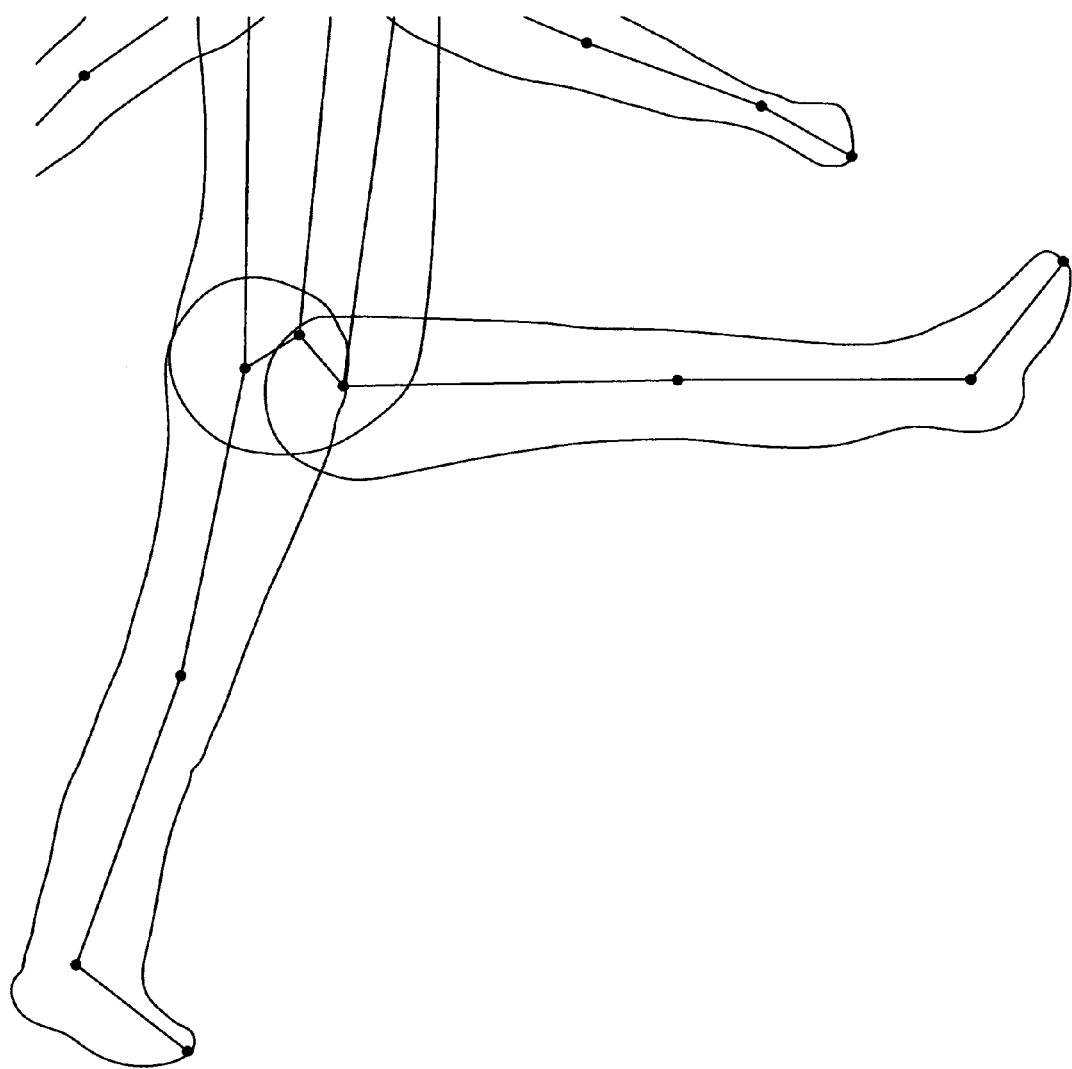

It will be appreciated that for unusually flexible persons, such as trained athletes or dancers, there may be different valid ranges associated with f and ff. As shown in FIG. 11D, for such a person, f may equal zero for an ff exceeding 90 degrees. For such persons ff may have a maximum approaching or even exceeding 180 degrees. It will therefore be appreciated that a globally forbidden region defined for models associated with such a population may be adjusted accordingly.

On each hierarchy level all the control parameters groups may be geometrically and "anatomically" localized. This fact may facilitate localizing matching problems. In particular, in an automatic-interactive matching user intervention may only be required to address problematic areas. These areas may be marked automatically to simplify the user's task.

In the automatic matching process, anatomic restrictions and the penalty function PF may be used as follows: The "forbidden set" FS of the control parameters may be excluded from parameters scanning. The penalty function PF may be added to the matching function MF. In such manner, control positions which may provide a good contour fitting with overly large model distortion may be discarded.

Contour aligner 144 (FIG. 4) may provide a finer-scale match. It may operate on active regions 136 and may attempt to match the contour of each active region 136 to its associated set of edges. Contour aligner 144 may move parametric points 138 (FIG. 2A), causing the associated contour between points 138 to wiggle to maintain a smooth contour. For each scan location, contour aligner 144 may determine matching discrepancy MD, as described hereinabove for matcher 142. Moreover, contour aligner 144 may utilize the weighting information from matcher 142 in its calculations. In turn, it updates the weights and marking of the edges, to be used by contour refiner 146.

Finally, contour aligner 144 may repeat its operations for different sampling sizes.

Figure 12:
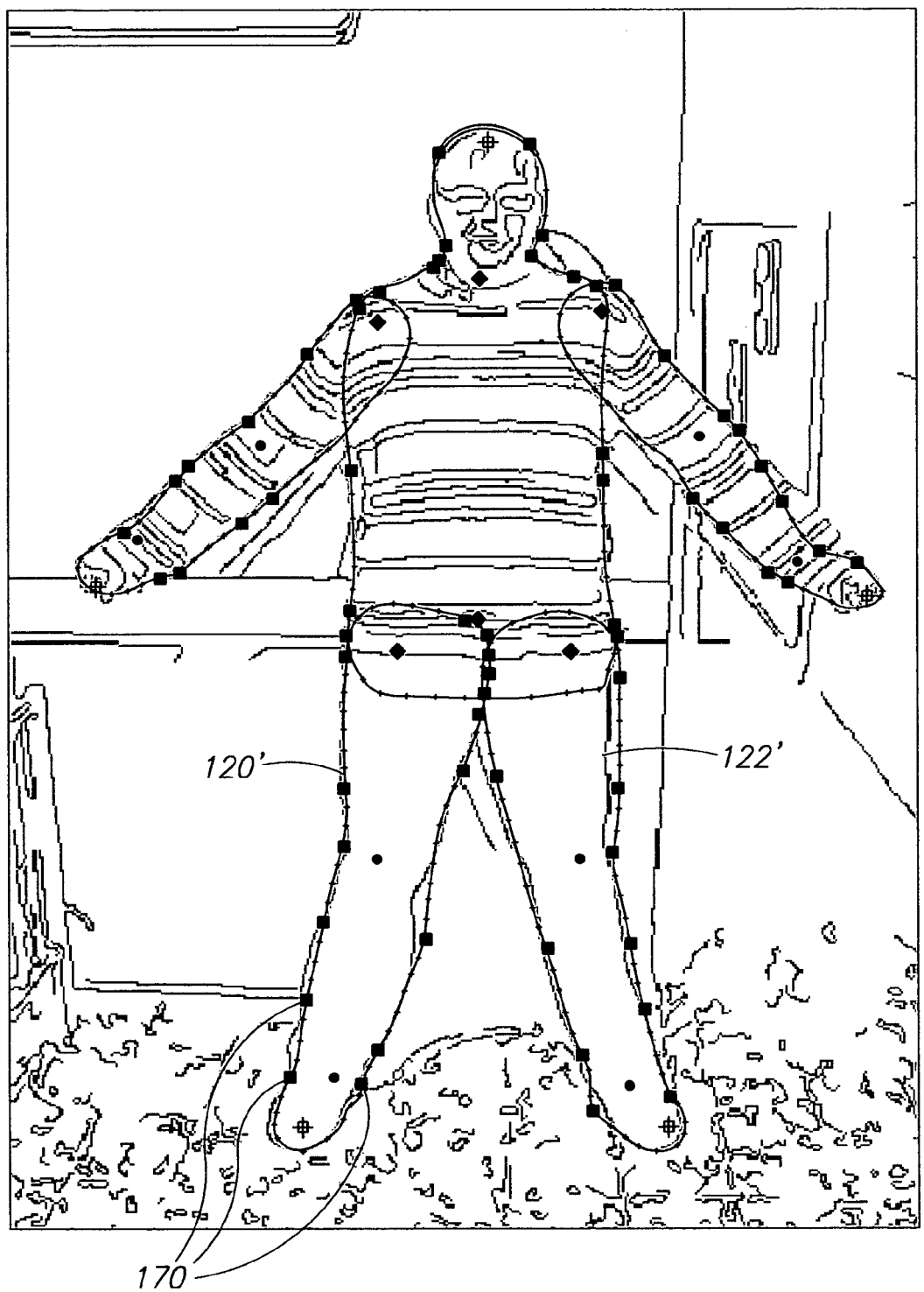
FIGS. 12, 13A, 13B and 14 are graphical illustrations useful in understanding the operation of the hierarchically rigid modelizer of FIG. 4.

Reference is now made to FIG. 12. In another embodiment, contour aligner 144 may operate with four points on a part of the contour (e.g. the four bold square points 170 on the left bottom contour of the leg of FIG. 12). Contour aligner 144 may fix the two outer points while leaving the two middle points to move in a direction perpendicular to the contour. The contour segments between the points may follow the new position of points 170, being rescaled proportionally. The matching region Ms for this group of parameters may be the segment between the two middle points. The parameters group T consists of two parameters measuring the replacements of the control points.

FIG. 12 shows the results for the exemplary image after the operation of contour aligner 144. As can be seen, most of the contours of the model, here labeled 120', are reasonably aligned with the outline, here labeled 122', of man 122A.

Figure 13A:
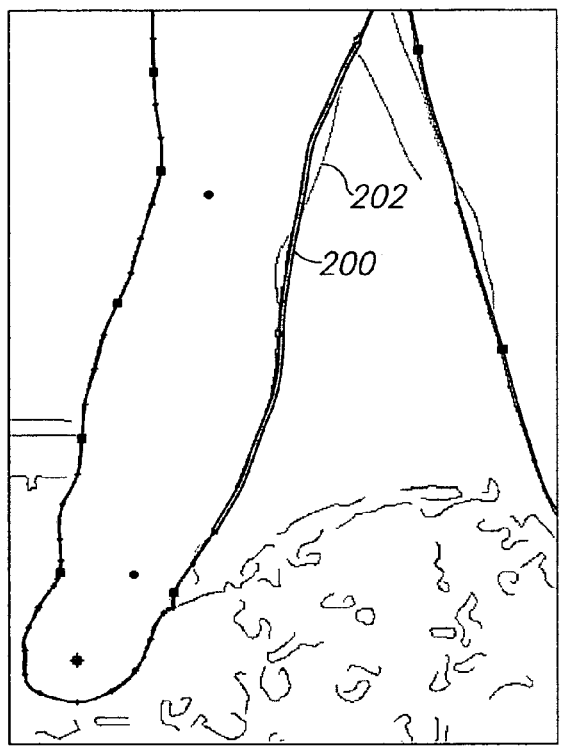

However, as can be seen in FIG. 13A, to which reference is now briefly made, some of the curves of model 120' are poorly aligned. FIG. 13A is a blow up of the knee area for the right knee. The contour marked 200 of model 120' does not at all match the edges, marked 202, in its neighborhood.

Contour refiner 146 (FIG. 4) may attempt to refine contour 200. Contour refiner 146 may review the contours of model 120' and may compare them to the edges most strongly associated therewith (i.e. those edges whose weights indicate that they are 'true' edges and/or those edges which are marked as 'belonging' to the sections of the contours of models 120').

Figure 13B:
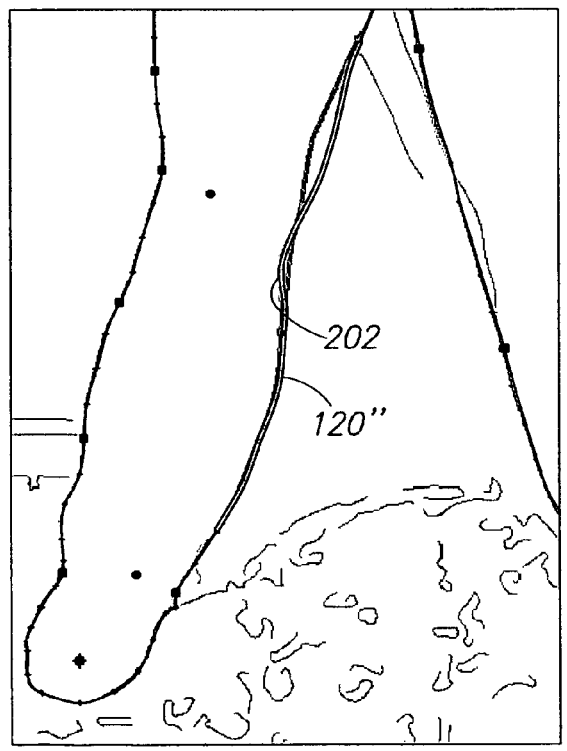

If the weights already assigned to the associated edges are large enough, contour refiner 146 may take the associated edge for the shape of the contour of the model, thus moving the contour to the associated edge. This is shown in FIG. 13B, to which reference is now briefly made. The relevant segment of contour 120" now has the shape of edge 202. Specifically, this can be done as follows: for each model contour point z in a relatively dense grid (e.g. typically of 2-5 pixels), contour refiner 146 may take a perpendicular line to the contour and find its intersection z' (in a close vicinity of z of a size 3-6 pixels with a marked edge whose weights are large enough). Then, contour refiner 146 may move contour point z to z'. If there is no such z' close to z, then point z may not be moved.

In accordance with an exemplary embodiment of the present invention, one specific implementation of the contour refinement may be as follows: first describe a procedure of weights assignment to edges. Segments of model contour may be considered in a position achieved on the previous steps of matching. For each model contour point z in a relatively dense grid (e.g. typically of a step 2-5 pixels) the closest point z' in the neighboring edges may be taken. A percentage of the points z, for which the distances from z to z' are the largest may be discarded. An exemplary percentage may be 20% of the points z.

A weight of 1 may be assigned for each edge containing either at least N1 (typically 10-15) points z' closest to the non-discarded points z, or at least a certain proportion (typically 20%-30%) of the points z' closest to the non-discarded points z. Otherwise the weight 0 may be assigned to the edge. Next a threshold Dmax may be defined as equal to N2 if there is only one edge containing the points z'. Dmax may be defined as equal to N3 if there are exactly two such edges, and Dmax may equal N4 if there are three or more such edges. Typically, N2 may be 4-8 pixels, N3 may be 3-5 pixels, and N4 may be 2-4 pixels. Finally, each non-discarded point z may move to position z' if the following two conditions are satisfied: A). z' belongs to the edge assigned with the weight 1. B). The distance between z and z' does not exceed Dmax. Otherwise, point z may not move.

Figure 14:
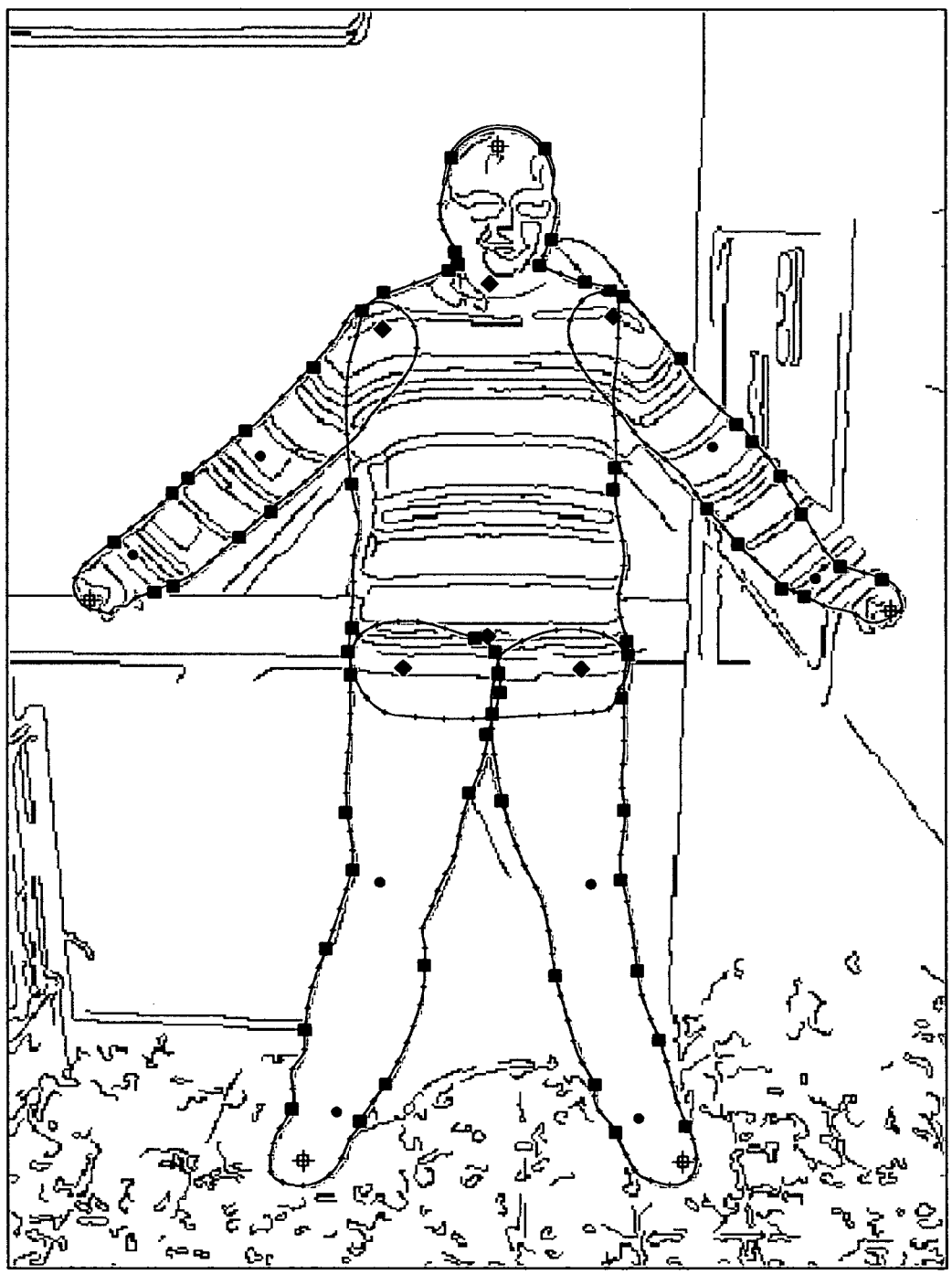

It will be appreciated that contour refiner 146 does not use a "discrepancy function" and its minimization since, during fine scale correction, the noise may be larger than the expected correction. So, contour refiner 146 may instead work with the "high quality", noise-free edges marked in previous steps. Contour refiner 146 may then simply move the contour to the high quality edge. Contour refiner 146 may also use a limitation for a maximal displacement of the model contour points. Typically it may by of order of 2-6 pixels. Contour refiner 146 (FIG. 4) may repeat this operation for each segment of the contour, producing the final model 120A. As can be seen in FIG. 14, to which reference is now made, model 120A is a reasonable accurate match to man 122.

Object cutter 106 (FIG. 1) may cut object 122 from image 110 along the contour generated by contour refiner 146 and may assign the cut object as the texture of model 120A, thereby generating finalized model 120B. Optionally, object cutter 106 may provide finalized model 120B to animation adapter 108 which may replace its model with model 120B.

It will be appreciated that animation adapter 108 may be used in many contexts. For example, and as described hereinbelow, adapter 108 may be utilized for greeting cards and interactive games on the Internet and/or on cellular telephones. In another example, animation adapter 108 may generate camera animation and/or a "Virtual Theatre" application. The animated characters may also be used as "avatars" in popular "virtual worlds".

Animation adapter 108 may provide personalization to animated characters. Such animated characters may be found in greeting cards and/or interactive games. Thus, a greeting card company may create a blank animated model and a user may utilize modelizer 105 and animation adapter 108 to provide personalization to the model. Similarly, the user may use the system to provide personalization to a blank animated character of a game. In the latter case, it appears to the user that s/he has become a character in the game. It will be appreciated that in the applications described hereinabove the user may stop animation at any desired moment and continue it with another library animation piece. In particular, the user may give the animated character commands like "jump", "dance", "bend", etc.

To use the present invention in an animated greeting card or game, the user may generate an image of the character to be animated. Alternatively, he may select an existing image. In both embodiments, he may provide the image to system 100 to generate the relevant animated character, where the animated character may be provided from the game or greeting card rather than from animation library 102. The result is a personalized character for the game or greeting card.

Figure 15A:
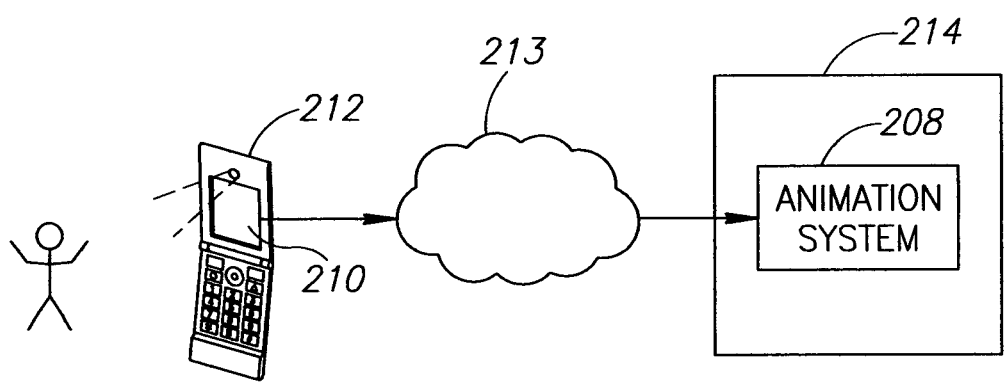
FIGS. 15A, 15B, 15C and 15D are schematic illustrations of the system of FIG. 1 adapted for use on a cellular phone, constructed and operative in accordance with a preferred embodiment of the present invention.

For cellular phone greeting cards and interactive games, the user may utilize the camera of the cellular telephone to generate the image of the character to be animated. Since the interactive possibilities of cellular telephones are limited by the screen and the keyboard, this embodiment, shown in FIG. 15A to which reference is now made, may include an image aligner 210 on the cellular telephone, labeled 212, that may acquire the initial information. Image aligner 210 may be similar in function to aligner 104 (FIG. 1). Image aligner 210 may require a minimum of interactive operations from the user. For example, image aligner 210 may require that the object (person or otherwise) pose in a position close to the initial position of the model to be matched. Image aligner 210 may then require the user to use the cursor of the cellphone to mark 1-5 matching points 134' on the image to be cut.

Image aligner 210 may then transmit the image, the model and matching points 134' through the Internet 213 to a server 214 upon which an animation system 208, formed of modelizer 105, object cutter 106 and animation adapter 108, may operate. System 208 may then generate the animated model which may then be transmitted back to the cellular telephone in one of the formats supported by the phone (for example, GIF, Video MP4, 3GP. AVI, "Flash" or MMS). Image aligner 210 may allow the user to check the resultant animation, and, if approved, may include it into a desired application like a conventional cellular phone greeting card or an interactive game.

Some cellular phones may have no useful cursor, so it may be difficult to "mark" a point. In this case, image aligner 210 may operate as follows:

Alignment points 134 may appear on the model, one after another. An initial marker point 134' may appear on the screen with its associated alignment point 134 and the user may utilize predetermined control buttons of the device to move marker point 134' left-right and up-down on the screen. After marker point 134' has been positioned on the screen in the desired location, the user may press another specified button to confirm the completion of the marker point positioning.

Once all marker points 134' have been marked, the user may press a "positioning button", and the model may be automatically positioned on the screen, as described hereinabove.

Figure 15B:
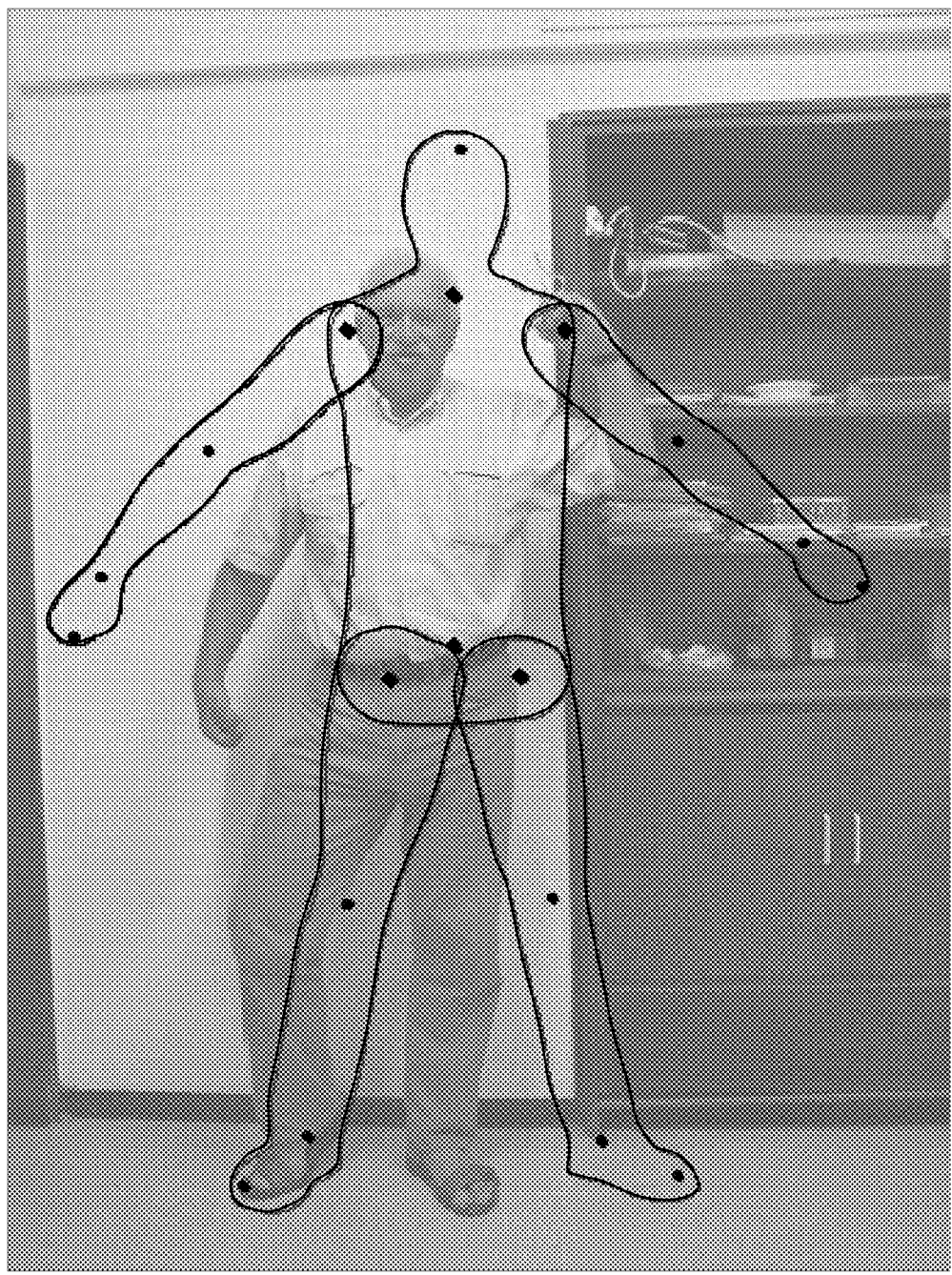
Figure 15C:
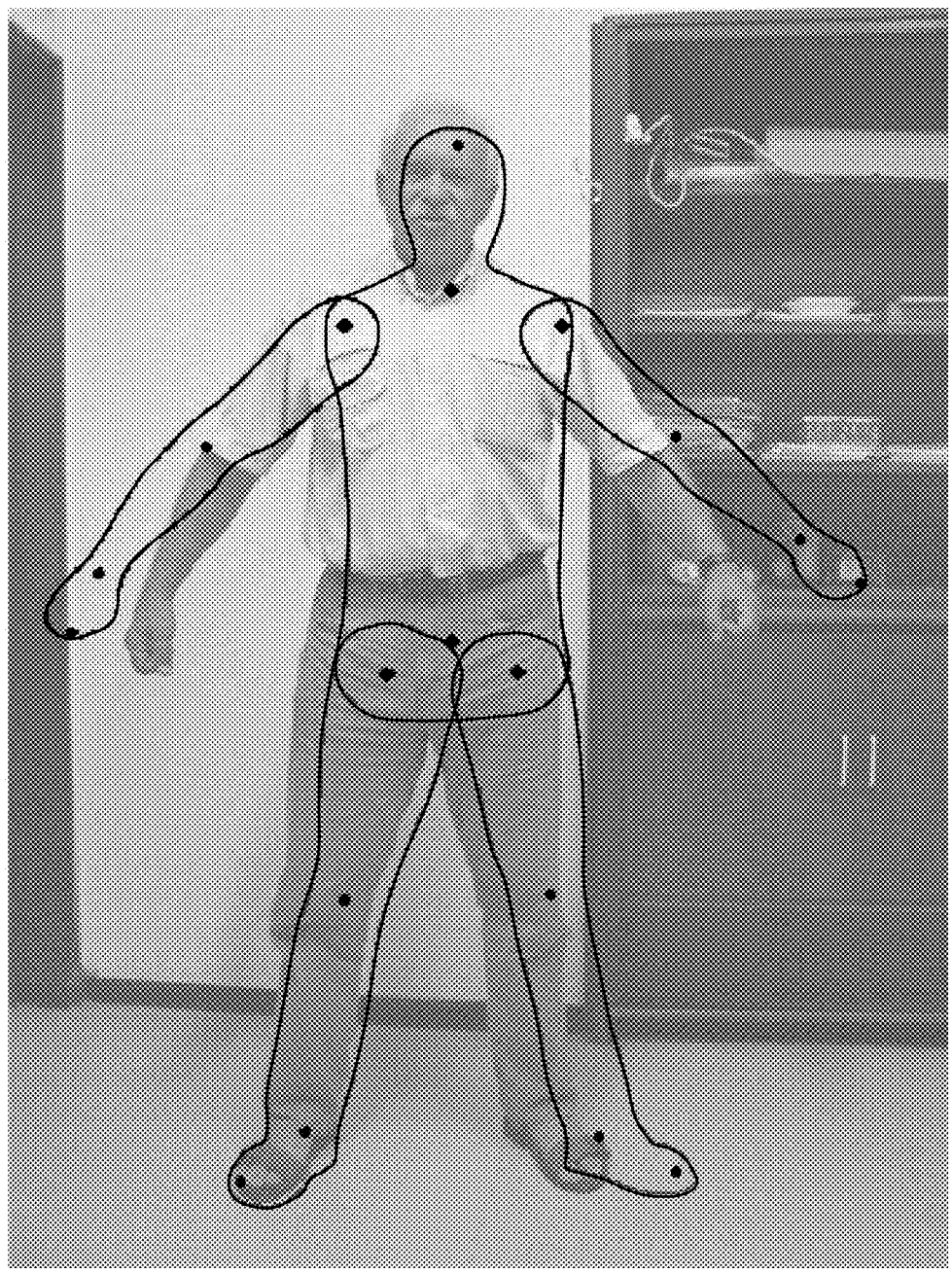
Figure 15D:
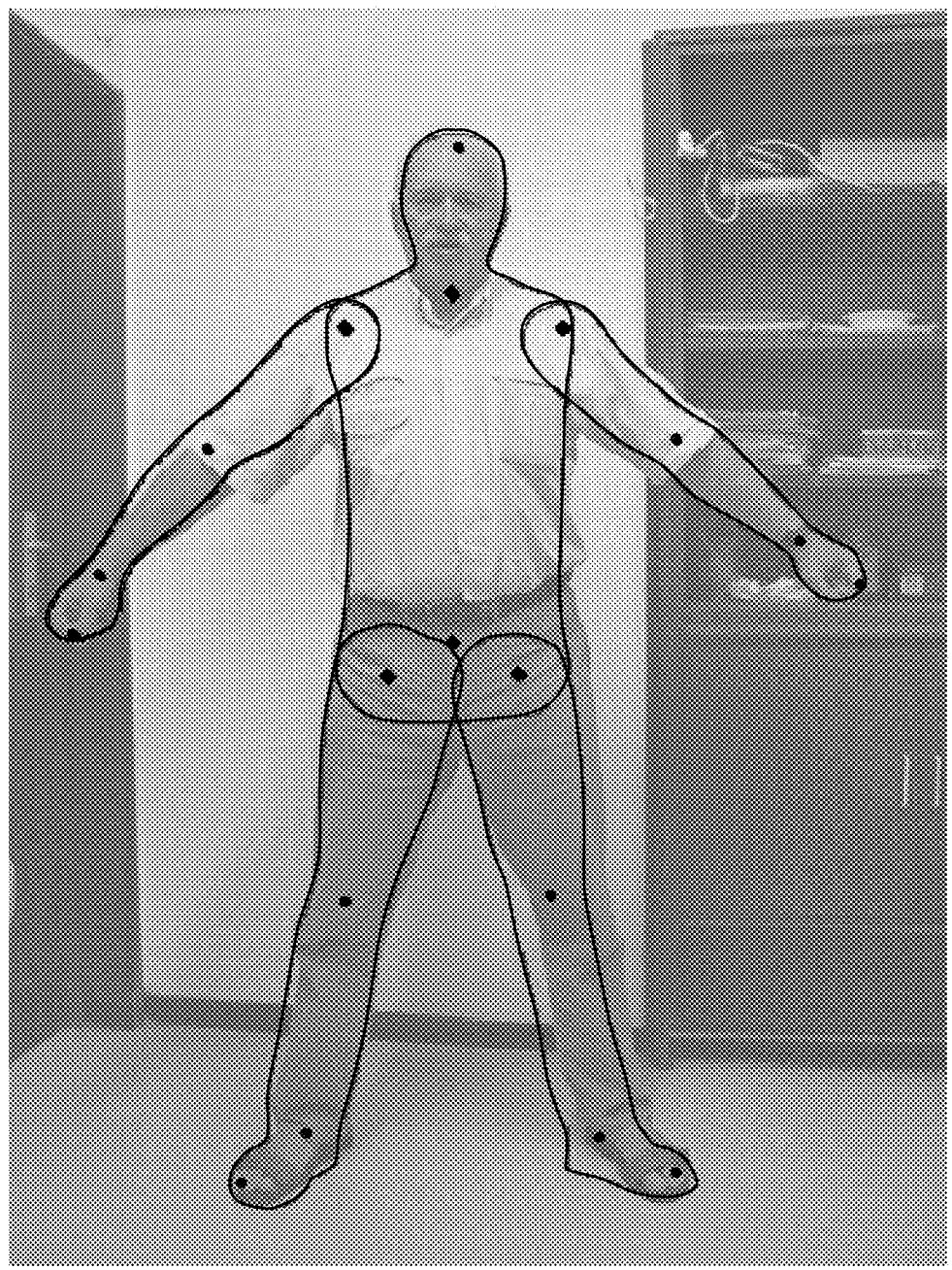

In an alternative embodiment, the initial positioning of the model may be achieved already at the stage of taking the image. Before taking the image, the user may choose a library model to use. The chosen model may appear on the screen, such as a transparent contour, or in another similar mode. While taking the image, the user may try to match the position of an actual character with the model appearing on the screen. This may be done with appropriate positioning of the device (e.g. a cellular telephone). If necessary, the character position and pose may be corrected until they relatively closely match that of the model. FIGS. 15B, 15C and 15D, to which reference is now made, together illustrate the results of an iterative process to perform such corrections while taking the image. FIG. 15B shows the character in an initial pose and position that is generally unlike that of the chosen model. FIG. 15C shows the character after an initial attempt to reposition the device and assume the desired pose. The character as shown is similar to the chosen model, but there is still room for improvement. FIG. 15D shows the character after an additional adjustment of pose. There is now general alignment between the character and chosen model.

In another embodiment of the present invention, object aligner 104 may automatically determine marker points 134', given that the position on the screen and the pose of the character are approximately known. This enables the dynamic ranges of the control parameters to be relatively small and reduces the complexity of the problem.

The alignment has two main stages, a coarse alignment and a fine alignment. In the first stage, object aligner 104 may utilize a group T of control parameters which comprise translations, scaling and limited rotations of the template, together with a few of the most global anatomic control parameters. In the example of enface human template matching of a character roughly in the position shown in FIG. 2B, these controls may be the angle between the legs and the angle between the hands.

The total number of parameters in this example is 6. However, because of the assumption that the pose and position of the character is approximately known, the dynamic range of each parameter is roughly 20-30 pixels. Object aligner 104 may perform a scanning step, similar to that described hereinabove for matcher 142. Initially, object aligner 104 may start with a coarse scale scanning, starting with a step of 8 pixels. Afterwards, it may reduce the step to 4 pixels.

Figure 16B:
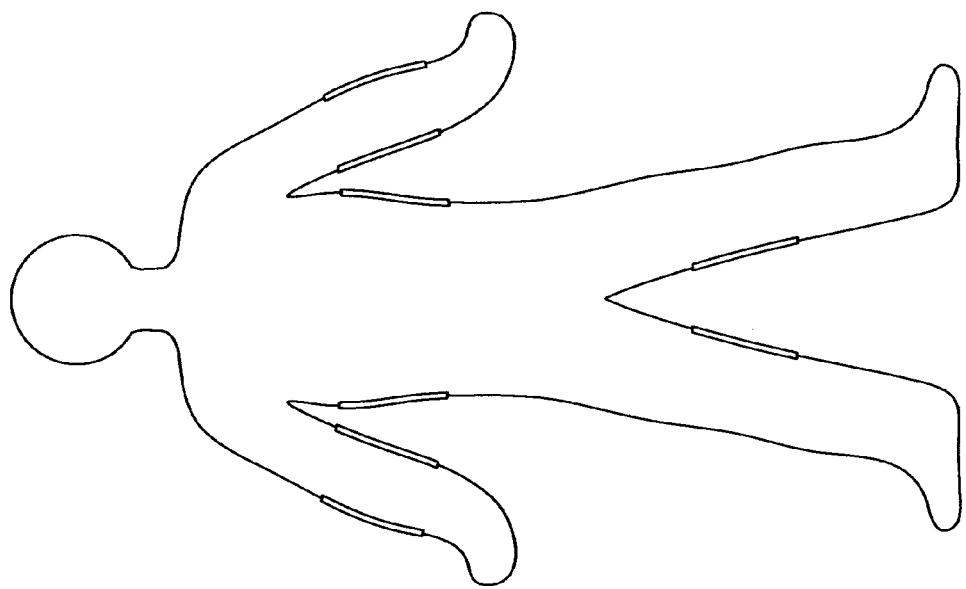
FIGS. 16A, 16B and 17 are graphical illustrations useful in understanding the operation of an aligner of the system of FIG. 1.
Figure 16A:
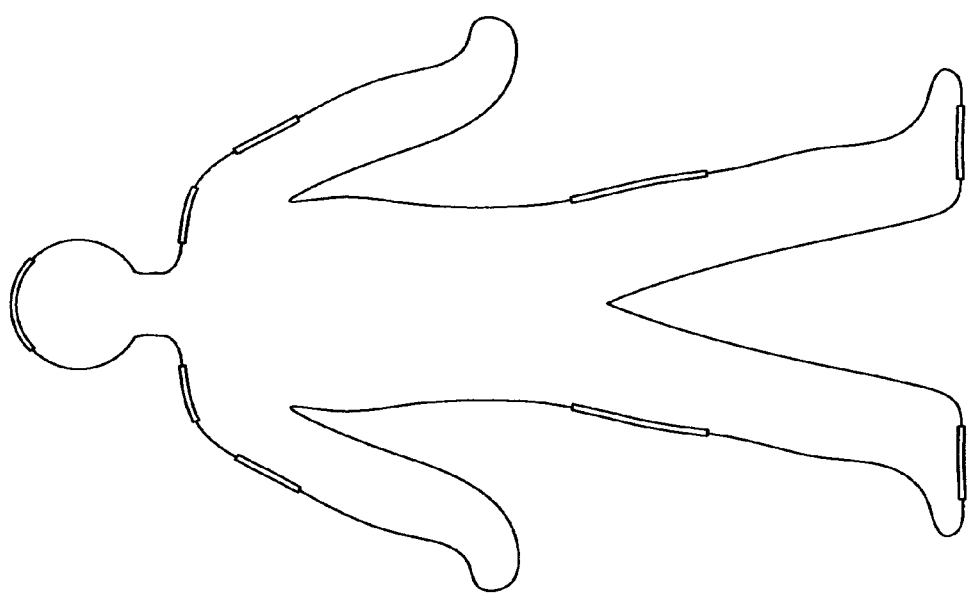

Typical matching regions for the first stage are shown on FIG. 16A. These regions may include the relatively stable outer areas of the body, such as above the shoulder, along the outer surfaces of the arms and legs, the top of the head and the bottoms of the feet. After using these regions for coarse alignment, the matching regions of FIG. 16B, which are relatively stable inner areas of the body, may be added. These regions may include the inner surfaces of the arms and legs and the sides of the torso. For this matching, object aligner 104 may add parameters controlling the width of the legs, the hands, and the body.

In many cases, the horizontal positioning of the template may be performed separately of other parameters, followed by the vertical positioning.

Figure 17:
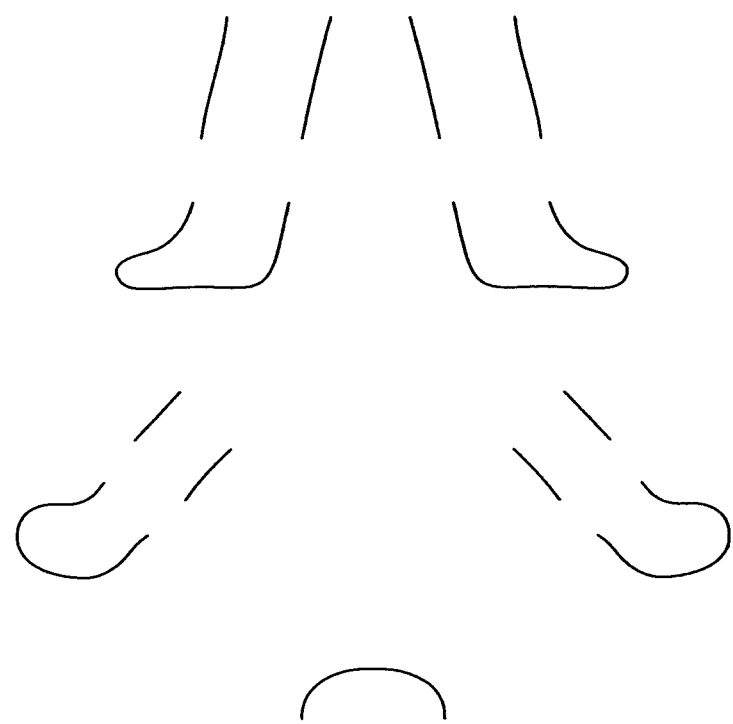

In the second stage, object aligner 104 may operate to achieve a more accurate positioning of alignment points 134. This is done in the following steps:

1) For each alignment point 134, a "matching region" may be constructed, representing a visual vicinity around this point. FIG. 17, to which reference is now made, illustrates 5 matching regions, of the two feet, two hands and head. Each matching regions typically contains relatively long parts of the contour near the matching point, which may be taken from the results of the first stage. It is noted that, for the hands and feet, the matching regions also include portions of the contours for the arms and legs, respectively.

For the first step, the control parameters are a scaling and a translation (e.g. along the hand or leg or along the vertical direction for the head) to find the locations of marker points 134'. Optionally, the angle between the hands or legs may be included, with a restricted dynamic range since these parameters were fitted in the previous stage.

2) Object aligner 104 may now perform a scanning minimization of the matching discrepancy for each matching region, as described hereinabove, to find the locations of marker points 134'.

If desired, since contour aligner 144 and contour refiner 146 do not generally require accurate alignment of marker points 134', object aligner 104 may only perform the first stage of the current procedure. Alternatively, it may also perform the second stage as well.

Irrespective of the type of object aligner 104 utilized, animation system 208 may be implemented in a number of different systems. For example, animation system 208 may be implemented as an additional feature in a digital camera. In this embodiment, the image of a character, taken in a prescribed pose, is animated and the animation is output by the digital camera.

It will be appreciated that more than one character may be animated using animation system 208 and that a "Virtual Theatre" may be created using personalized animations. For example, the user may create, from images or video-sequences, a number of personalized photo-realistic characters-actors (friend, relatives, popular media personages, etc.). The user may also create a personalized scene and background using the method of the present invention. In particular, the user may create animated flowers, trees, houses, furniture, etc., using the appropriate library templates and matching the template as described above. All these virtual objects may be put into a personalized scene and background. Finally, the user may create action scenarios for the character actors. Alternatively, the action scenarios may exist previously.

Figure 18:
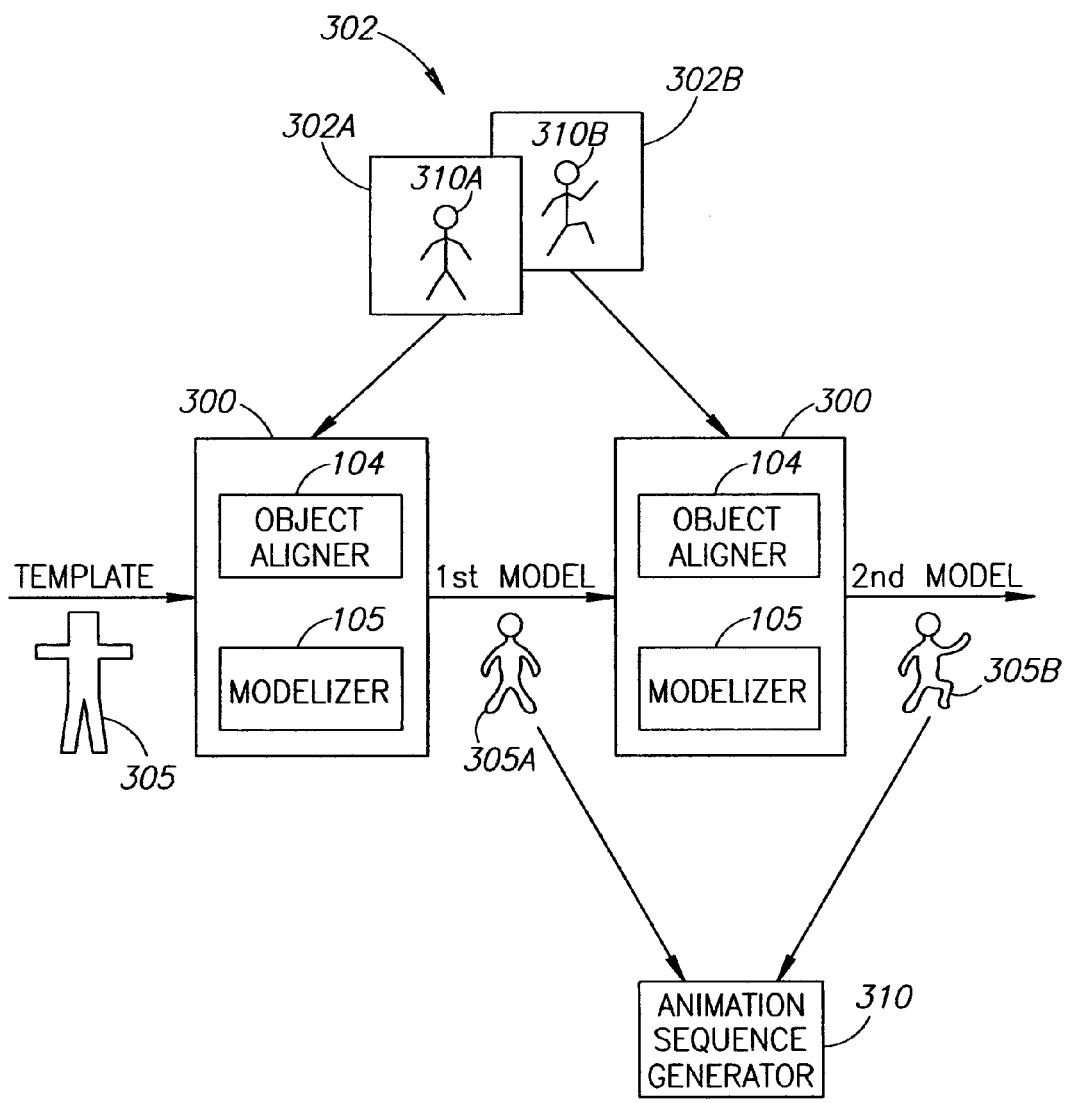
FIG. 18 is a schematic illustration of a system of FIG. 1 to generate model action scenarios from input video sequences, constructed and operative in accordance with a preferred embodiment of the present invention

In a further alternative embodiment, shown in FIG. 18, to which reference is now made, modelizer 105 may be utilized as a "motion tracker" 300, to generate model action scenarios from input video sequences. In this embodiment, the model is matched to the input images of the video sequence to create an action sequence which follows the motion of the visual object in the video sequence.

Motion tracker 300 may comprise object aligner 104 and modelizer 105 and may match a selected model 305 to a character 310 on frames of an input video sequence 302.

For example, FIG. 18 shows initial model 305 as a fat man with arms and legs outstretched. Input video sequence 302 shows two frames 302A and 302B with a stick FIG. 310 in them. In frame 302A, stick FIG. 310A has hands and arms outstretched. In frame 302B, stick FIG. 310B has begun to run. FIG. 18 also shows motion tracker 300 in two stages, one operating on frame 302A and one operating on frame 302B.

For the initial matching, motion tracker 300 may receive initial model 305 and the first frame, frame 302A, of video sequence 302. Motion tracker 300 may also receive an initial alignment, as discussed hereinabove. With this information, motion tracker 300 may change model 305 to match FIG. 310A of frame 302A. This step may be performed as described hereinabove with respect to FIGS. 1-14 and may produce a matched model 305A.

Motion tracker 300 may now receive second frame 302B and matched model 305A and may attempt a match. Since object 310 may have moved only a small amount between frames, matched model 305A may already be relatively properly aligned. Thus, object aligner 104 may perform an automatic realignment, after which, modelizer 105 may change model 305 to match object 310B of frame 302B.

Motion tracker 300 may operate for any desired level of quality. For example, motion tracker 300 may only roughly match a generic model to the object on the first frame (e.g. only perform object alignment), after which, motion tracker 300 may utilize this roughly matched model to follow the object motion in the video-sequence.

Modelizer 105 may match only with the basic anatomic control parameters, in order to produce a simplified animation. Alternatively, motion tracker 300 may perform a finer matching in each frame using finer anatomic parameters (e.g. secondary anatomic control points). In a further embodiment, motion tracker 300 may match to the level of frame contour alignment or contour refinement. This may produce the highest quality animation but may require including into the motion scenario not only the model kinematical parameters, but also the evolution of its free contour parameters.

If desired, motion tracker 300 may include a parameter extrapolator (not shown), to extrapolate expected parameter values based on their values in previous frames. Motion tracker 300 may then match the model with the extrapolated parameters to the current frame using modelizer 105.

If motion tracker 300 may no longer match model 305 to moving object 305, (because of too strong changes in the character pose, in camera position, and/or in other viewing conditions), a new library model may be used. With this new model, the previously described steps may be repeated for the next frames in video sequence 302.

If necessary, motion tracker 300 may indicate to the user that the initial model may not be used anymore and may ask the user to choose a new library model and to provide its initial positioning.

Motion tracker 300 may also comprise an animation sequence generator 310 which may collect matched models 305, such as models 305A and 305B, and may concatenate them according to which frame of sequence 302 they match. The resultant sequence may be an animation sequence for model 305 which may imitate the motion of object 310 in video sequence 302.

In an alternative embodiment of motion tracker 300, which may be computationally efficient, the initial matching of model 305 to the first frame may be performed as described hereinabove. However, the subsequent matching operations may be different.

For subsequent frames, matcher 142 of modelizer 105 may mark contour edges using information from first frame 302A, where an initial set of "true" contour edges have been identified. For this, matcher 142 may mark those edge segments on second frame 302B which may be a) relatively parallel to those on first frame 302A and b) which may have roughly the same colors or intensities.

Matcher 142 may then utilize the marked edges (considered as the "true" ones) on second frame 302B to position alignment points 134 and from these, to position anatomic control points 130 and 131.

Modelizer 105 may then activate matcher 142, contour aligner 144 and contour refiner 146 to finalize the match. If necessary, modelizer 105 may perform some discrepancy minimization, as described hereinabove, but with a strongly reduced scanning volume.

Motion tracker 300 may enable users to relatively easily generate high quality animations (or motion scenarios). All that is required is a video sequence of a required motion and a model of the object in the video sequence.

It will further be appreciated that motion tracker 300 not only may generate animations of current motions, it may also generate motion reconstruction of action sequences in old movies or broadcasts. For example, motion tracker 300 may produce an animated version of a 50 year old dance of a ballerina, stored in an old movie. In accordance with another alternative embodiment of the present invention, motion tracker 300 may provide modelization and/or animation of one or more actors of a popular movie. For example, the actor may be replaced by a virtual character produced from a photograph, as described hereinabove.

In a further embodiment, a user may have an avatar in an interactive game. The user may move to control the motion of the avatar. Motion tracker 300 may capture the motion of the user and may then generate an associated animation sequence for the avatar using the captured motion.

In a further embodiment, if video sequences are not available, then motion tracker 300 may receive images of an object or character in several consecutive positions. Motion tracker 300 may match model 305 to each character and animation sequence generator 310 may gather the resultant models. To generate action between the positions in the images, generator 310 may interpolate the values of the parameters of model 305 from the values of the parameters in two consecutive images.

The previous embodiments, as described hereinabove, may allow for a completely automatic model matching for an image of a human character taken in a prescribed pose and against a relatively uniform background. However, applicants have realized that there may be a need to extend the applicability of automatic model matching to less restrictive images. Especially important may be a class of "album pictures" which includes human characters (or pets and other animals) depicted as being relatively close to the viewer, each character typically being relatively separated from the others. In the case of such "album pictures", the assumption of a known pose and of a relatively uniform background may no longer be valid.

The mere notion of "animation" for such pictures may present serious difficulties. Indeed, the characters may be partially occluded, and their position and pose may be quite different from the positions and poses typical for simple animations. For example, a character may be seated; it will be appreciated that it may be difficult to "unfold" such a character in order to provide animated walking. Similarly, album pictures often show only a head shot. It will be appreciated it may be impossible to provide a full range of animation for a character with an incomplete body. It will be appreciated, therefore, that the task of animating album pictures may suffer from a lack of physical "wholeness" of the depicted character(s), and/or difficulties in delineating the character's body parts based on an unknown pose.

Therefore, in accordance with an alternative preferred embodiment of the present invention, one or two "compromise" approaches may be used to provide animation of "album pictures". The first approach may be to provide relatively small movements to some (or all) of the characters on the image while remaining in the original image framework and background. The second approach may be to extract a part or all of the entire character from the image and to animate it on a different background.

The first approach may combine small movements with moving the camera view closer. Any occluded parts of the target characters and of the background may be ignored. Instead, a depth separation between different layers on the image may be used to place foreground layers slightly closer to the camera. These chosen foreground objects may occlude a certain small part of the background, herein referred to as "background margins". This may allow for small movements of the foreground objects while remaining within the "background margins".

In accordance with a preferred embodiment of the present invention, an original album image and the animation to be generated may be represented in a conventional animation format, for example, "Flash" or "Anime Studio". In these formats each object may be represented by a "layer" sitting inside a common 3D space and have a "depth". This depth may be given to the objects in the process of the creation of the animation, interactively or automatically. There may also be a "camera"—the point from which the 3D scene is viewed.

Figure 19A:
FIGS. 19A, 19B, 19C, 19D and 19E are graphical illustrations useful in understanding the operation of the hierarchically rigid modelizers of FIGS. 4 and 8.
Figure 19B:
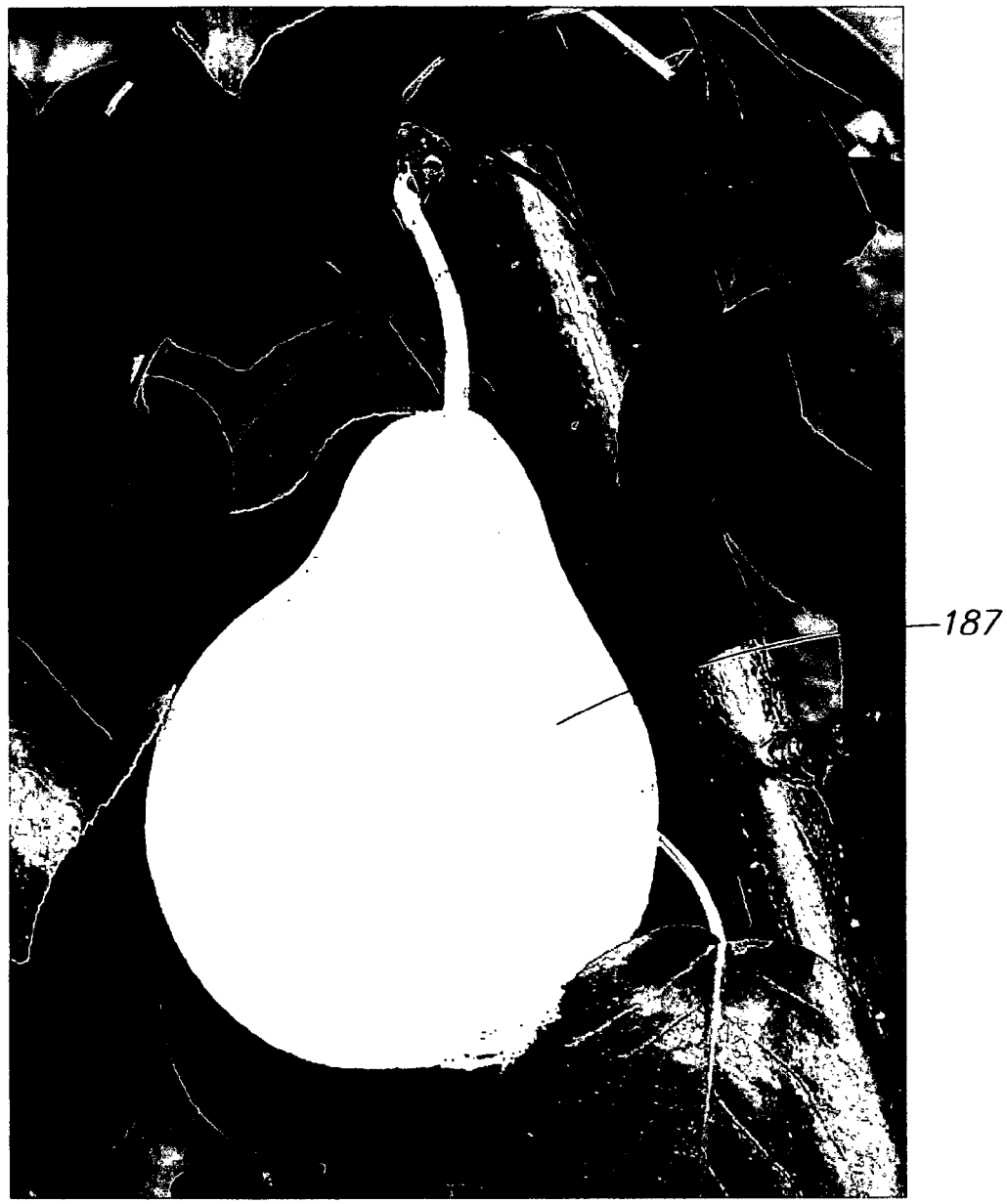

FIGS. 19A-E, to which representation is now made, together illustrate an exemplary series of such representations. FIG. 19A illustrates a pear object 186 in the foreground in the image. FIG. 19B illustrates the same image with pear object 187 removed and "white space" 187 shown instead. It will be appreciated that if a foreground object, such as object 186, may be cut out of an image, in the background layer there may appear white space, i.e. the area originally covered by the foreground object. Accordingly, even a slight movement of these foreground objects may expose white space where there may be no information available regarding a true background.

Figure 19C:
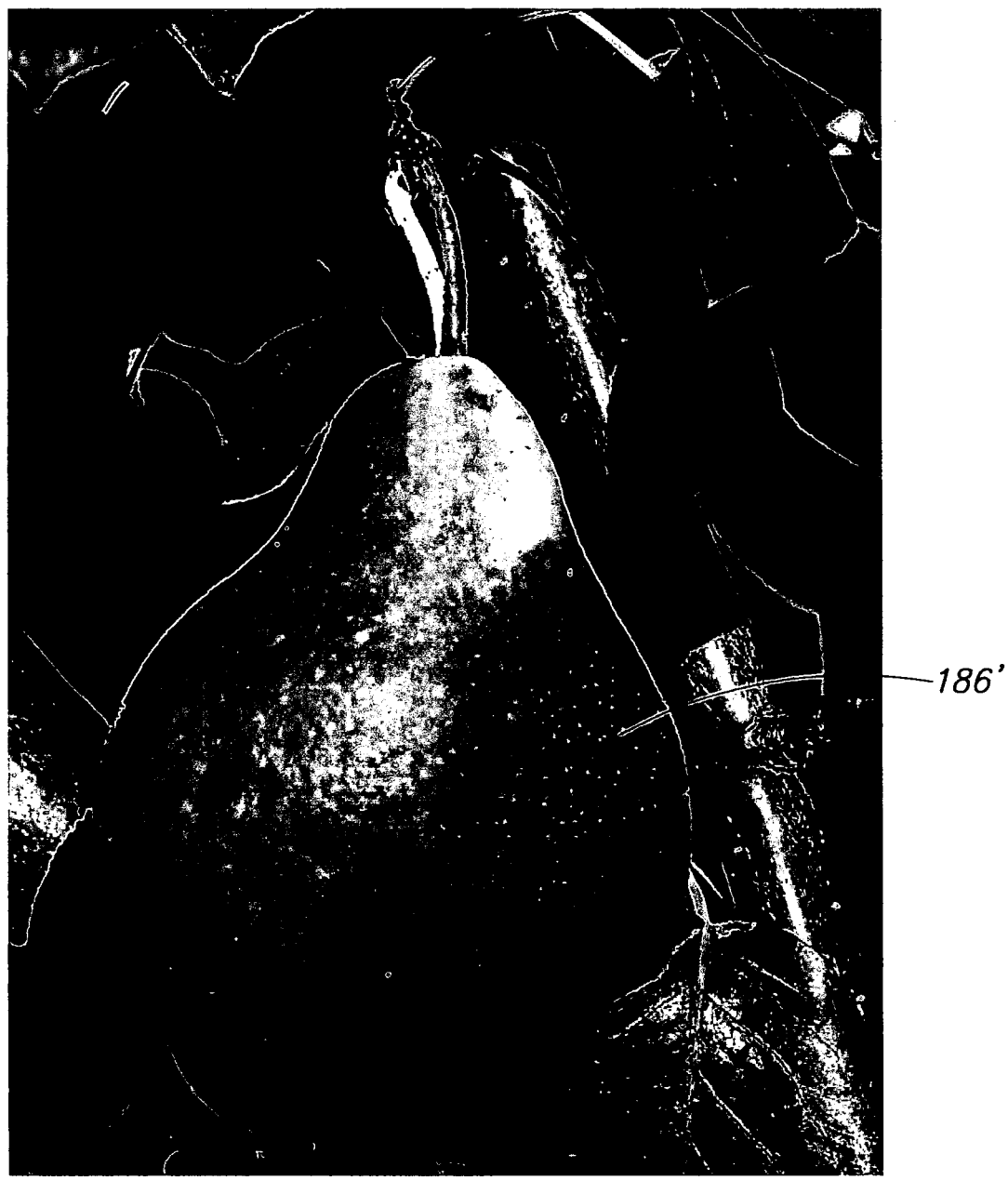
Figure 19D:

In order to overcome this problem, object 186 may be moved slightly closer to the camera, and/or the camera may be moved slightly forward. As a result, the animated object may look relatively larger, and it may occlude certain margins on the background image. As shown in FIG. 19C, the result may be a larger version of object 186, herein labeled 186'. FIG. 19D shows occluded margins 188 that may be associated with object 186'.

Figure 19E:
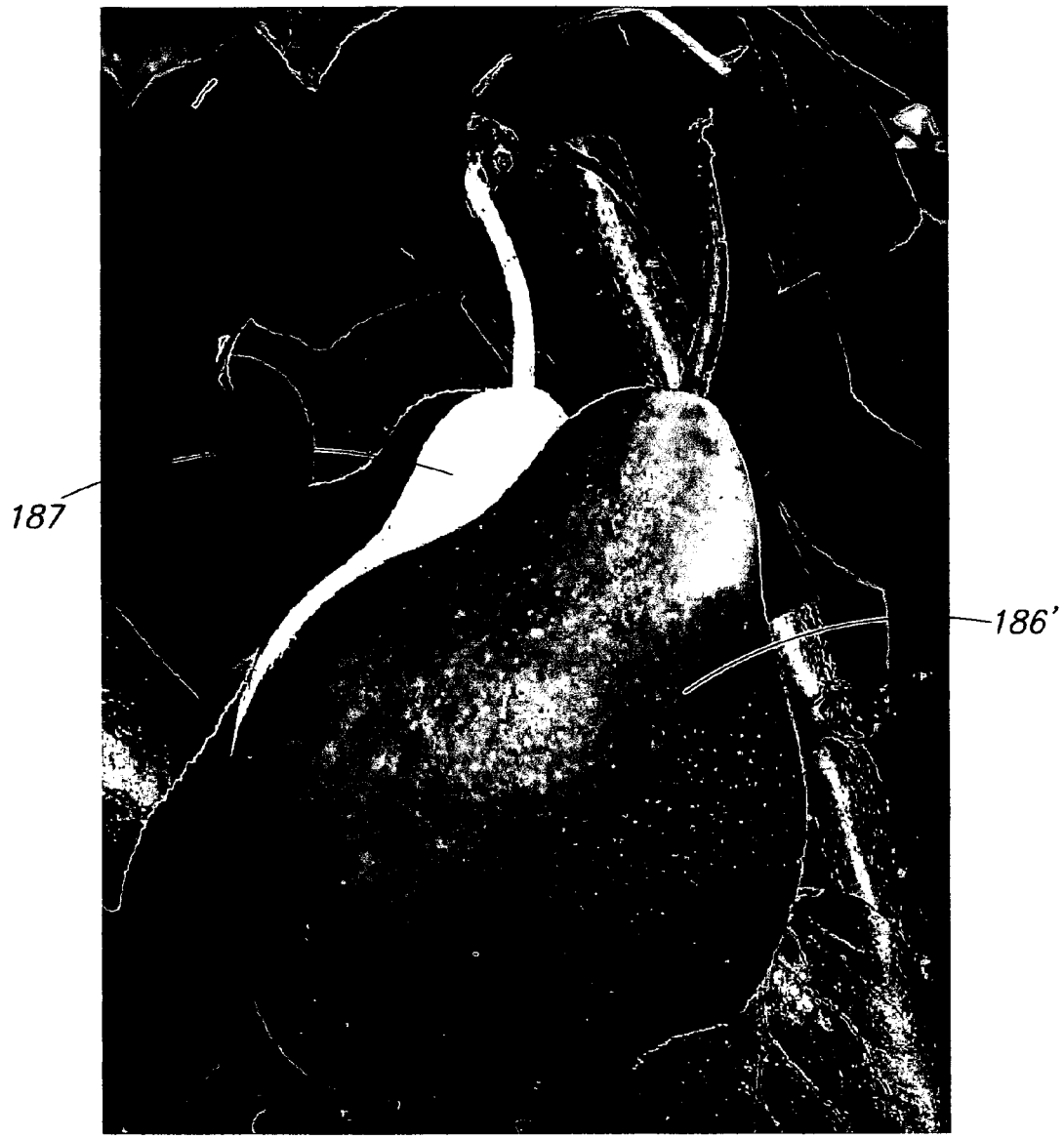

It will be appreciated that occluded margins 188 may provide a true background for at least part of a background layer behind object 186'. Accordingly object 186' may be moved slightly without necessarily uncovering white space 187. As long as object 186' may be moved with small movements, only occluded margins 188 may be revealed. However, larger movements may still reveal white space 187 "underneath" object 186' as shown in FIG. 19E. In order to minimize this possibility, instead of moving the object, the camera may be moved slightly to create a live effect of a natural motion.

For small layers, like a hand, etc., the entire occluded part of the background may be filled in and may thusly allow for a larger motion of the corresponding layer. Known methods of "color extrapolation" may be used for this "fill in" process.

Various animated characters and objects (taken from another image or from a library) may also be added to the animation in the foreground.

Another important option may be to slightly move a character's clothing. This may be provided via "clothes modelization", by using "background margins" as discussed hereinabove.

The fact that in the motion process we do not uncover the "white space" may be true for other "second level" motions, such as musculature, respiration, and facial expressions. All these effects may be added as "small motion animations" to make them more visually attractive. In the course of the animation scenario one or another person in the image may be shown in close up with rich facial expressions and "second level" motion. In a strong "blow-up", when a foreground object overlaps a significant part of the background and may thus create large "background margins", relatively large movements of the foreground characters may become possible.

The objects and characters modelization for a "small movements" animation in "album images" may be performed largely as per the description in the previous embodiments. The only significant difference may be that "partial models" are used. Examples of partial models may include a "head and shoulders" human model, or only a face model, or just a hand or a leg model. The initial search and the quality assessment may be modified accordingly; a partial model matching is performed in the same manner as "full model" matching; the process may be "indifferent" to the completeness of the model.

An interactive as well as combined automatic-interactive matching play more important role.

The second approach may be to extract a character from the image and to animate it on a different background. Unfortunately, the anatomic proportions of the character may be largely distorted in this extraction process. The "compromise" solution described hereinbelow may overcome the problem of distortion.

An entire model may be matched to the character on the image. This may be performed either automatically or interactively, as per the embodiments described hereinabove. The possible occlusions may be interpolated via model rigidity.

The character's anatomic proportions may be estimated from the fitting results. The character may then be completely reconstructed (along the found proportions while preserving the image texture) in a different scene with a background.

This approach may also require an approximate reconstruction of any occluded parts. This may be performed with known methods for "color interpolation". Alternatively, where body parts are unclear or missing in the image, they may be directly replaced in accordance with the model, or by "copying" a companion limb, i.e. for example defining a left arm based on the proportions of a matched right arm.

This proposed method may not guarantee the identity of the reconstructed virtual character with the original one, but it may provide a relatively high quality for the reconstructed virtual character and its animation.

The present invention may be used to animate existing Internet photo-albums, such as "Picasso", available from Google. This may be implemented as either an interactive or automatic process.

Since a computational load in automatic animation may be pretty large, some preparation work on some of the images may be performed automatically off-line. This may include initial searching and basic model matching. The results of this pre-processing may be stored together with the image for future possible use. In such manner, the processing time at the time of actual animation may be lessened, and the user experience may be that a wide choice of animations based on the images may appear to be "instantly" generated.

In accordance with a preferred embodiment of the present invention, a "small movements" animation may be used for an interactive objects modelization As discussed hereinabove, one of the main difficulties when performing interactive model matching is that the influence of the numerous model parameters may not be "uncoupled". For example, positioning the head of a model may adversely affect previously positioned hands and legs, etc. In the case of "album images" matching may be even more difficult since the model may be matched to an arbitrary (and not known a priori) pose of the character on the image.

However, in a case of a "small movement" animation, interactive model matching may be strongly simplified by forgoing the use of an entire human (or animal) model. Instead, a few sub-models may be separately and independently matched. These may include, for example, a hand sub-model, a leg sub-model, a head sub-model, etc. The main advantages of this approach may be as follows:

Interactive preliminary matching of each sub-model may be simplified, since each may have only a few independent parameters. The final matching may be provided by the automatic matching procedure described hereinabove.

The user may elect to match only a few of the partial sub-models (for example, only a hand) to produce an interesting small motion animation.

If a user may wish to produce a small animation of the entire character, or of a significant part thereof, this still may require a separate and independent matching of the appropriate partial sub-models. This may be much easier than a matching of the entire model.

It will be appreciated that no adjustment of the global skeleton may be required for a small motion animation. Possible inconsistencies in the positioning of the sub-models may not be visible in a small motion animation.

On the other hand, if necessary, the global adjustment of the sub-models and the global skeleton insertion may be achieved via the automatic matching of the appropriate global model to the contours of the sub-models, as described hereinabove.

In accordance with a preferred embodiment of the present invention, a small motion animation of an album (or Internet) image may be combined with an animation of a character in a proscribed pose. Such a combination may provide a solution to an important problem: easy creation of animation involving two or more personalized actors and their interaction.

For example, a user may wish to create an animation where the user may present a flower to a friend. However, the user may only possess an album photo of the friend sitting. In such a case, the user may produce a small motion animation of the album image containing the friend. For example, only sub-models for a head and a hand are matched. This may allow for a small motion animation with the character smiling and slightly raising the hand. Next, as per the previous embodiments described hereinabove, the user may take his photo in a proscribed pose and may automatically create an "avatar". Finally, this avatar (equipped with a flower) may enter the virtual space of the album image, approach the friend and present the flower, while the friend smiles, raises a hand and takes the flower.

In the same manner Internet images of popular personages, celebrities, etc. may be used to easily create animations including the user and his friends interacting with these celebrities.

Figure 20:
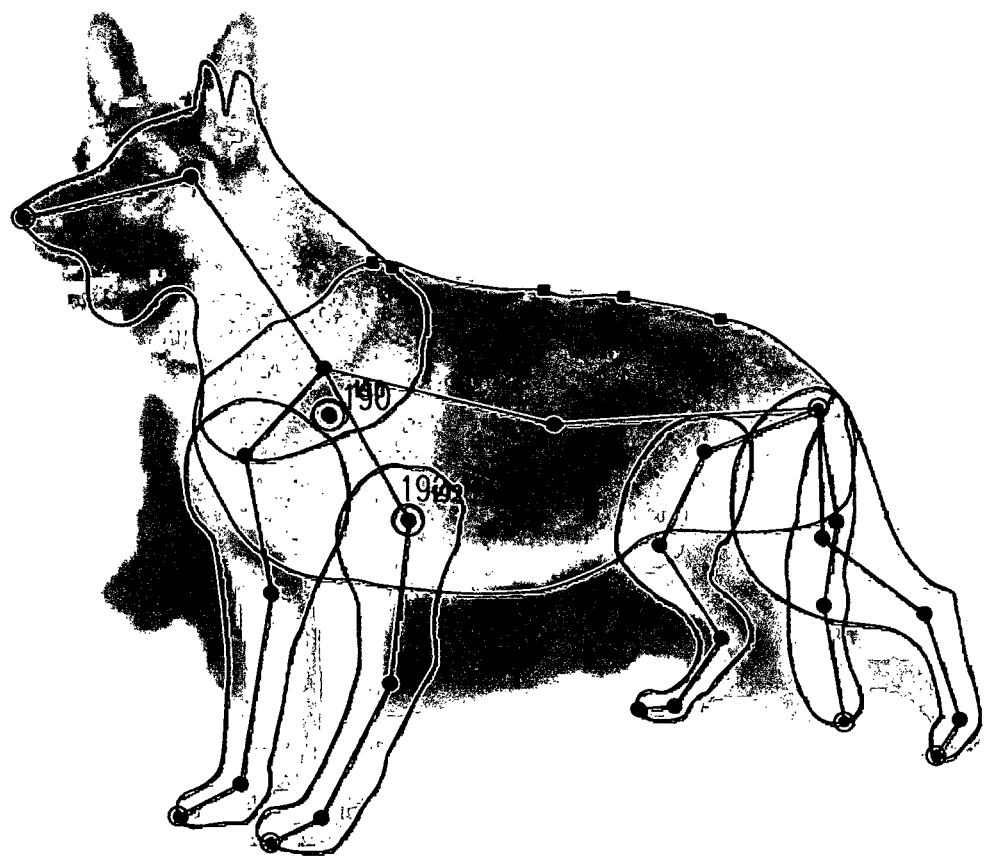
FIG. 20 is a graphical illustration useful in understanding the operation of an aligner of the system of FIG. 1.

In some situations, automatic model matching may be problematic, particularly when used to animate the matched characters. Some control points may not be naturally delineated by contours and/or shading, and may not be properly identified by automatic matching. For example, FIG. 20, to which reference is now made, illustrates an exemplary result of an automatic matching of a side view of a dog. Shoulder point 190 is the location of the dog's actual shoulder; matched point 192 may indicate the approximation of the dog's shoulder as per the result of the automatic process. In the absence of a readily identifiable contour, automatic matching may be unable to identify a dog's shoulder, particularly when, as shown in FIG. 20, the coloring of the dog's fur may provide "false clues" regarding the underlying skeleton. It will be appreciated that if the dog's shoulder is not properly matched, any "downstream" animation of the dog may suffer. The associated foreleg may not move properly and the overall effect may be less convincing.

Interactive model matching may also be a difficult task, even for an experienced and well qualified user. There are typically a large number of often redundant matching parameters, which also may be coupled together. The process may therefore be time consuming and exposed to human error.

The approach of the "hierarchically rigid modes" as described hereinabove may be adapted as a model-guided interactive approach to address the problems of the interactive model matching. A model-guided interactive approach may entail performing interactive matching according to roughly the same hierarchy and roughly the same groups of parameters as may be used for automatic matching. In accordance with a preferred alternative embodiment of the present invention, these groups of parameters may be presented to a user for interactive resolution in roughly the same order as used by automatic matching.

At each step of the process, the computer may indicate for the user (for example, by usage of color and/or brightness) a matching region under processing, together with a few "red points" representing the control parameters in the current control group. The user may mark the positions of the corresponding points on the image, and the required deformation may be performed as per the embodiments described hereinabove. The regions and the points may be chosen in advance in such a manner such that their positions may define the required parameters uniquely.

Rigidity of the model may be used in these steps. The interactive active groups and active regions may closely follow the order of the active groups and active regions in the automatic matching process. However, their specifics may take into account some special features of an interactive matching process.

It will be appreciated that an advantage of this approach may be that on each step the user may encounter roughly the same problem: to mark positions on the image of a few "red points".

It will further be appreciated that the interactive approach can work in many cases where automatic matching may fail. For instance, a user may mark the position of the points in difficult cases, where there are no edges at all—like an animal's shoulder, complicated clothes, color coincidence, etc.

In accordance with an alternative preferred embodiment of the present invention, automatic failure detection may also be implemented to "audit" the input of a user using model guided interactive matching.

Applicants have realized that a combined automatic-interactive approach for matching may produce better results than either automatic or interactive matching alone. Model-guided interactive matching may be further adapted as a model-guided automatic-interactive approach. In such an approach the following steps may be performed:

First, an automatic matching may be performed, with a matching quality assessment performed at each step, as described hereinabove. Failure detection may also be performed at each step of the automatic matching, also as described hereinabove.

The user may be prompted to provide assistance whenever the matching of a specific active group may not have succeeded. The corresponding matching region requiring user intervention may be highlighted, as well as the "red points" corresponding to the control parameters in the current active group.

Once a user has interactively provided a corrected matching for the current active region, the automatic process may continue until the next failure, at which point the user may again be prompted to intervene.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
    an aligner to align an initial position of a hierarchically rigid model with an object in an image, said hierarchically rigid model represented by a plurality of dots associated with alignment points, initial and secondary anatomic points, and by contour points; and
    wherein contour points define contour lines;
    a modelizer to adjust parameters of said model to match said model to contours of said object, given said initial alignment; and
    means to enable a user to operate at least one of said aligner and said modelizer interactively;
    wherein said initial position alignment comprises said aligner positioning said alignment points at locations associated with extremities of said object, and
    wherein said parameters adjustment comprises
said modelizer matching said rigid model in stages to correct for noise in each stage, said stages comprising:
    determining a position of said model by positioning said initial anatomic points relative to said alignment points;
    correcting anatomic positioning of said model by positioning said secondary anatomic points relative to said initial anatomic points;
    defining geometrically shaped active regions in said model associated with segments of said contour lines;
    matching said contour lines to contour edges in said object.

2. The system according to claim 1 and also comprising means to perform model guided interactive matching.

3. The system according to claim 1 and also comprising a cutter to cut said object from said image and to associate it with said model.

4. The system according to claim 3 and also comprising an animation adapter to animate said cut object according to an animation associated with said model.

5. The system according to claim 4 and wherein said animation adapter comprises means to provide small movement animation.

6. The system according to claim 5 and wherein said animation adapter comprises:

an enlarger to enlarge a part of said object; and
an animator to animate said enlarged part of said object over a white space area surrounded by a background margin, wherein:
said white space area is defined by an original position of said part of said object, and
said background margin is defined as a difference in area of said image covered by said enlarged part of said object and said white space area.

7. The system according to claim 4 and wherein said animation adapter comprises:
    an extractor to extract said cut object from said image; and
    an animator to animate said cut object on a background different than that of said image.

8. The system according to claim 7 and wherein said animation adapter comprises a reconstructor to perform an approximate reconstruction of occluded parts of said object as per at least one of the following: an associated non-occluded part of said object, a matching part of a model matched to said object, and interpolation of non-occluded colors in said object.

9. The system according to claim 4 and wherein said animation is associated with at least one of the following: a greeting card, a game, a game avatar and a digital camera implementation.

10. The system according to claim 1 and wherein said model is of a human standing enface, wherein an appropriate said model is determined based on a matrix of qualifications including at least one of sex, age, body build, athletic skill and pose.

11. The system according to claim 1 and wherein said model is of one of the following: an animal and a virtual animated object.

12. The system according to claim 1 and wherein said aligner comprises means to receive marking points from a user marking said alignment points on said image.

13. The system according to claim 12 and wherein said aligner comprises means to adjust said model to align said marking points with said alignment points.

14. The system according to claim 1 and wherein said at least one of said initial and secondary points are for performing coarse scale model positioning in a multi-step process.

15. The system according to claim 1 and wherein said points are organized into groups, and each group has a set of forbidden values based on anatomic restrictions.

16. The system according to claim 15 and comprising a model distortion calculator to calculate overall model distortion as a sum of: penalty functions for each group, a global penalty function, and a stretching function.

17. The system according to claim 16 and comprising means to stop processing when said overall model distortion exceeds a pre-defined threshold.

18. The system according to claim 16 and comprising a penalty function calculator to calculate said penalty function for each said group, wherein a value of said penalty function approaches infinity as said control points of said group approach said forbidden values.

19. The system according to claim 16 and comprising a global penalty calculator to calculate a global penalty function defined by a total distance of said control parameters from a globally anatomically forbidden region.

20. The system according to claim 16 and comprising a stretching function calculator to calculate said stretching function as a measure of total deviation of all said parameters from their associated reference points.

21. The system according to claim 1 and wherein said aligner comprises means to enable a user to create said image with said object in generally the same pose as said model.

22. The system according to claim 1 and wherein said aligner comprises means to cunningly adjust said model to coarsely align said model with said object in said image.

23. The system according to claim 1 and also comprising:
- a video frame provider, to provide said aligner with one frame at a time from a video sequence; and
- an action generator to generate an action sequence from a collection of models generated by said modelizer in response to said frames of said video sequence.

24. The system according to claim 23 and wherein said video sequence is from at least one of a movie, media clip and broadcast.

25. The system according to claim 23 and wherein said video sequence is of movement of a user of a game and said action sequence is provided to an avatar of said user.

26. The system according to claim 1 and wherein said modelizer comprises:
- an edge detector to generate an edge image of said image;
- an anatomic points matcher to adjust said anatomic points of said model to coarsely match a portion of a contour of said model to said edges of said object that are generally parallel to said contour and are in a vicinity of said model and to mark said edges;
- a contour aligner to adjust said contour of said model to more tightly match said edges of said object that are generally parallel to said contour and are in a vicinity of said model and to mark said edges; and
- a contour refiner to adjust said contour of said model to said selected edges.

27. The system according to claim 26 and wherein said matcher comprises means to calculate a series of matching functions between said edges and portions of said contours, wherein an overall contour matching quality may be expressed as a maximum of calculated values for said matching functions over all matching groups.

28. The system according to claim 26 and wherein said modelizer comprises:
- a geometric combination analyzer to perform a model-guided geometric search by analyzing said edge images and to provide scanning regions for processing to said anatomic points matcher.

29. The system according to claim 28 and wherein said geometric combination analyzer comprises means to perform said model-guided geometric search on progressively finer scales with progressively more detailed said models until the results of a said search no longer improve upon the results of a previous iteration of said search.

30. The system according to claim 28 and wherein said geometric combination analyzer comprises:
- means to output a set of possible preliminary positions of said model on said image with a likelihood for each said preliminary position; and
- means to form a scanning region in a Model Parameter Space (MPS) around each of said preliminary model positions.

31. The system according to claim 30 and wherein said geometric combination analyzer comprises:
- a filter to perform model guided geometric filtering to construct chains of edges with a shape approximately corresponding to a shape of pre-specified characteristic regions of a relevant said model;
- means to form groups of lines corresponding to pre-specified characteristic regions on said model;
- a validator to validate said groups of lines by comparing each of said groups to other said groups and as per any a priori known restrictions of said model; and
- a pivot elements detector to identify pivot elements as per known restrictions of said model.

32. The system according to claim 1 wherein said modelizer matches said contour lines to said contour edges in said object by perpendicularly displacing any one of said initial anatomical points, said secondary anatomical points, and said control points, relative to said segments of said contour lines.

33. An animation system comprising:
- a rigid model and animation library comprising at least one rigid model and animations associated with said at least one rigid model;
- a modelizer to hierarchically match a rigid model selected from said rigid model and animation library to an object in an image;
- a cutter to cut said object from said image along object contour lines determined by said modelizer;
- an animation adapter to animate said cut object according to animations in said rigid model and animation library associated with said selected rigid model; and
- means to allow a user to select said rigid model and said associated animations from said rigid model and animation library,
- wherein said hierarchical matching comprises matching said rigid model in stages to correct for noise in each stage, said stages comprising:
- determining a position of said model by positioning initial anatomic points in said model relative to alignment points in said model, wherein said alignment points are associated with extremities of said object;
- correcting anatomic positioning of said model by positioning secondary anatomic points in said model relative to said initial anatomic points;
- defining geometrically shaped active regions in said model associated with segments of contour lines in said model;
- matching said contour lines to contour edges in said object.

34. A method for animation comprising:
- selecting, using user selection means, a rigid model from a rigid model and animation library comprising at least one rigid model and animations associated with said at least one rigid model;
- hierarchically matching said selected rigid model to an object in an image using a modelizer;
- cutting said object from said image along object contour lines determined by said modelizer using a cutter;
- selecting, using said user selection means, animations from said rigid model and animations library associated with said selected rigid model; and
- animating said cut object according to said selected associated animations,
- wherein said hierarchical matching comprises
- matching said rigid model in stages to correct for noise in each stage, said
- stages comprising:
- determining a position of said model by positioning initial anatomic points in said model relative to alignment points in said model, wherein said alignment points are associated with extremities of said object;
- correcting anatomic positioning of said model by positioning secondary anatomic points in said model relative to said initial anatomic points;
- defining geometrically shaped active regions in said model associated with segments of said contour lines;
- matching said contour lines to contour edges in said object.

35. The method according to claim 34 and also comprising enabling said user to perform said matching interactively.

36. The method according to claim 34 and also comprising enabling said user to perform model guided interactive matching.

37. The method according to claim 34 and wherein said animating is small movement animation.

38. The method according to claim 37 and wherein said small movement animation comprises:
enlarging a part of said object; and
animating said enlarged part of said object over a white space area surrounded by a background margin, wherein:
said white space area is defined by an original position of said part of said object, and
said background margin is defined as a difference in area of said image covered by said enlarged part of said object and said white space area.

39. The method according to claim 34 and wherein said animating comprises:
extracting said cut object from said image; and
animating said cut object on a different background.

40. The method according to claim 34 and also comprising performing an approximate reconstruction of occluded parts of said object as per at least one of the following: an associated non-occluded part of said object, a matching part of a model matched to said object, and interpolation of non-occluded colors in said object.

41. The method according to claim 34 and wherein said animating is associated with at least one of a greeting card, game, game avatar and a digital camera implementation.

42. The method according to claim 34 and wherein said model is of a human standing enface and determining an appropriate said model based on a matrix of qualifications including at least one of sex, age, body build, athletic skill and pose.

43. The method according to claim 34 and wherein said model is of one of the following: an animal and a virtual animated object.

44. The method according to claim 34 and comprising receiving marking points from a user marking said alignment points on said image.

45. The method according to claim 44 and wherein said alignment points are control points organized in a hierarchically rigid manner to define a specific multi-scale organization of control parameters for fitting them to said object.

46. The method according to claim 45 and wherein said control points are at least one of:
anatomic parameters for coarse scale model positioning;
geometrically shaped active regions of certain combinations of segments of a contour of a model; and
contour control points for finely fitting edges to said contour within a proscribed neighborhood of said model.

47. The method according to claim 46 and wherein said anatomic parameters are at least one of said initial and secondary points for performing said coarse scale model positioning in a multi-step process.

48. The method according to claim 45 and comprising organizing said control points into groups, and defining a forbidden set of values based on anatomic restrictions for each group.

49. The method according to claim 48 and comprising calculating overall model distortion as a sum of: penalty functions for each group, a global penalty function, and a stretching function.

50. The method according to claim 49 and comprising stopping processing when said overall model distortion exceeds a pre-defined threshold.

51. The method according to claim 49 and comprising calculating said penalty function for each said group, wherein a value of said penalty function approaches infinity as said control points of said group approach said forbidden set.

52. The method according to claim 49 and comprising calculating a global penalty function defined as a total distance of said control parameters from a globally anatomically forbidden region.

53. The method according to claim 49 and comprising calculating said stretching function as a measure of total deviation of all said control parameters from their associated reference points.

54. The method according to claim 44 and comprising adjusting said model to align said marking points with said alignment points.

55. The method according to claim 34 and comprising enabling a user to create said image with said object in a generally same pose as said model.

56. The method according to claim 34 and comprising cunningly adjusting said model to coarsely align said model with said object in said image.

57. The method according to claim 34 and also comprising:
providing one frame at a time from a video sequence for aligning an initial position of said model with said object; and
generating an action sequence from a collection of said models in response to said frames of said video sequence.

58. The method according to claim 57 and wherein said video sequence is from at least one of a movie, media clip and broadcast.

59. The method according to claim 57 and comprising providing said action sequence to an avatar of said user, wherein said video sequence is of the movement of a user of a game.

60. The method according to claim 34 and wherein said matching comprises:
generating an edge image of said image;
adjusting anatomic points of said model to coarsely match a portion of a contour of said model to edges of said object that are generally parallel to said contour and are in a vicinity of said model and to mark said edges;
adjusting said contour of said model to more tightly match edges of said object that are generally parallel to said contour and are in a vicinity of said model and to mark said edges; and
adjusting said contour of said model to said selected edges.

61. The method according to claim 60 and wherein said matching also comprises calculating a series of matching functions between said edges and portions of said contours, wherein an overall contour matching quality may be expressed as a maximum of calculated values for said matching functions over all matching groups.

62. The method according to claim 60 and also comprising:
performing a model-guided geometric search by analyzing said edge images; and
providing scanning regions for processing to said anatomic points matcher.

63. The method according to claim 62 and wherein said performing comprises performing said model-guided geometric search on progressively finer scales with progressively more detailed said models until the results of a said search no longer improve upon the results of a previous iteration of said search.

64. The method according to claim 62 and wherein said performing comprises:
- outputting a set of possible preliminary positions of said model on said image with a likelihood for each said preliminary position; and
- forming a scanning region in a MPS around each of said preliminary model positions.

65. The method according to claim 64 and also comprising:
- performing model guided geometric filtering to construct chains of edges with a shape approximately corresponding to a shape of pre-specified characteristic regions of a relevant said model;
- forming groups of lines corresponding to pre-specified characteristic regions on said model;
- validating said groups of lines by comparing each of said groups to other said groups and as per any a priori known restrictions of said model; and
- identifying pivot elements as per known restrictions of said model.

66. The animation system according to claim 34 wherein said rigid model further comprises free parameters with which to change a shape of said model and an external contour of said model prevents said modelizer from following noisy or false object contour lines during said hierarchical matching.

* * * * *